Oct. 21, 1958     T. A. BANNING, JR     2,856,692
MEASURING AND RECORDING VARIOUS WELL DRILLING OPERATIONS
Filed April 21, 1955     35 Sheets—Sheet 1

Inventor:
Thomas A. Banning, Jr.,

Oct. 21, 1958     T. A. BANNING, JR     2,856,692
MEASURING AND RECORDING VARIOUS WELL DRILLING OPERATIONS
Filed April 21, 1955     35 Sheets-Sheet 4

INVENTOR.
Thomas A. Banning, Jr.,
BY

Oct. 21, 1958     T. A. BANNING, JR     2,856,692
MEASURING AND RECORDING VARIOUS WELL DRILLING OPERATIONS
Filed April 21, 1955     35 Sheets-Sheet 7

INVENTOR.
Thomas A. Banning, Jr,
BY

Oct. 21, 1958    T. A. BANNING, JR    2,856,692
MEASURING AND RECORDING VARIOUS WELL DRILLING OPERATIONS
Filed April 21, 1955    35 Sheets-Sheet 13

INVENTOR.
Thomas A. Banning, Jr.,
BY

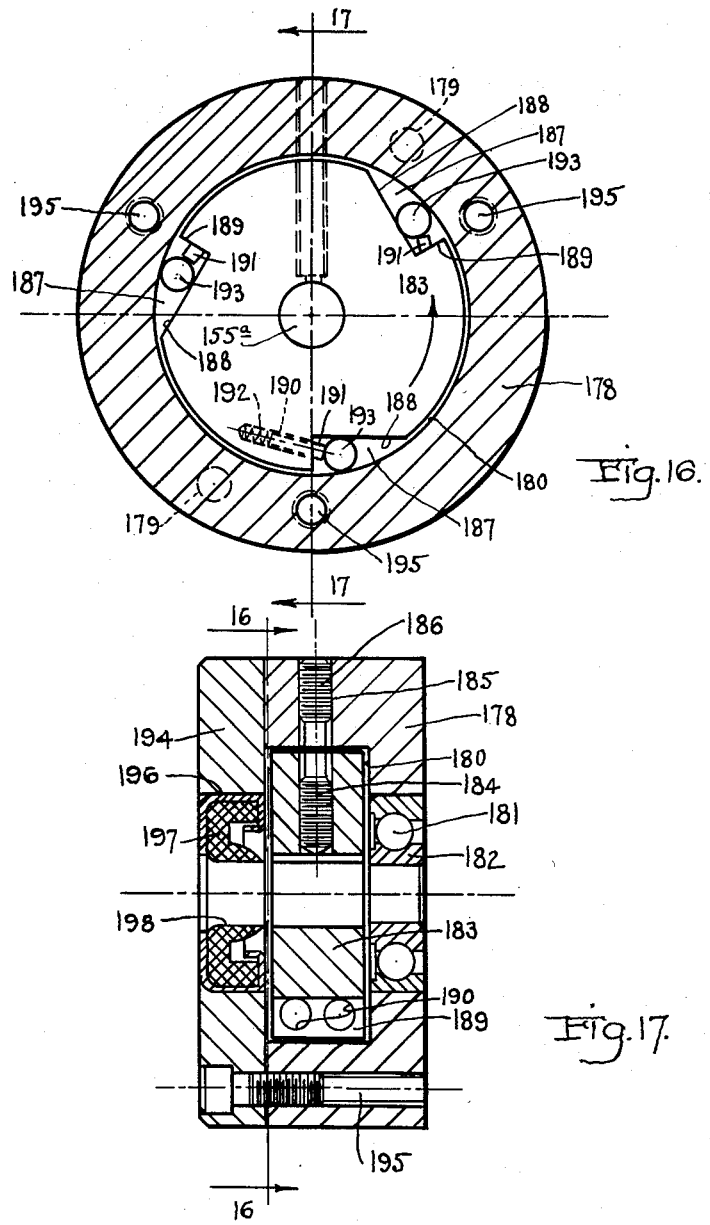

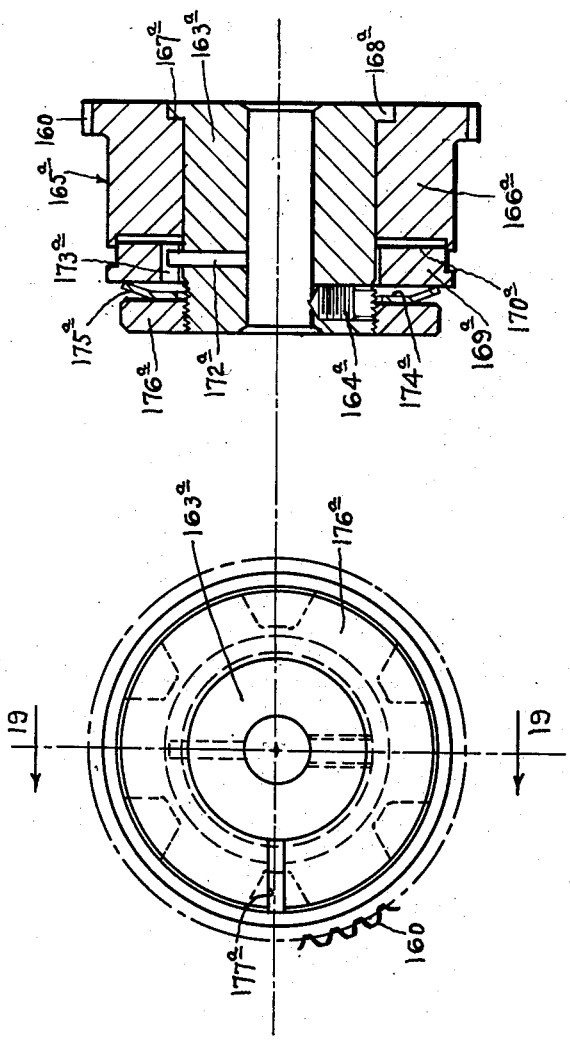

Oct. 21, 1958 T. A. BANNING, JR 2,856,692
MEASURING AND RECORDING VARIOUS WELL DRILLING OPERATIONS
Filed April 21, 1955 35 Sheets-Sheet 16
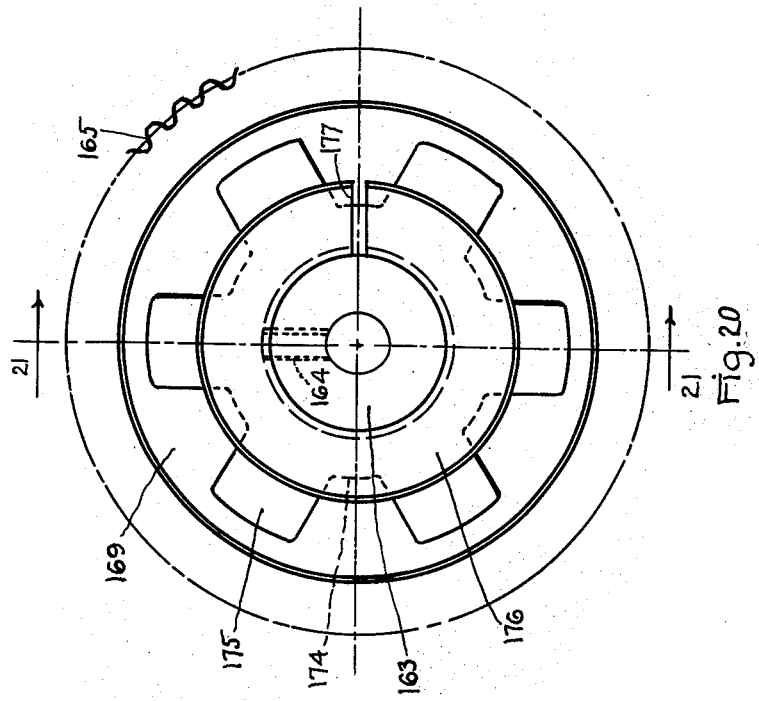
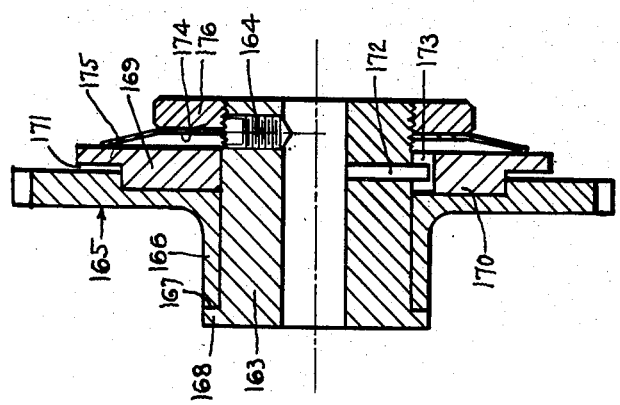
INVENTOR.
Thomas A. Banning, Jr.,
BY Oct. 21, 1958 T. A. BANNING, JR 2,856,692
MEASURING AND RECORDING VARIOUS WELL DRILLING OPERATIONS
Filed April 21, 1955 35 Sheets-Sheet 18

INVENTOR.
Thomas A. Banning, Jr.,
BY

Oct. 21, 1958 T. A. BANNING, JR 2,856,692
MEASURING AND RECORDING VARIOUS WELL DRILLING OPERATIONS
Filed April 21, 1955 35 Sheets-Sheet 21

INVENTOR.
Thomas A. Banning, Jr,
BY

Oct. 21, 1958     T. A. BANNING, JR     2,856,692
MEASURING AND RECORDING VARIOUS WELL DRILLING OPERATIONS
Filed April 21, 1955     35 Sheets-Sheet 22

INVENTOR.
Thomas A. Banning, Jr.,
BY

Oct. 21, 1958     T. A. BANNING, JR     2,856,692
MEASURING AND RECORDING VARIOUS WELL DRILLING OPERATIONS
Filed April 21, 1955     35 Sheets-Sheet 25

INVENTOR.
Thomas A. Banning, Jr.

Oct. 21, 1958 T. A. BANNING, JR 2,856,692
MEASURING AND RECORDING VARIOUS WELL DRILLING OPERATIONS
Filed April 21, 1955 35 Sheets-Sheet 27

INVENTOR.
Thomas A. Banning, Jr.
BY

Oct. 21, 1958   T. A. BANNING, JR   2,856,692
MEASURING AND RECORDING VARIOUS WELL DRILLING OPERATIONS
Filed April 21, 1955   35 Sheets-Sheet 30

INVENTOR.
Thomas A. Banning, Jr.
BY

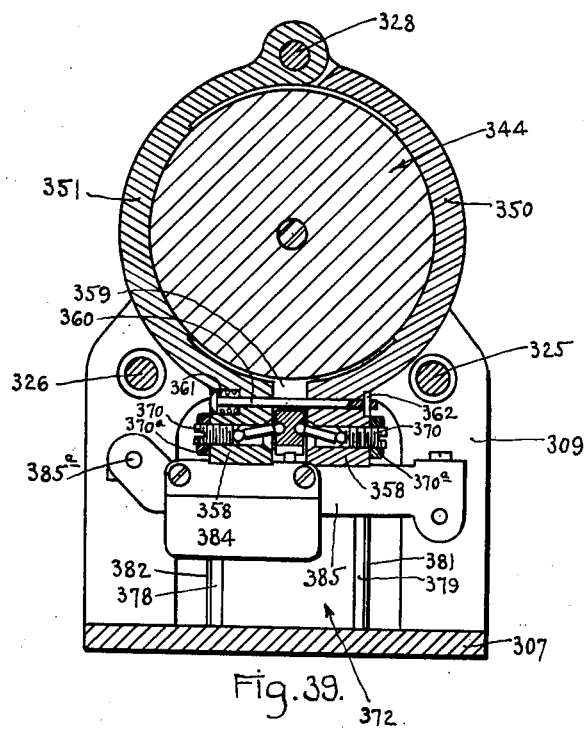
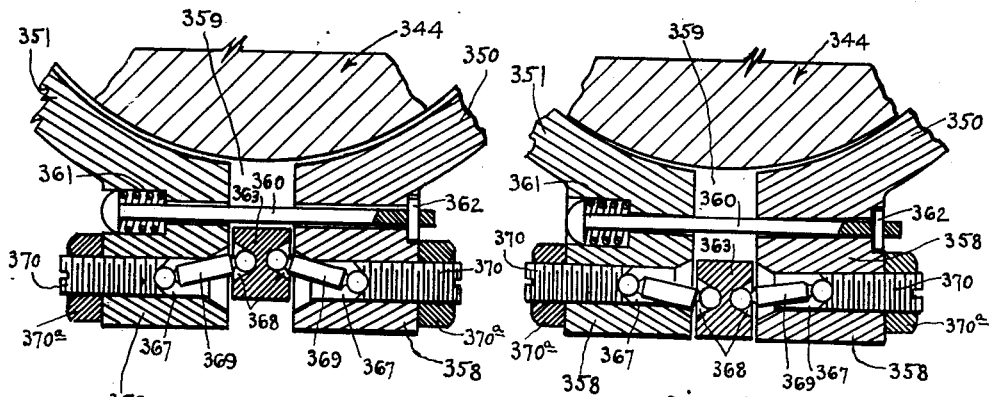
Fig. 39.
Fig. 40.
Fig. 41.
INVENTOR.
Thomas A. Banning, Jr.
BY Oct. 21, 1958     T. A. BANNING, JR     2,856,692
MEASURING AND RECORDING VARIOUS WELL DRILLING OPERATIONS
Filed April 21, 1955     35 Sheets-Sheet 35

Inventor:
Thomas A. Banning, Jr.

United States Patent Office 2,856,692
Patented Oct. 21, 1958

2,856,692

MEASURING AND RECORDING VARIOUS WELL DRILLING OPERATIONS

Thomas A. Banning, Jr., Chicago, Ill.

Application April 21, 1955, Serial No. 502,947

56 Claims. (Cl. 33—134)

This invention relates to improvements in apparatus intended for measuring and recording various well drilling operations. The features of invention hereinafter disclosed have to do especially with making measurements and producing records in connection with deep well drilling, but it will appear that said improvements are not limited to these specific functions, except as I may so limit them in the claims to follow. Furthermore, the improvements herein disclosed have to do especially with measurements of depths drilled and also measurements of movements "off bottom" or upwardly, and also have to do with the giving of signals, preferably but not necessarily by electrical means to indicate consummation of various functions, such as the completion of successive feet drilled, or such as the raising of the drill bit "off bottom," and other functions related to the drilling operations. Also, the improvements herein disclosed have to do with the recording of various of these signals to produce logs of the drilling operations; and one form of such logs comprises a trace which relates time to drill each foot to such foot location as indicated on such log, taking account of the net drilling time consumed in drilling operation as segregated from the total elapsed time including "time out."

The improvements herein disclosed also include, preferably but not necessarily, visual means to show to the driller the bit location at all times, and also to show the depth to which the drilling operation has progressed. To this end, the improvements herein disclosed include visual means to show at all times the total depth to which the drilling operation has progressed, as well as the amount by which the bit stands "off bottom" at any given time, that is, the amount by which the bit has been raised above its lowest previously attained depth.

Broadly speaking the herein disclosed improvements include a "Signalling Unit" which is placed in operative connection with the drilling string currently being used in the well drilling operation, and which signalling unit effects its various movements in direct response to the various up and down movements of such drilling string. This signalling unit is in itself a self-contained unit which is capable of effecting accurate and dependable measurements and indications and recordings of depths attained and movements "off bottom" at all times during the progress of the drilling operation. This signalling unit is also provided with suitable switching or circuit closing and controlling means whereby the completion of successive increments of drilling, such as successive feet, may and will be signalled to a suitable recorder; and this signalling unit is also provided with suitable switching or circuit closing means whereby any prescribed movement of the drilling string upwardly, or "off bottom" will effect closing of a suitable switch or circuit closing device, thereby signalling the "off bottom" condition to suitable other devices, such as time count devices or the like. Such "off bottom" condition will then continue to effect such "off bottom" signal as long as the "off bottom" condition continues; and the signalling unit is so constituted that as soon as, and immediately that the "on bottom" condition is again attained a reverse of "on bottom" signal will be produced, so that proper functions may be effected corresponding to attainment of such "on bottom" condition.

In my Letters Patent of the United States, No. 2,671,346, issued March 9, 1954, for Improvements in Measuring and Recording Various Well Drilling Operations, on Serial No. 672,752, I have disclosed various forms of signalling units for giving signals to suitable recording means and for recording various well drilling operations. The present application discloses improvements in such signalling devices. In order that these improvements may be more fully understood, the following statements of functions are pertinent:

During normal down drilling operations it is desired to supply a signal at completion of each foot (or other unit of distance) drilled, and to transmit such signal to the recording and time counting apparatus so that the time to drill such so completed foot may be accurately determined and recorded. Such a foot completion signal is given by signalling units disclosed in that issued patent. However, as disclosed in that patent, during the drilling operations various movements of the drilling string are usually executed, including up and down movements entailing "off bottom" conditions. These up movements when executed by the drilling string must not be allowed to become significant insofar as concerns measurements of net down drilling operations, and provision must be made in the apparatus so that when such an up movement "off bottom" is made the recording of time elapsed will be corrected by discontinuing time count against such foot until the "on bottom" condition is again attained: but furthermore, provision must be made such that when an "off bottom" movement has been executed the measurement of footage will not be again resumed until the previously attained "bottom" position of the bit has been re-attained—that is, the bit has again been brought to "bottom."

In that earlier patent provision has been made for taking care of such "off bottom" movements within a limit of magnitude of such movements as will generally be found to be sufficient for practical drilling operations. However, it has been found that in some cases of drilling operations it is desirable to be able to execute "off bottom" movements of much greater magnitude than can be conveniently taken care of in the type of "off bottom" arrangement, or "lost motion connection" disclosed in that earlier application; and in fact it has been found desirable to be able to at times take care of "off bottom" movements of magnitude as great as the full depth to which the drill hole has at the time progressed. That is, it is sometimes found desirable to be able to raise the drill string completely out of the drill hole, bringing the bit completely to the surface, treating such operation as an "off bottom" movement, as distinguished from a reversal movement, such as is illustrated in that earlier application.

It is therefore a prime object of the present invention to make provision for effecting "off bottom" movements of the full magnitude of the depth of hole thus far drilled, so that whenever an "out of the hole" movement is made from any depth of hole attained such up or out of the hole movement may be made and may be treated, as far as the signalling unit is concerned, as an "off bottom" movement, and without the need of making any purposeful reversal of movements of the various parts of the signalling unit during such large amount of "off bottom" movement. In other words, it is a prime object of the present invention to make provision for enabling "off bottom" movements of any magnitude up to or even greater than the total depth of hole then drilled, without the need of making any special provision to take care of such large "off bottom" movements, and to so arrange the signalling unit that it will at all times take care of "off bottom" movements of any magnitude without the need of any personal attention to the signalling unit by any attendant.

In connection with the foregoing object it is a further object of the invention to so arrange the parts that when an "off bottom" movement has been executed, regardless of the magnitude thereof, and when a subsequent down movement is made, the signalling unit will automatically take care of all movements, both up and down, and will determine automatically when the previously attained "bottom" has been again attained, and will at that time, and at that position of the bit again resume down measurements, and produce signals of new net footage drilled, and will thus in the long run deliver all needful and proper signals to indicate net feet drilled, from the beginning to the ending of the operations thus being determined by the signalling unit. Thus it is possible, when using this feature of the present improvements to take care of up and down movements of the drilling string and bit, regardless of the depth to which drilling has proceeded, and with up and down movements equal to the full extent of such depth, with certainty that whenever any new drilling occurs to a lower depth proper signals corresponding to such new drilling will occur and without any repetition of signals during movements through previously drilled sections of the bore hole.

It is a further object of the invention to make provision for automatically controlling the operations of the signalling unit harmoniously with drilling string movements, and to accomplish this result by use of a connection between the signalling unit and the tackle or other element in connection therewith which executes movements in exact harmony with and in amount exactly corresponding to vertical movements of the drilling string. In this connection it is here noted that there is frequently introduced into the tackle a spring connection at a point between the tackle block and the kelly or other element by which connection is effected to the upper end of the drilling string. This spring connection, when used, is provided with a stop which limits the extension thereof at a loading much less than the loading imposed by the weight of the drilling string, so that although the upper section of this spring connection may effect movements which do not exactly correspond to the drilling string movements, still the lower or stopped end of this spring connection does effect its movements in exact correspondence with drilling string movements. However, under some conditions the lower portion of this spring connection may and will rotate, whereas the tackle block itself does not effect rotations but retains a more or less non-rotated condition with respect to the derrick at all times. Still it is desirable to effect the signalling unit connection to this lower and rotatable portion of this spring connection so that the operations of the signalling unit will at all times exactly correspond to the vertical movements of the upper end of the drilling string.

It is therefore a further object of the invention to provide a connection between the signalling unit and the lower portion of this this spring connection, which signalling unit connection is so established as to provide for necessary rotary movements of the lower end of the spring connection, and at the same time make unnecessary any rotary movement of the connection which extends to the signalling unit itself. In this improvement I have also made provision for effecting the desired signalling unit connection without the need of making any changes in the construction or operation of this spring connection; and I have secured these results by means of a simple attachment which may be readily used with and attached to standard forms of the spring connection at present in extensive and wide use in drilling operations.

During drilling operations much vibration of the derrick and attached units necessarily occurs, and additionally, it is a not uncommon experience that during the drilling operations the drilling string itself will frequently vibrate up and down or "dance" through an amplitude of measurable amount, and often as much as several inches or more. Such up and down vibrations of the drilling string would represent momentary risings off bottom and movements back to bottom, although such vibrational movements should not properly be reflected as off and on bottom movements, as far as recordings are concerned. Furthermore, the signalling unit delivers signals of newly drilled and completed feet to a suitable recorder, and in connection therewith provision is made for determining net drilling time consumed in the drilling of the foot so recorded. If such vibrational movements should be permitted to control the time count mechanism whereby the recorder determines the net drilling time chargeable against a given foot drilled it is evident that whenever such vibrational movement occurs of sufficient intensity to control the operation of the time count mechanism, the time counted against a given foot will be improperly reduced by the action of such vibrational movements, so that the recorded time will be improperly small.

In connection with the foregoing operational conditions which are normally produced in drilling operations, and are expected to occur it is a further object of the present invention to make provision for effecting upward or "off bottom" movements of the drilling string, of either small or large amount of such movements, but to prevent any improper backward movement of the net depth counting mechanism, so that such "off bottom" movements, no matter how large or how small they may be will not produce any backward or retrograde movement of the total depth counting mechanism, and will not produce any improper repetition of signals indicating depth drilled. In connection with such prevention of backward or retrograde movements of the total depth counting mechanism it is also an object to make provision for permitting backward or "off bottom" movements of the proper devices by which "off bottom" signals are given, and also to make provision for resumption of forward or new depth movements of the total depth counting and signalling mechanism when "bottom" is reestablished; but in connection with the foregoing features it is a further object to make provision for allowing such vibrational up and down movements (which strictly represent "off" and "on" bottom movements) without bringing the "off bottom" signalling elements to function so that such vibrational movements will not improperly affect the time counting mechanism. In other words, I have made provision for allowing such vibrational up and down movements to occur within a range which will amply take care of such expected operational conditions, and without reflecting such vibrational movements in the operations of the "off bottom" signalling mechanism so that such vibrational movements will not improperly affect the time-count mechanism; and at the same time I have made provision for ensuring that normal or non-vibration produced "off bottom" movements will properly operate the "off bottom" signalling mechanism and other related elements so that such normally produced "off bottom" movements may be taken care of in the proper manner, and so that the correct inter-relations of operations of all parts of the signalling unit will occur.

Specifically, the signalling unit herein disclosed includes an incoming shaft element which is rotated backwardly and forwardly according to the up and down movements of the drilling string. This shaft acts directly on the driving shaft element of a first clutch which is operated according to whether the tackle is connected to the drilling string and carries the weight of such drilling string. With such an arrangement when said drilling string is being carried by the tackle said clutch is in its clutched or driving condition. When the drilling string is suspended by the "slips" the tackle and dead-line are unloaded. The driven shaft element of this first clutch is drivingly connected to an "off bottom" counter through the medium of a friction drive element, which friction drive element is of sufficient driving capacity to ensure drive of the "off bottom" counter at all times when the said counter is in any "off bottom" position, corresponding to an "off bottom" condition of the drilling string. This "off bottom" counter is so constructed that when it returns to its zero position it locks against any further rotational movement in the lower reading direction. This locked position corresponds to the bottom position of the bit on the drilling string. Thereafter any further rotational movement of the driven shaft of this clutch element in the downward or drilling direction will result in slip movement within the friction drive element, the "off bottom" counter remaining locked at its zeroed position, and the driven shaft of this clutch element rotating at low speed (since drilling is at low speed), against the resistance of such friction drive element as long as new depth of hole is being drilled.

The driven shaft of this first clutch element drives another or second clutch element's driving shaft through the medium of a spring yield coupling element. This spring coupling element is so constructed that during normal forward drive thereof, corresponding to down drilling of new drill hole, the driving shaft of the second clutch is driven by the driven shaft of the first clutch by a positive metal-to-metal drive. Then, in case of a slight retrograde or backward rotational movement of the driven shaft of the first clutch with the driven shaft of the second clutch retained against backward rotation (by the "hold-back" clutch presently to be described), such backward rotational movement of the driven shaft of the first clutch may occur for a limited angle of shaft rotation against the resistance of the springs of the coupling. Such angle is sufficient to take care of any "dancing" of the drilling string which may be normally encountered. If the backward rotation of the shafts of the first clutch does not exceed such limited angle, and if thereafter the shafts of the first clutch are again rotated in their forward directions, corresponding to resumption of down drilling movement, such forward rotation will continue until the amount of such slight spring yield movement has been taken up. Then positive metal-to-metal drive of such coupling will be resumed in the forward or down direction under such positive drive condition. The amount of such backward movement which may occur against the springs of the coupling is made sufficient to take care of the vibrational or "dancing" movements; and in one embodiment of the present invention this movement is of the order of four inches permissible movement.

The second clutch above referred to is so constructed and controlled that its clutching and unclutching operations are controlled by the "zeroing" operations of the "off bottom" counter above referred to. Preferably this second clutch, like the first mentioned clutch, is of electromagnetic control, and the currents needed for such control are dictated by a microswitch operated by the movements of the "off bottom" counter at and adjacent to its "zeroing" position. The arrangement is such that when or shortly after the "off bottom" counter moves in the off bottom count direction from its "off bottom" locked position the unclutching signal is given by the microswitch of the off bottom counter to the second clutch so that said second clutch is disengaged and its driving and driven shafts are freed from each other during such unclutching condition. This disengagement occurs prior to movement of the driven shaft of the first clutch to its limit of movement against the spring yield. Since the driven shaft of the second clutch is retained against backward rotation by the "hold back" clutch presently to be described, and since this driven shaft is in driving connection with the total depth counter and in connection with the depth increment (foot) signal delivering switch for newly drilled feet, it follows that when a slight backward rotation of the driven shaft of the first clutch occurs against the force of the springs of the coupling, no corresponding backward rotation of the driven shaft of this second clutch can occur due to "dancing" or other cause. Thereafter when further off bottom movement is transmitted to the off bottom counter the microswitch of said counter will be reversed to release the second clutch. This will disengage the driving and driven shafts of that second clutch, and the force of the springs of the coupling will cause the driving shaft of the second clutch to come into registry with the driven shaft of the first clutch at the metal-to-metal drive coupling position. Thereupon any further backward rotational movement of the driven shaft of the first clutch will carry with it the driving shaft of the second clutch under metal-to-metal contact in said coupling. Then, as long as such backward rotational off-bottom movement continues the registry of the driven shaft of the first clutch and the driving shaft of the second clutch will continue. Such further backward rotational movement will generally be due to an extended "off bottom" movement of the drilling string and may continue for many feet, or even thousands of feet, or for an amount equal to the drilled depth of the bore hole. Furthermore, during such "off bottom" movement of extended amount there may also and will generally occur, many intermediate up and down movements of the drilling string, such as are due to making or breaking of "connections" between the successive stands of joints of the drilling string; but at all times during such "off bottom" movements the metal-to-metal drive condition will be maintained between the driven shaft of the first clutch and the driving shaft of the second clutch.

It is here noted that during such "off bottom" movements as referred to in the previous paragraph, when a forward rotational movement occurs (corresponding to a downward movement of the drilling string), the drive from the driven shaft of the first clutch to the driving shaft of the second clutch is effected by positive metal-to-metal engagement in the spring coupling, whereas when backward rotational movement occurs, corresponding to upward movement of the drilling string, the drive from the driven shaft of the first clutch to the driving shaft of the second clutch is actually effected by the force of the springs of the coupling, but with the parts of the coupling in metal-to-metal engagement. That spring force is purposely made large enough to ensure that actual metal-to-metal engagement shall exist in the resilient coupling (after the second clutch has been unclutched). Thus correct registry of the driven shaft of the first clutch and driving shaft of the second clutch will be maintained at all times for all such down and up movements of the drilling string when "off bottom."

As a result of the foregoing explained functional relations between the parts it is evident that when the driving and driven shafts of the second clutch are again engaged with each other under driving engagement (by return of the "off bottom" counter to its zero position), the driven shaft of the first clutch and the driving shaft of the second clutch will be in metal-to-metal driving engagement through the coupling. This will be true whenever the second clutch has previously been disengaged by signal from the "off bottom" counter. Therefore, when the zeroing position of the "off bottom" counter is again reached and the signal of such condition is transmitted to the second clutch, that clutch will immediately re-engage and effect driving rotational movement between its driving and driven shafts for properly recording depths and giving signals of completion of new feet drilled, during further down drilling. Also, since the metal-to-metal driving condition existed within the coupling at such time of re-engagement of the second clutch, it follows that no loss of drilled footage will occur in the recordings of the total depth counter, nor in the signals emitted by the total depth counter corresponding to new feet drilled.

For convenience I shall hereinafter designate the first clutch as the "dead-line" clutch, and the second clutch as the "off-bottom" clutch; and as will presently appear, the signals effecting control of the dead-line clutch are conveniently but not necessarily derived from a suitable signalling element located upon, or controlled by, the load carried by the dead-line of the tackle. Functionally it is required that the dead-line clutch be engaged whenever the drilling string is connected to the tackle or other raising or lowering mechanism, and be disengaged whenever the drilling string is not connected to the tackle or other raising or lowering mechanism. In other words, the dead-line clutch is to be engaged whenever up or down movements of the drilling string are to be effected, and said dead-line clutch is to be disengaged whenever the drilling string is not to follow the up and down movements of the tackle or other like mechanism, but is to be allowed to stand idle, generally under the holding engagement of the slips.

Various forms of dead-line attachment and related elements are disclosed in my said earlier patent, No. 2,671,346. Those are suitable for giving the signals to the dead-line clutch herein illustrated. I also contemplate other means to give signals to said clutch according to the conditions of connection of the drilling string to the tackle, or non-connection between said elements.

At this point I call attention to the fact that whenever the off-bottom counter has moved away from its zero position so that the off-bottom clutch has been opened or disconnected it is very desirable that movement of the off-bottom counter afterwards to its zero position shall deliver a clutching signal to the off-bottom clutch at exactly the position where the off-bottom counter reaches such zero position. This is true since movement of the off-bottom counter towards its zero position accompanies downward movement of the drilling string towards its previous bottom position, and when said off-bottom counter reaches its zero position the "bottom" position of the bit has been attained so that at such instant the off-bottom clutch should be again engaged to ensure proper rotational movement of the total depth counter to count further depth drilled, and to deliver signals corresponding thereto to the recording mechanism. Analysis of this problem will show that the interposition of the spring coupling between the dead-line clutch and the off-bottom clutch makes it possible to deliver the disengaging signal from the off-bottom counter to the off-bottom clutch at a time when the off-bottom counter has actually moved away from the zero position by some appreciable amount as determined by the construction of the coupling and its springs; and the presence of the "hold-back" clutch in connection with the total depth counter drive shaft (driven shaft of the off-bottom clutch) prevents any backward movement of the total depth counter during the early stages of "off-bottoming" movement of the off-bottom counter and prior to delivery of such clutch disengaging signal. It is therefore not necessary that the disengaging signal of the off-bottom clutch be given at the exact instant that the off-bottom counter moves away from its zero position, provided that such disengaging signal be given at some time during the permissible spring take-up of the spring element of the coupling. This fact makes it practically possible to ensure production of a design and corresponding construction of the signalling unit in which the giving of the disengaging signal need not be overly sensitive and in which construction that disengaging signal may actually be given by the off-bottom counter when the said counter has been rotated an amount corresponding to several inches of rise of the drilling string above its "bottom" position. Still it is necessary, for accurate measurements and recordings, that the re-engaging signal to the off-bottom clutch be delivered exactly at the position where the off-bottom counter has again reached its zero reading.

A convenient construction of signaling elements for controlling the disengagement and re-engagements of the off-bottom clutch is one in which a suitable microswitch is used, which microswitch is controlled by rotational movements of a cam carried by a shaft whose rotations are synchronized with the rotations of the off-bottom counter shaft. These microswitches are of a sensitive type, that is, there is only a small difference between the position of the operating button of such switch at which the contact leaf of the switch is moved in one direction, and the position of such button at which such contact leaf moves back to its original position. If a single switch of this type is used for control of both the disengaging and re-engaging clutch operations it is evident that there can be provided only a small difference between the disengaging and re-engaging positions of the off-bottom clutch, and in some cases this sensitivity will be less than is desirable in order to accommodate the previously mentioned vibrational movements, and on the assumption that it is not necessary nor even desirable to effect disengagement and re-engagement of the off-bottom clutch each time such a vibrational movement occurs. Nor, as previously mentioned herein, is it desirable that all such vibrational movements be reflected in signals delivered to the time-count elements of the recording mechanism.

Accordingly it is a further feature of the present invention that I have made provision for two control switches in operative connection with the off-bottom counter. One of these switches becomes effective when the off-bottom counter has moved "off-bottom" an amount sufficient to take care of all anticipated vibrational movements, but which amount is within the capacity of the spring coupling to absorb such off-bottom movements. This switch when it is actuated by such amount of off-bottom movement serves to disengage the off-bottom clutch so as to enable further and extended off-bottom movement of the drilling string, and this switch also serves to actuate the time-count mechanisms to discontinue counting of drilling time against the foot being currently drilled; and the other of these two switches serves to re-engage the off-bottom clutch at exactly the position of zeroing of the off-bottom counter (representing re-attainment of "bottom" position), and also serves to re-actuate the time-count mechanisms so that counting of time will be correctly resumed, and will be continued until a further intentional discontinuance of such time counting occurs. These switches are so arranged with respect to the off-bottom counter shaft that when moving off-bottom from the zero position of that counter the clutch disengaging switch (which is also the time-count disengaging switch) becomes effective when a predetermined amount of off-bottom movement has occurred; and the clutch re-engaging switch (which is also the time-count re-engaging switch) becomes effective at exactly the zero position of the off-bottom counter.

I wish to point out that under some conditions it may be found satisfactory to make use of a single switch in place of the two switch arrangement just above described, and I do not intend to limit myself to the two switch arrangement, except as I may do so in the claims to follow.

Another feature of the present invention relates to the construction of the clutches which are incorporated in the signalling unit herein disclosed. These are the so-called "off-bottom" clutch and the "dead-line" clutch. In my aforesaid issued Patent No. 2,671,346 I have disclosed a form of "differential" clutch as used in certain forms of signalling unit disclosed in that patent. That differential clutch comprises or includes a driving and a driven shaft which are suitably aligned with respect to each other. One of these shaft elements is connected to one ring gear of the differential and the other shaft is connected to the other ring gear of such differential; and the cage of this differential which carries the intermeshing pinions which engage both ring gears may be controlled by a suitable brake. When that brake is engaged to lock the cage rotational movements will be transmitted from the driving shaft to the driven shaft through the two ring gears and the intermeshing pinions, whereas by releasing such brake the driving shaft and its ring gear may rotate in either direction without transmission of rotational drive to the other ring gear and its driven shaft, the cage and its pinions merely rotating freely at such time. This form of clutch is admirably adapted to meet the conditions of operation imposed by the problems presented by the signalling units of said earlier patent, No. 2,671,346, and also other forms of signalling unit including that herein disclosed. This is true because of the fact that the gripping and releasing brake operations may be very quickly performed in simple manner. Also, the amount of movement of the brake shoes necessary in either the locking or the releasing operation may be very small, of the order of a few thousandths of an inch, and may be produced almost instantaneously. Furthermore, spring means may be and are provided for producing a normal braking engagement of the shoes, so that when the braking is desired these springs will retain that braking action in effect as long as needed without the need of a sustained current in the actuating elements. Also, during the releasing operation the actuating current need be sustained only long enough to move the brake shoes a slight disengaging distance, whereupon a toggle action may be used to retain the brake shoes in such disengaged condition.

It will presently appear that the amount of force which need be transmitted through these "differential" clutches is small, so that lubrication problems entailed by the running of the gears of these differential clutches are inconsequential. In fact, lubrication of these gears is unnecessary and for this reason it is likewise unnecessary to make special provision to prevent such lubricant from getting on the braking surfaces.

In the present application I have disclosed such "differential" clutches for both the "dead-line" clutch and the "off-bottom" clutch; and in the present application I have also disclosed another form of clutches for these locations, since I do not intend to limit myself to any specific form of such clutches, except as I may do so in the claims to follow. I may state, however, that in the present application the form of "differential" clutches disclosed is one which makes provision for definitely locking the driven shaft against rotation at the same time that the differential cage is unlocked, corresponding to discontinuance of the clutching or rotation transmitting action. By this locking of the driven shaft positively, I have ensured against any possible over-running of the driven shaft when operating at high speeds, and I have also ensured against improper rotations of that shaft when the clutch is disengaged.

As further details of construction of these clutches I have also herein disclosed means to electrically set the clutch in either of its two positions by a very short impulse of current delivered through a small operating solenoid. This arrangement is such that two solenoids are provided, one for setting or engaging the clutch, and the other for releasing the clutch and engaging its brake. These two solenoids operate alternately on a common rock bar, one solenoid rocking this bar in one direction, and the other solenoid rocking the bar back to its original position; and I have provided very simple means in connection with this rock bar to effect proper engagement of the differential cage and disengagement of the brake, or vice versa, according to which of the two solenoids is energized. Such operations, produced by the rocking of this rock bar are communicated to the brake shoes in extremely simple and effective manner, and with a toggle effect which ensures that the clutch will remain in that position to which it has been moved.

In connection with the "off-bottom" counter I have made provision for ensuring very exact and dependable functioning to lock said counter exactly at the zero position, when that position is reached during a movement back towards "bottom"; and I have also made provision whereby it is possible to obtain very exact functioning of the microswitch which operates at the zero position to ensure re-engagement of the "off-bottom" clutch when bottom position is exactly attained. In this connection I have made provision for such locking of this counter at its zero position by engagement of a suitable dog with a tooth element which is rotatively carried by the counter drive shaft, and these parts may be pre-set at exact position to ensure very exact functioning at the zero position, and thereafter the engagement of the dog with the tooth will very strongly and definitely lock the counter shaft at the zero position until a subsequent off-bottom movement occurs in contrary direction. Furthermore, I have provided the switch actuating cam as a distinct element from such locking elements, so that the positioning of the switch elements may be adjusted after adjustment of the locking elements to thereby ensure very exact signalling to the off-bottom clutch at the zero position of the off-bottom counter.

It is a further object of this invention to so design and construct the signalling unit that its various component parts may be self-contained elements, each of which may be constructed and adjusted to correct functioning as a unit; and to make provision for assembling of these several units onto a common base plate element whereby these several units are sustained in proper relative positions with respect to each other. In this connection it is a further object of the invention to design and construct the several units of small size and weight and to bring them into such relationship with respect to each other that the overall size and weight of the complete signalling unit may be reduced to values consistent with rendering that signalling unit readily portable. The unit may thus be easily carried to its proper location on the derrick or elsewhere and set up for operation with a minimum of trouble, time, and expense, and without the need of using special instruments in such placement and erection.

It is a further object of the invention to make this signalling unit substantially water and moisture tight, and to ensure against entrance of dust and other foreign matter which might interfere with its correct and reliable functioning. It is, in this connection, intended that when once this signalling unit shall have been placed in operation on a given drilling operation or job, said signalling unit may then be left in place to deliver its signals consistently and regularly during the entire drilling operation intended to be covered.

It is a further object of the present invention to provide a suitable connection between the signalling unit and that portion of the drilling line or string which moves up and down, so that correct movements of the signalling unit shafts will be produced corresponding to the up and down movements of the drilling string, and irrespective of the interposition of the so-called "spring connection" between the tackle and the drilling string itself. I have herein shown and shall describe a simple means to effect this desirable result, such means being shown in conjunction with a well known and extensively used form of such "spring connection."

Specifically, this means to effect connection to that portion of some element which moves in strict accordance with the drilling string movements, comprises a strong permanent magnet which may be set against and thus magnetically attached to a suitable flat surface of some element which travels up and down with the drilling string under all of the conditions encountered in the measuring and recording operations. Such a flat surface is found at the top end of the supported element of a typical Byron-Jackson "spring unit," and such flat top surface is of sufficient size to receive a permanent magnet of the Alnico or other strong type, and of such size as to develop the holding power needed to sustain all shocks and other forces expected to be encountered during a drilling operation. Such permanent magnet element is provided with a peripheral recess at its engaging surface edge so that a convenient tool may be set into such recess to pry off the magnet when the operations have terminated; or a screw may be threaded down through a lug projecting from the edge of such magnet, so that by threading such screw down to bring its lower end into engagement with the surface of the supported element of the "spring unit" and then turning the screw still further, a releasing force will be developed which will force the magnet from surface contact with the "spring unit." Once an air gap has been produced between the magnet and the surface to which it has been adhered the magnet's holding power is reduced to a small fraction of what it was when good surface contact existed, so that the magnet may then be easily removed.

Another feature of my present invention concerns itself with the provision of "stepping motors" in the signalling unit in substitution for the dead-line and off-bottom clutches previously referred to herein. In my said Letters Patent No. 2,671,346 I have disclosed the use of such stepping motors for driving the signalling unit's input shaft back and forth in accordance with the up and down movements of the tackle and drilling string. In that patent I have also disclosed a contactor element connected to the proper tackle point so that such contactor will be driven back and forth in strict accordance with the drilling string's up and down movements. That contactor element is provided with means to deliver the impulses to the stepping motor element in such manner that said motor will also be stepped in one direction or the other according to small increments of drilling string movement either up or down as the case may be.

As a modification of the signalling unit constructions disclosed in the present case I provide two small stepping motors in place of the dead-line and off-bottom clutches, and I provide suitable switches and connections so that when the tackle movements are "significant," corresponding to up and down movements of the drilling string (the dead-line being loaded when the signals of "significant" or "non-significant" are derived from a dead-line unit), the impulses from such contactor are delivered to the signalling unit without interruption; but so that when such tackle movements are "non-significant" the contactor signals are interrupted and do not reach the signalling unit. Thus the stepping motor which corresponds to the dead-line clutch is idle at such times and no rotary movements are transmitted to the driven shaft of such stepping motor. Thus no movement of either counter of the signalling unit may occur. When the tackle movements are "significant" the contactor impulses are delivered to the signalling unit and directly control the back and forth steps of the first or "dead-line" stepping motor, corresponding to the dead-line clutch hereinbefore referred to. Thus, the out-put shaft of such motor may be directly connected to the drive to the "off-bottom" counter shaft. That counter will lock at its zeroed position against further down count movements, but will count to higher digital values with steps of its motor which correspond to off-bottom movements of the drilling string. When locked at its zero position, the steps performed by such stepping motor will rotate its output shaft, but due to the friction drive to the off-bottom counter's shaft such motor rotations corresponding to drilling of new footage can be made notwithstanding that the off-bottom counter is locked at its zero position against further down counts.

The impulses coming from the contactor when the tackle movements are significant will be controlled by the microswitch at the position of the off-bottom counter, before reaching the second stepping motor, corresponding to the off-bottom clutch. Thus, when the off-bottom counter is at its zeroed position its microswitch will be thrown to position to pass the contactor impulses to the second stepping motor, with corresponding drive of the total depth counter to higher reading positions corresponding to new bore hole drilled; but when the off-bottom counter moves away from its zeroed position, corresponding to an off-bottom movement, the impulses coming from the contactor will be interrupted at the location of the off-bottom counter microswitch, and will not reach the second stepping motor which will stand idle until the off-bottom counter again returns to zero and shifts the position of its microswitch to forward the contactor signals to such second stepping motor. Such arrangements will be further described hereinafter.

In the drawings:

Figure 1 shows more or less schematically a derrick having in place thereon the "spring connection" element, the tackle, the signalling unit of the present invention, the dead-line attachment, a schematic recorder arrangement, a suitable battery for delivery of current to the various elements herein disclosed in detail, and a suitable battery charger for ensuring continuous current supply from the battery;

Figure 1:
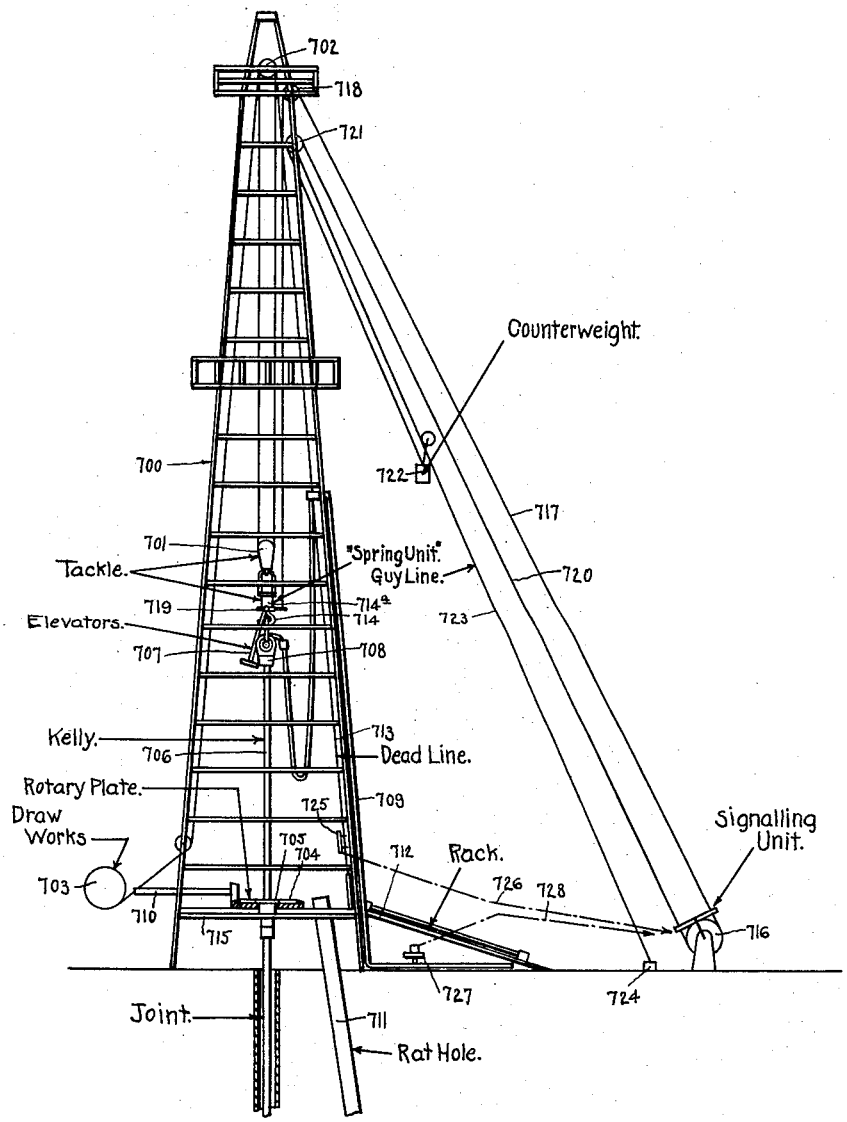
Figure 2:
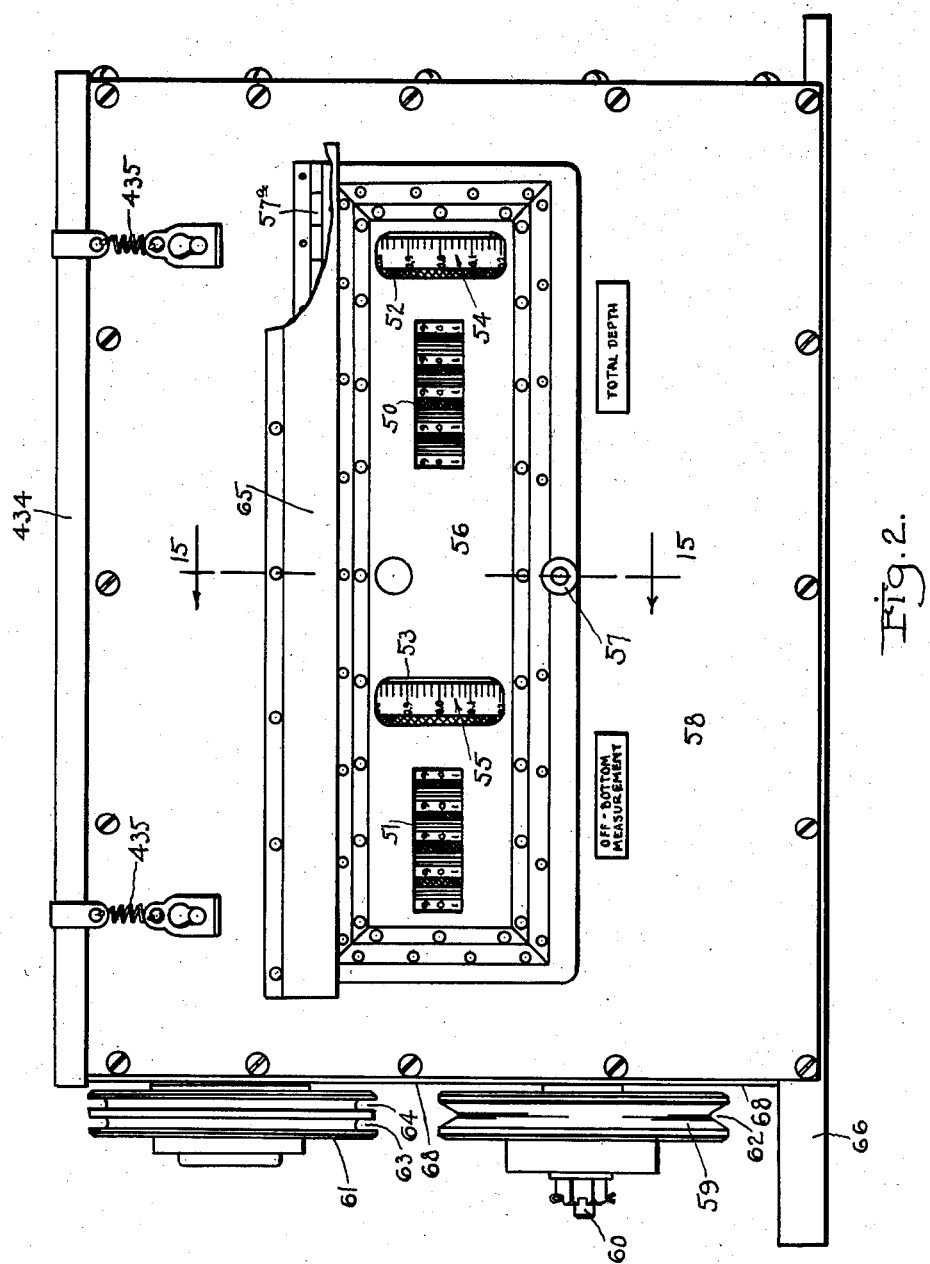
Figure 2 shows a front elevation of the signalling unit herein disclosed in detail.
Figure 3:
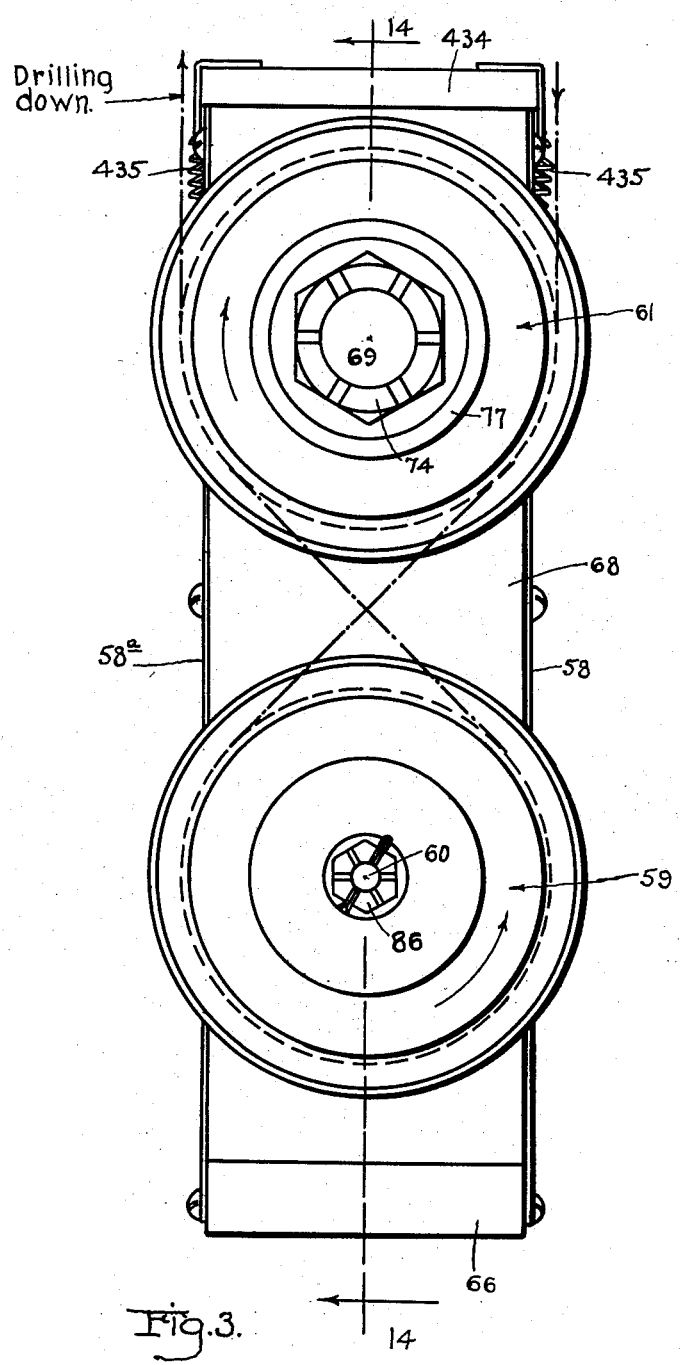
Figure 3 shows a left-hand end elevation of the signalling unit shown in Figure 2, on enlarged scale.
Figure 4:
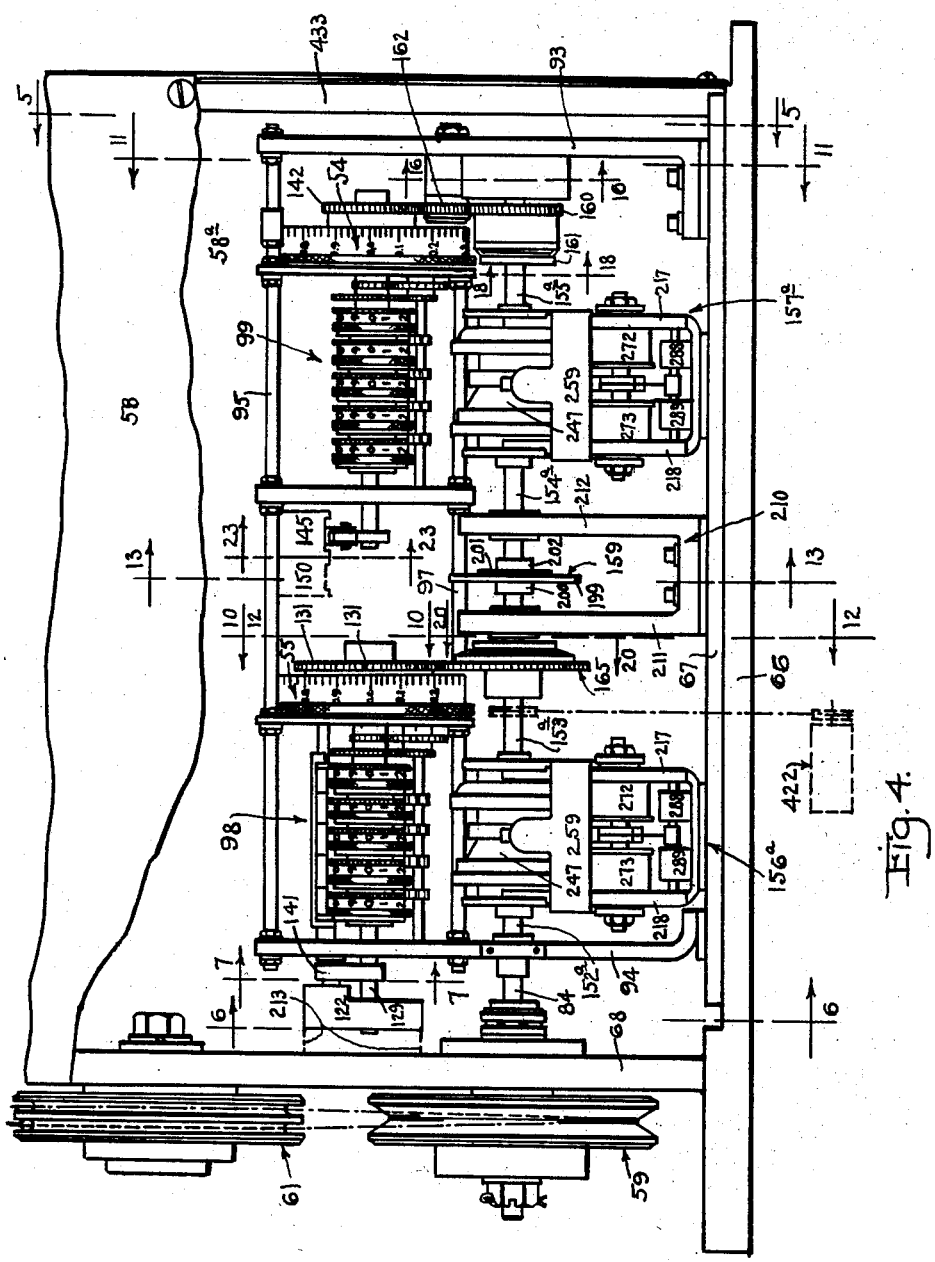
Figure 4 shows a front elevational view of the signalling unit with the front cover plate broken away to reveal the interior construction; and the signalling unit shown in Figure 4 incorporates one form of clutch herein disclosed in full detail.
Figure 5:
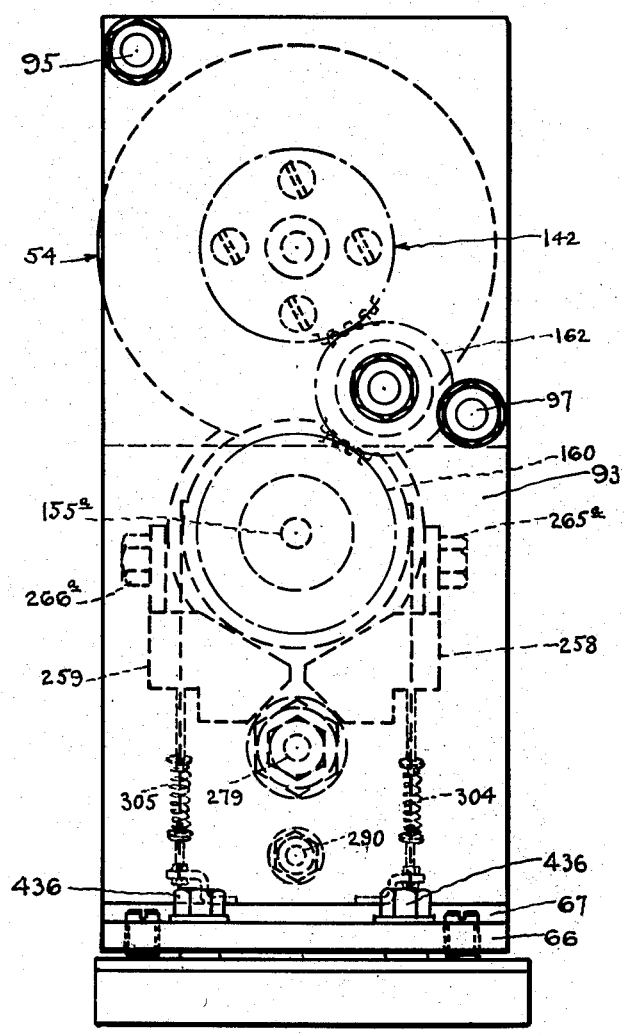
Figure 5 shows a vertical cross-section of the signalling unit shown in Figures 2, 3 and 4, taken on the line 5—5 of Figure 4, looking in the direction of the arrows and on enlarged scale.
Figure 6:
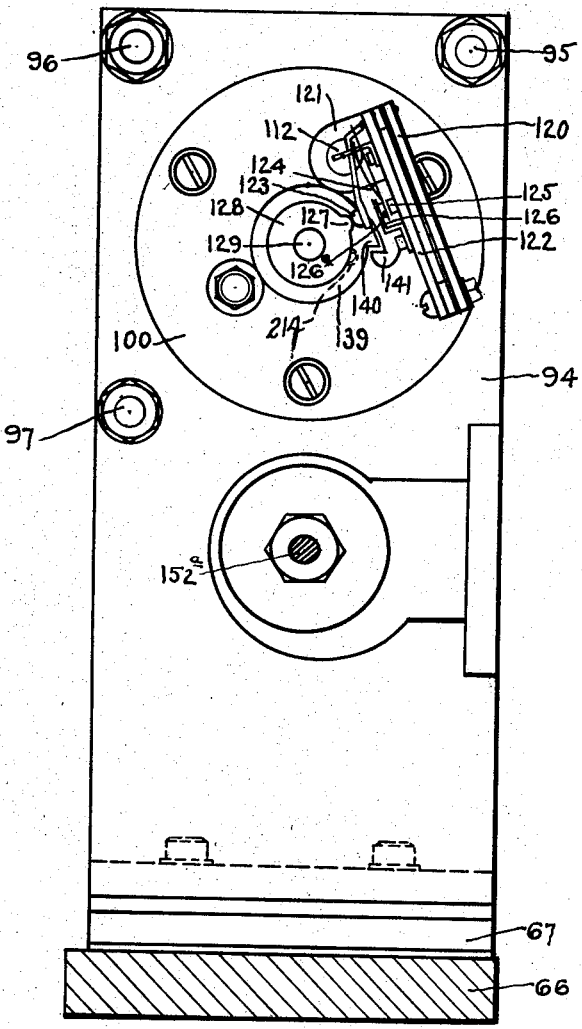
Figure 7:
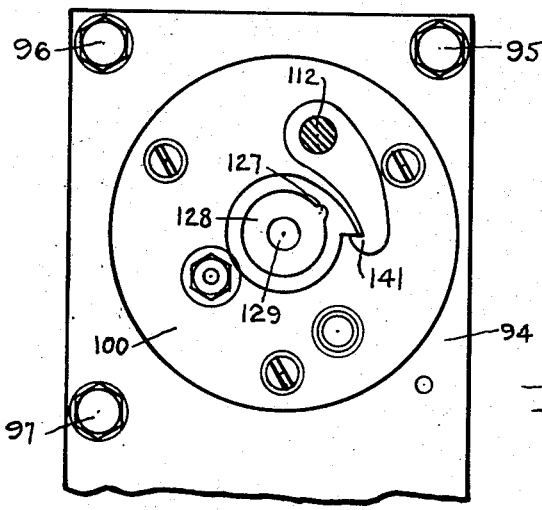
Figure 8:
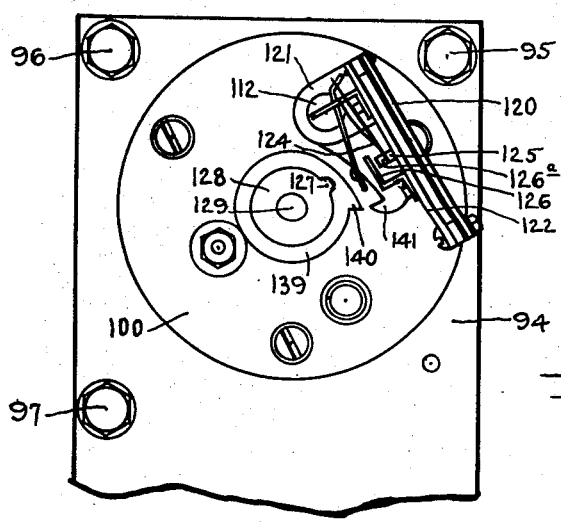
Figure 10:
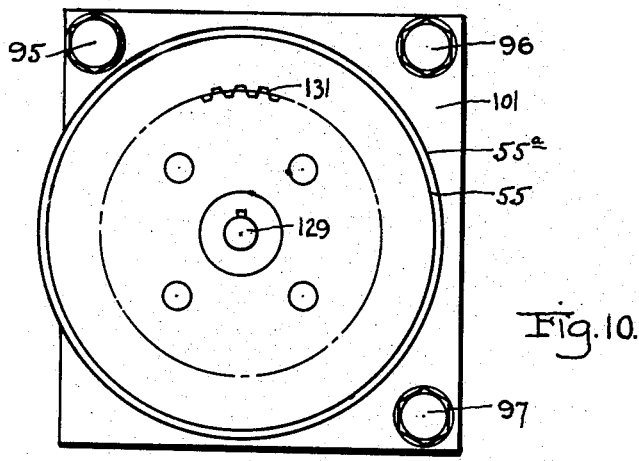
Figure 9:
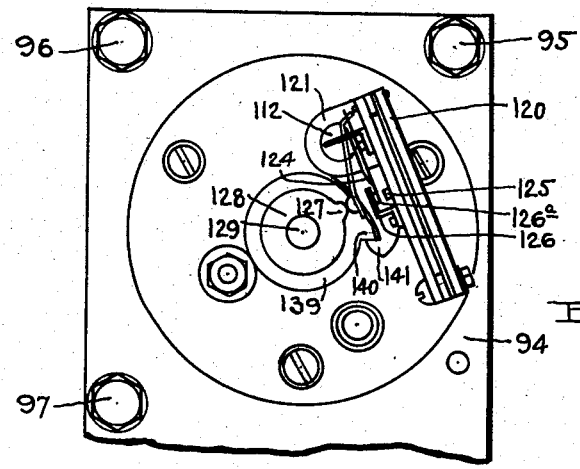
Figure 11:
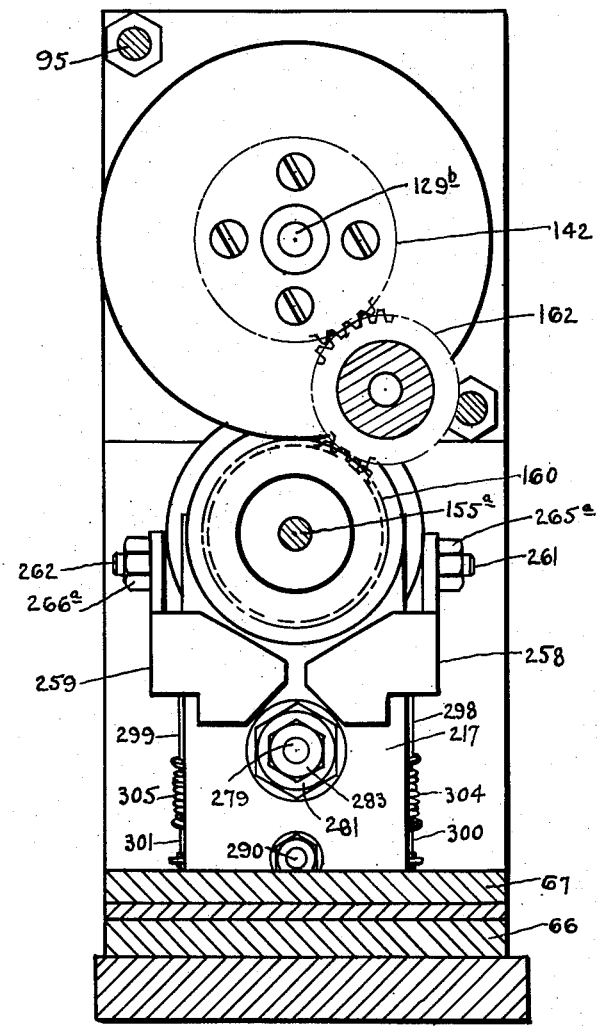
Figure 12:
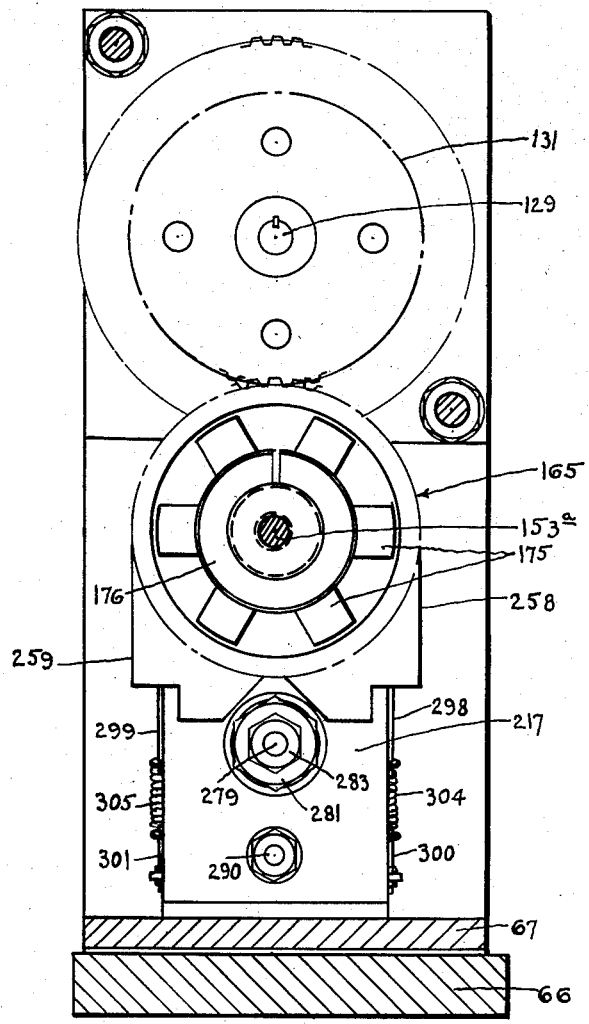
Figure 13:
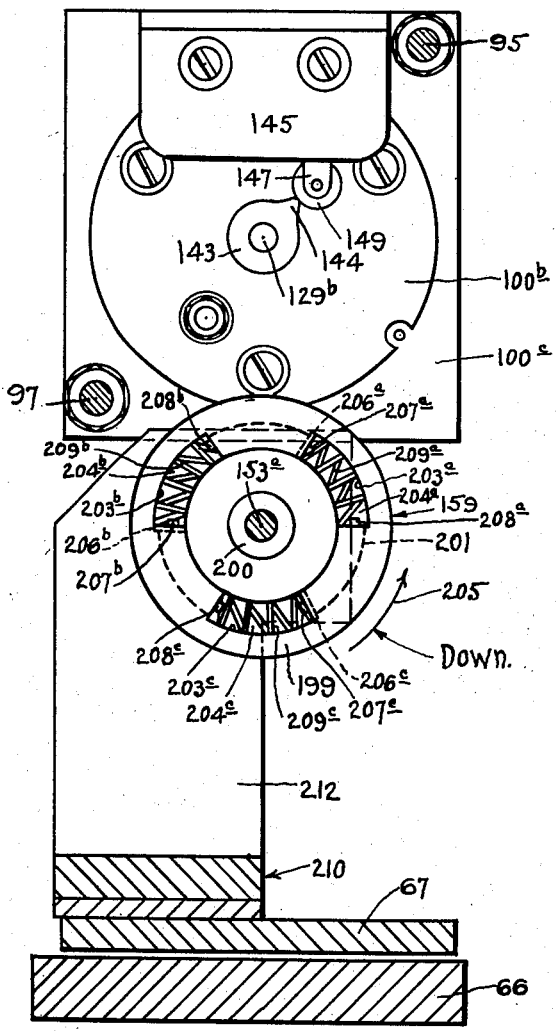
Figure 14:
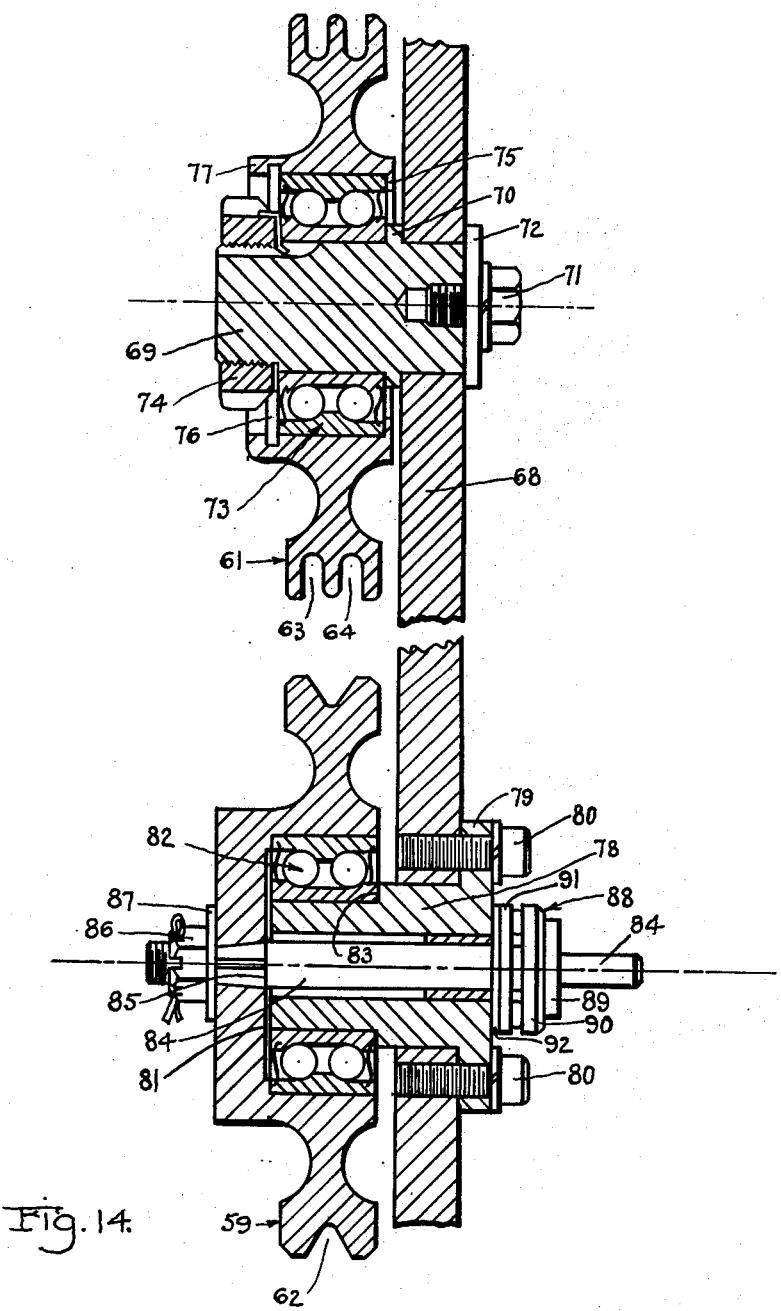
Figure 15:
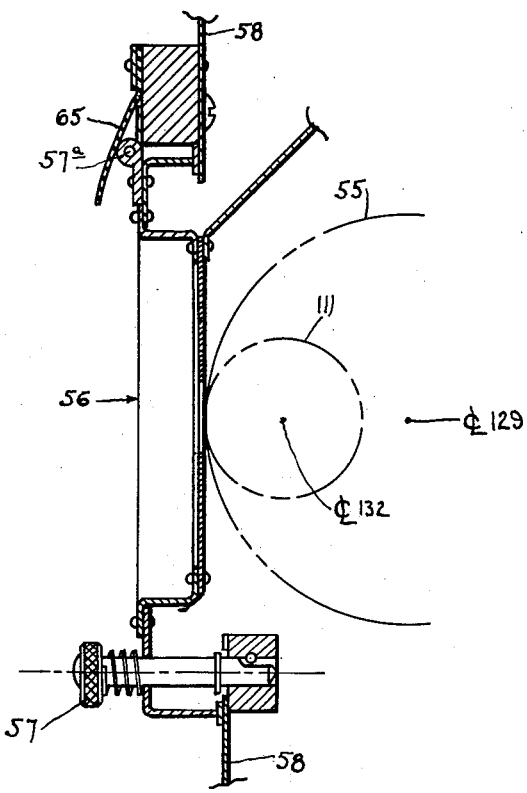
Figure 23:
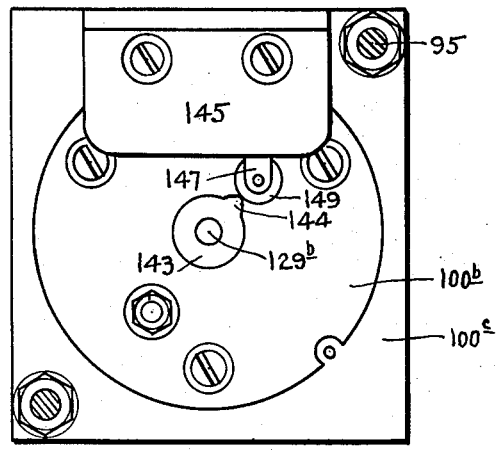
Figure 22:
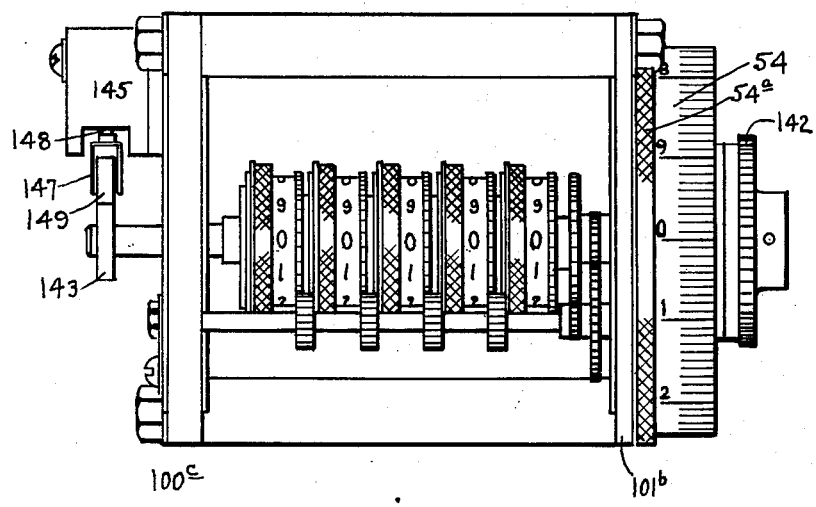
Figure 24:
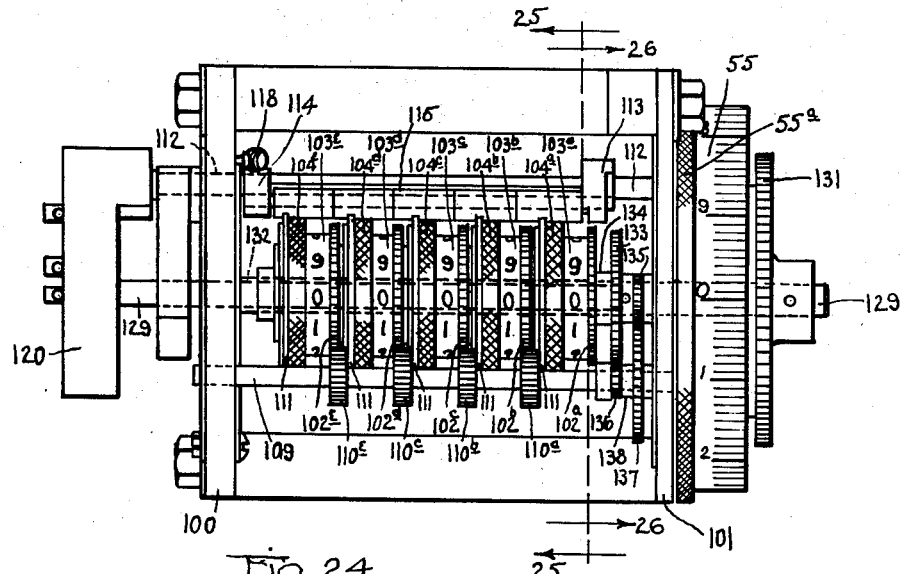
Figure 25:
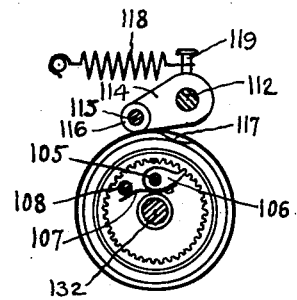
Figure 26:
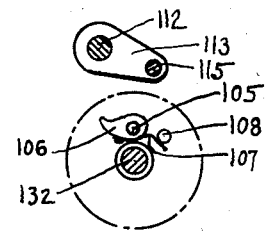
Figure 27:
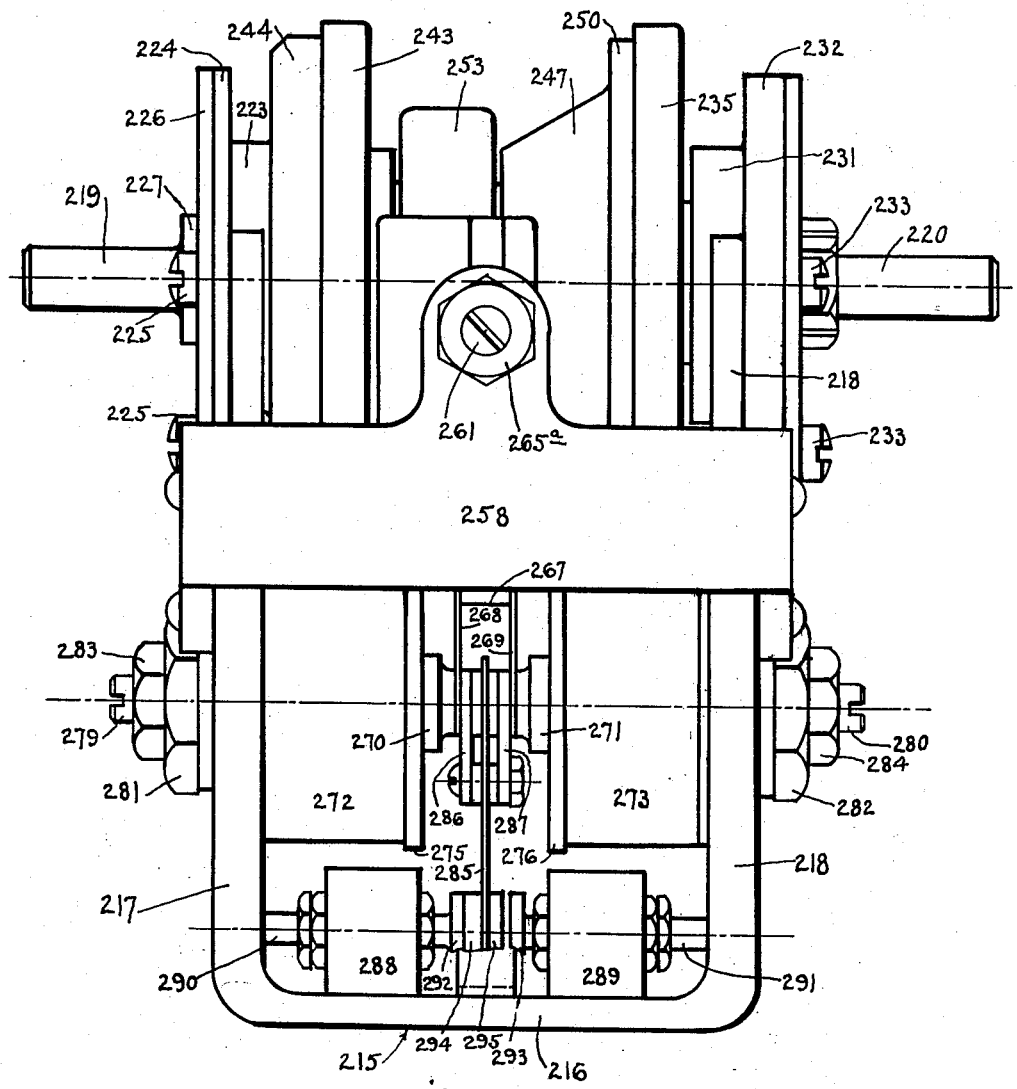
Figure 28:
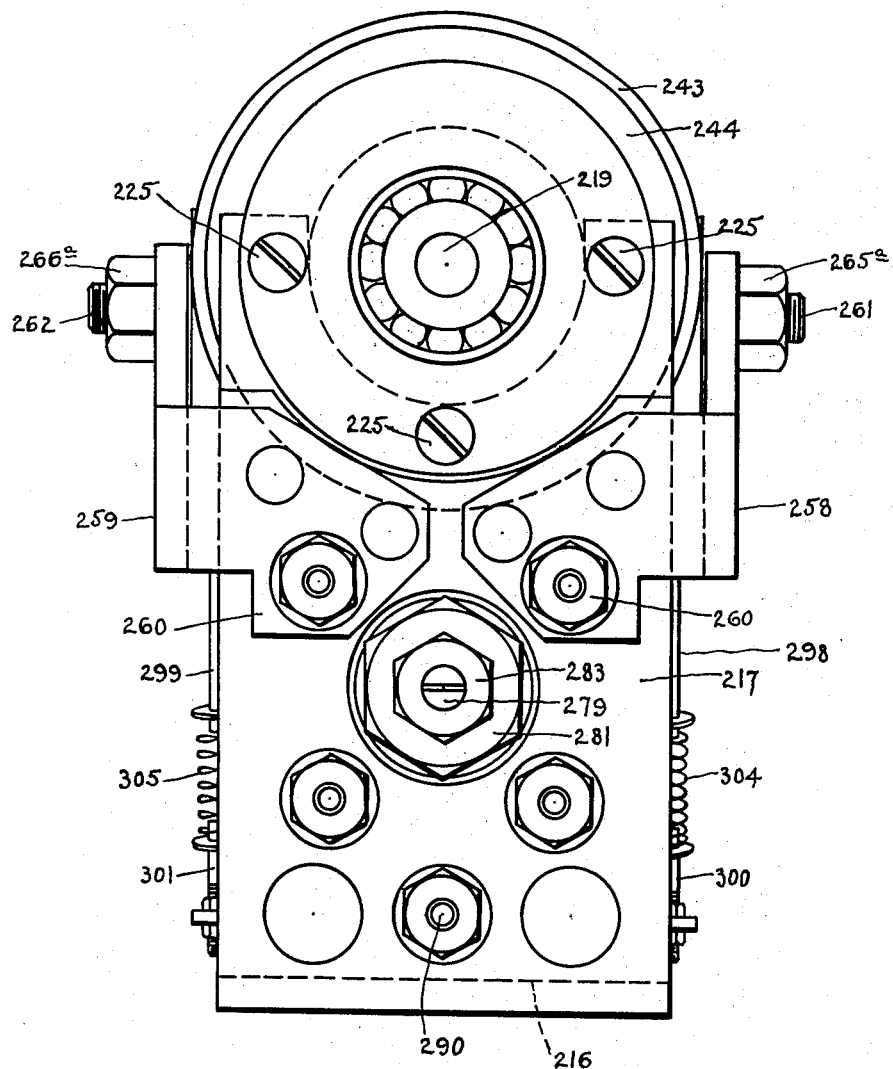
Figure 29:
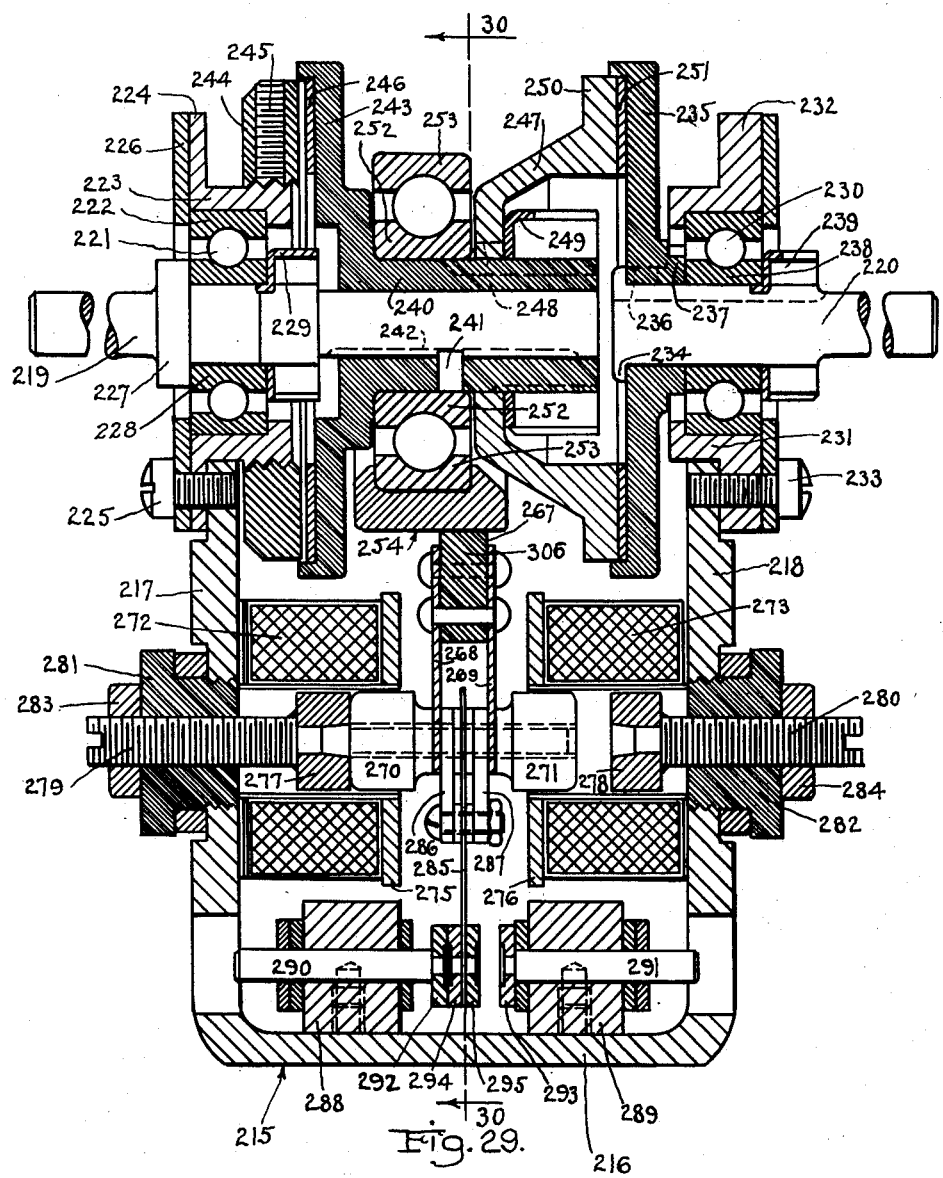
Figure 30:
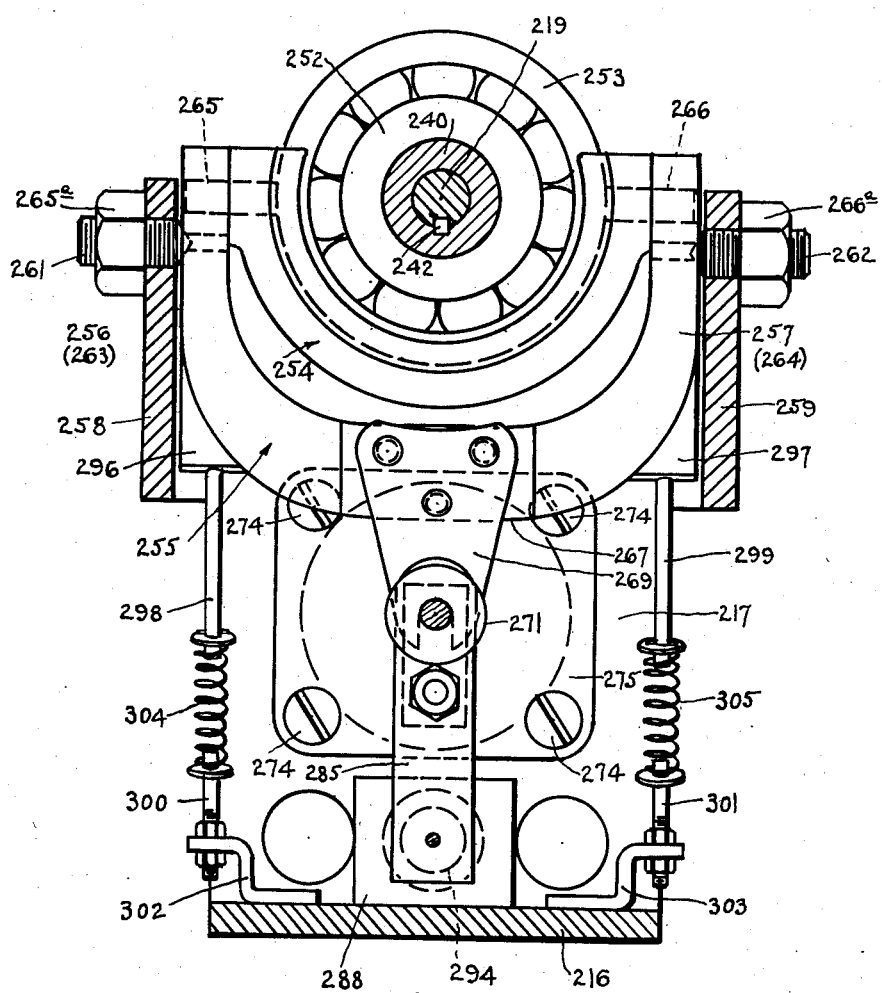
Figure 31:
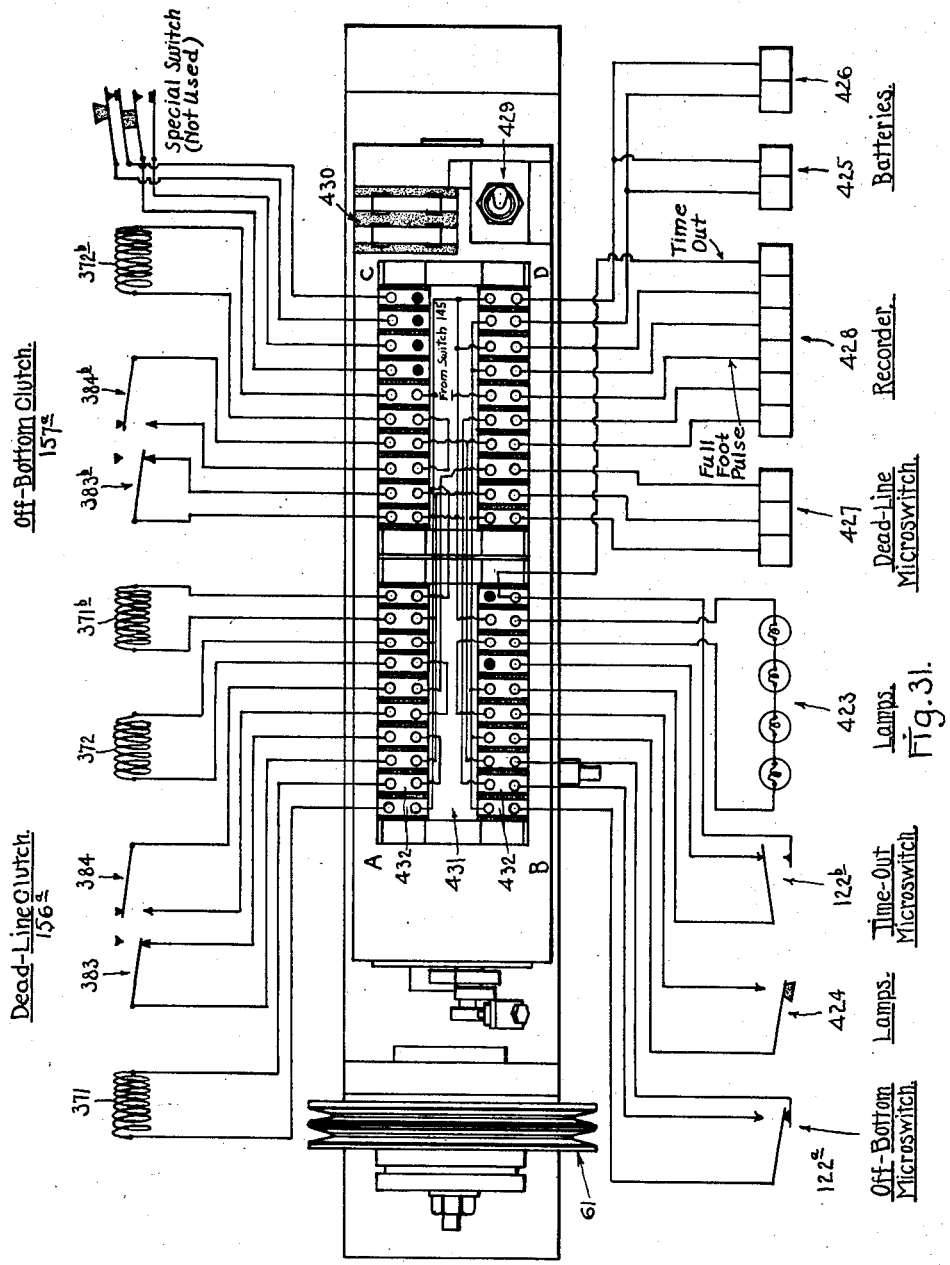
Figure 32:
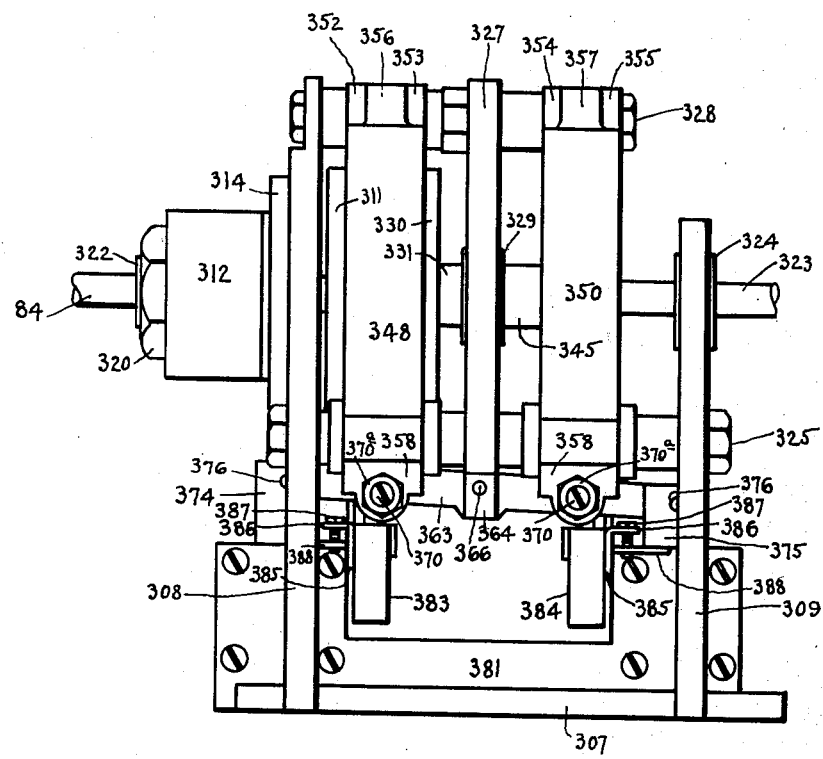
Figure 33:
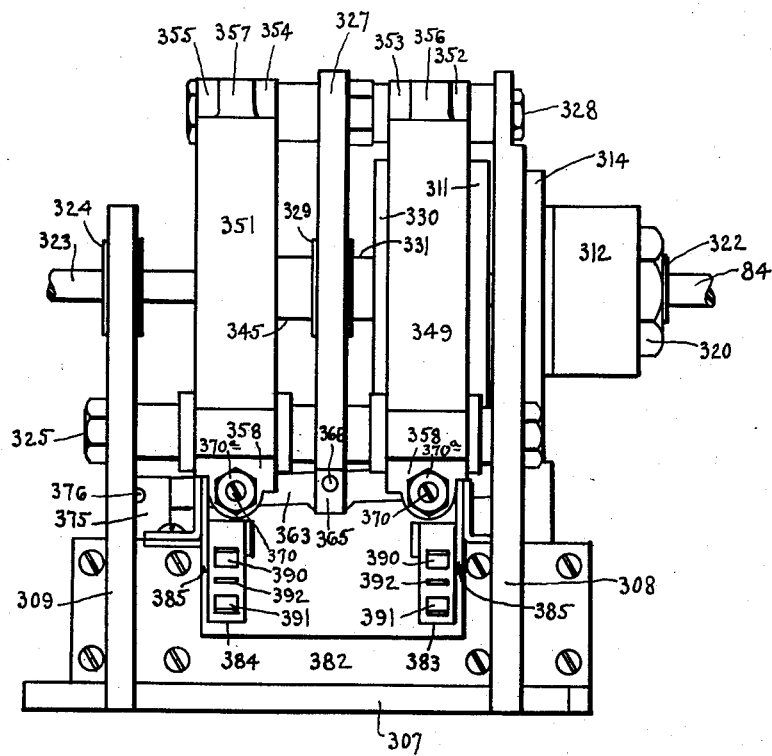
Figure 34:
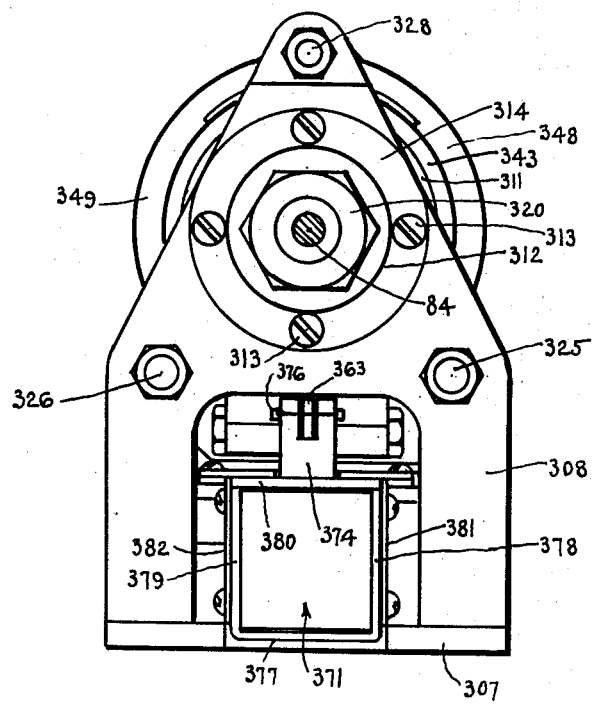
Figure 35:
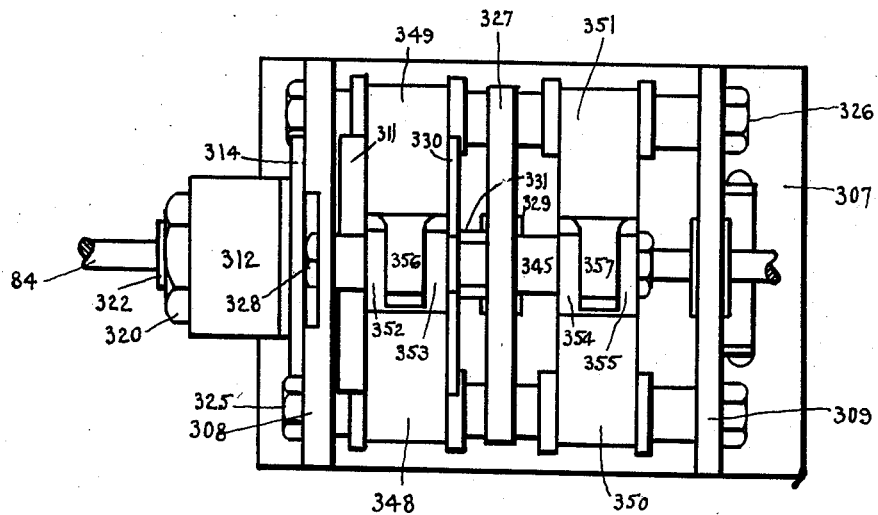
Figure 36:
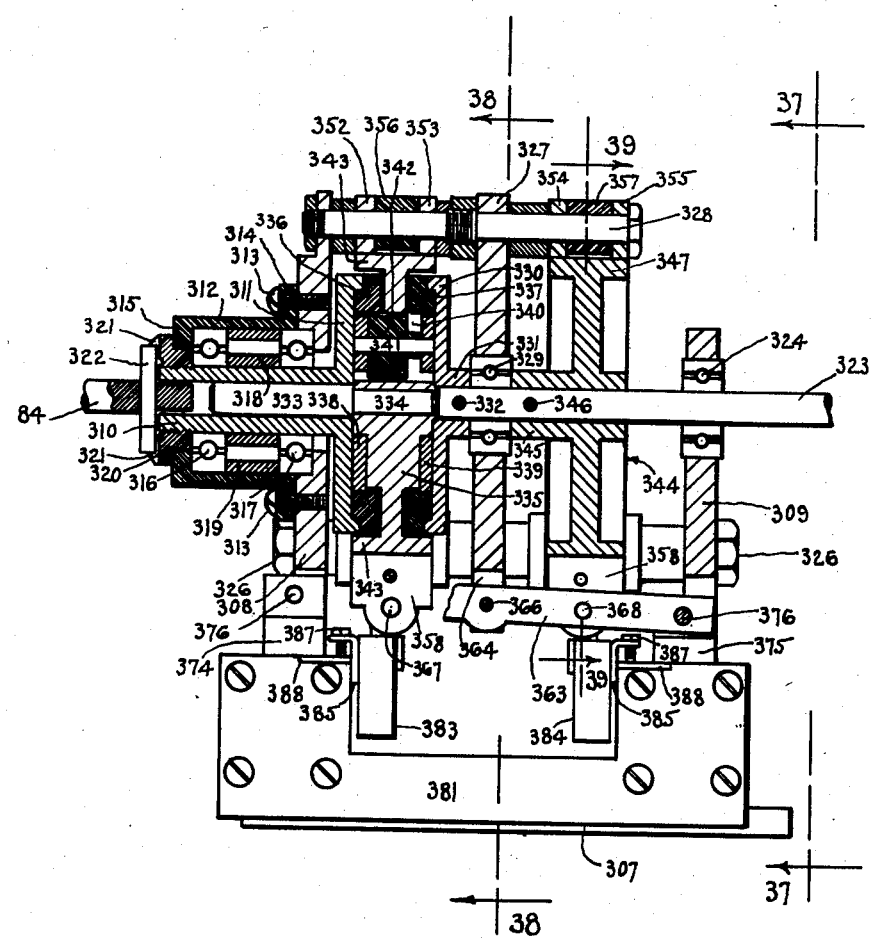
Figure 37:
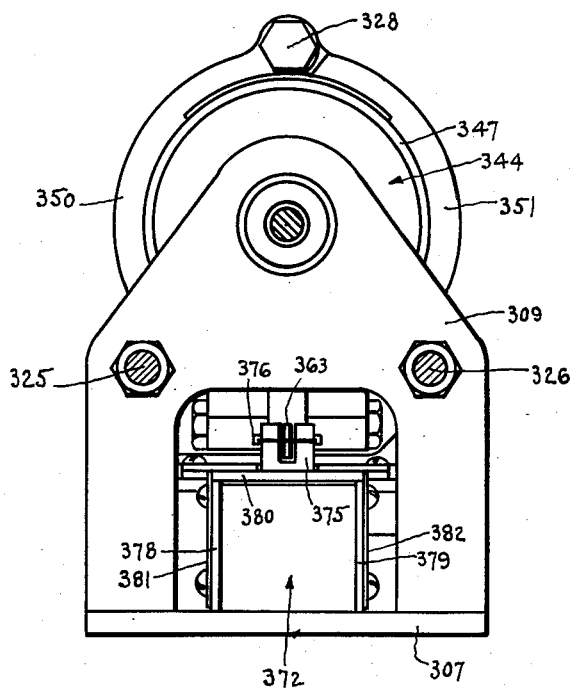
Figure 38:
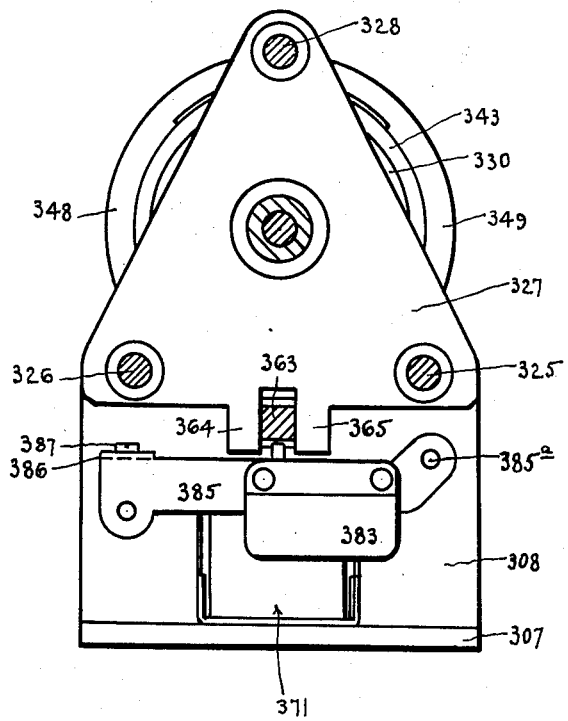
Figure 42:
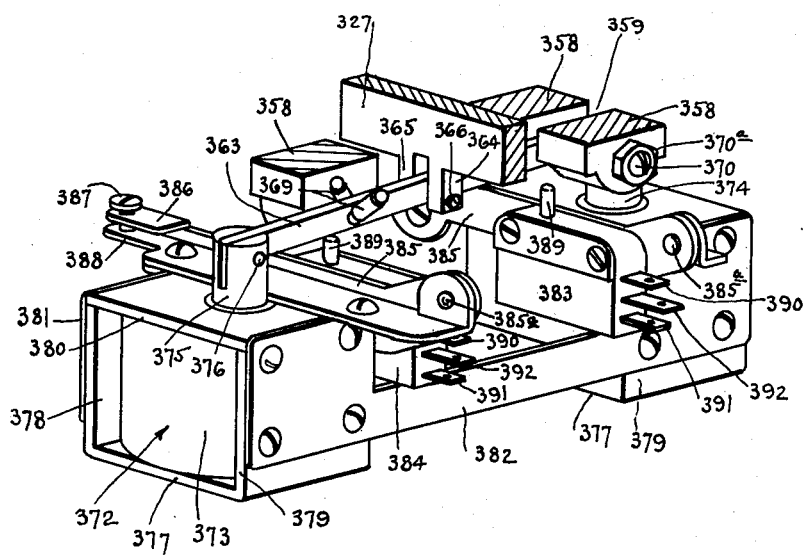
Figure 43:
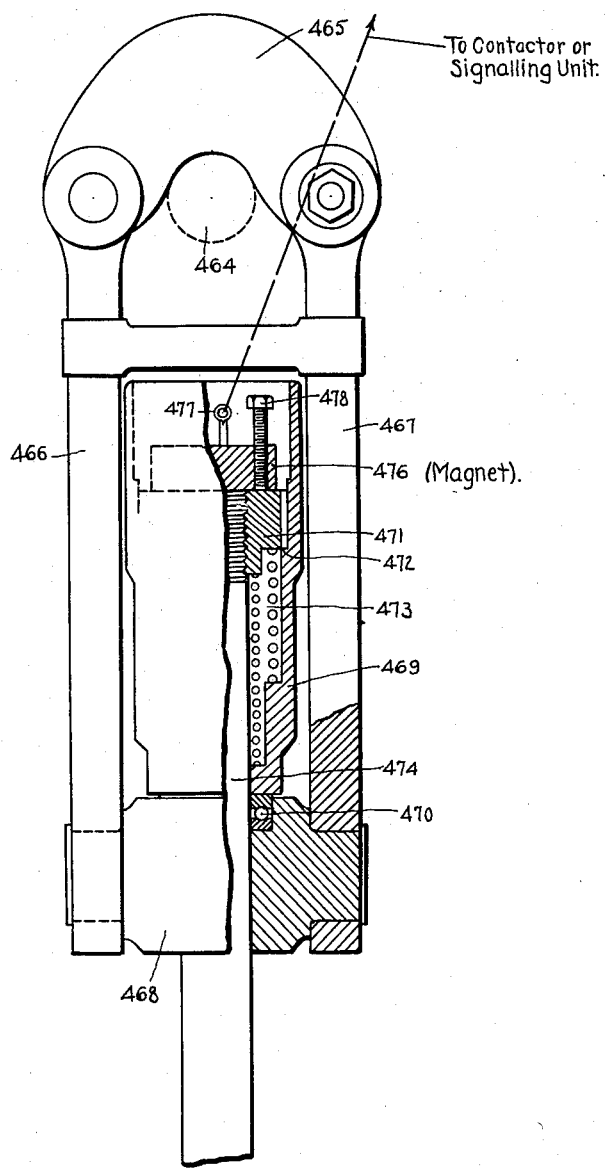
Figure 44:
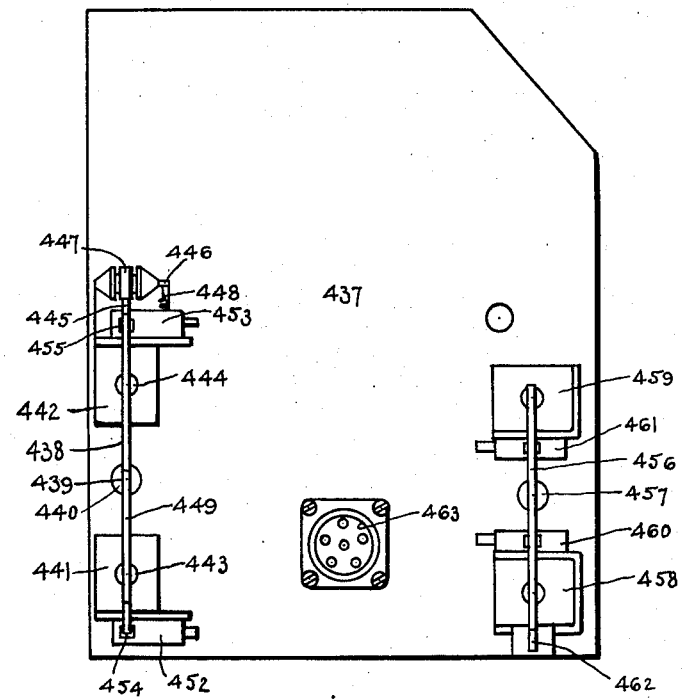
Figure 45:
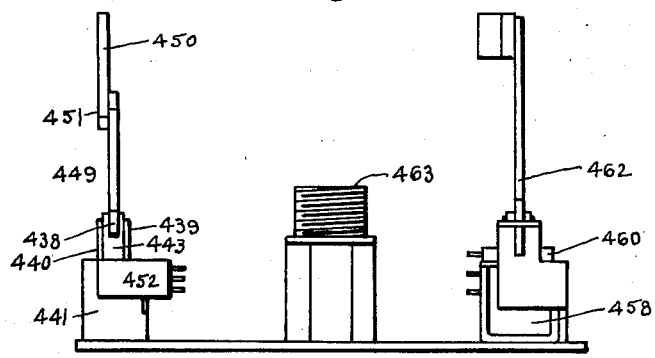
Figure 46:
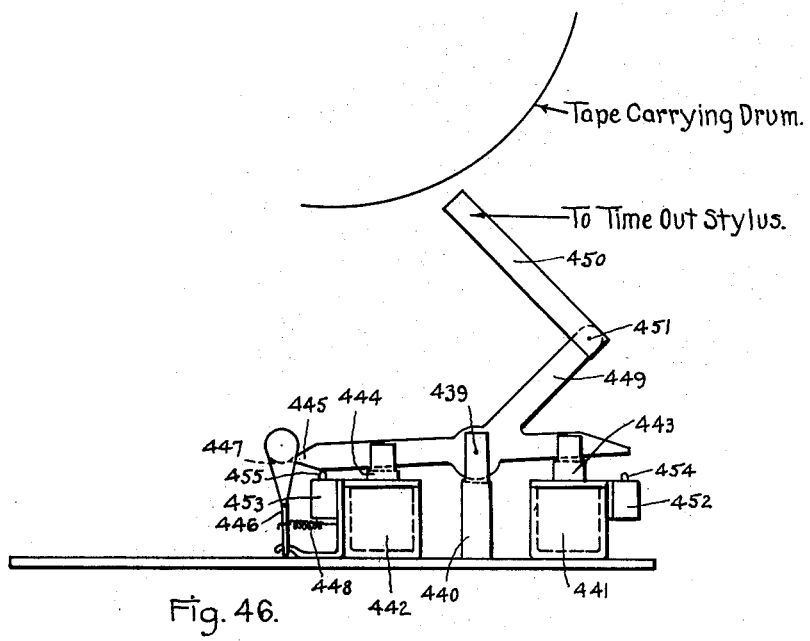

Figure 6 shows an end elevation of the chassis of the signalling unit on enlarged scale as compared to figures 2 and 4, and is a cross-section taken on the line 6—6 of Figure 4, looking in the direction of the arrows; the locking dog and tooth being in the position they occupy just prior to the locking engagement at zero position, and the microswitch being shown in its thrown position;

Figure 7 shows a fragmentary cross-section taken on the line 7—7 of Figure 4, but on enlarged scale as compared to Figure 4, and it shows the tooth moved slightly beyond the position of Figure 6 and into locking engagement with the dog to lock the off-bottom counter at its zero position;

Figure 8 shows a fragmentary section taken on the line 6—6 of Figure 4, but on enlarged scale as compared to Figure 4, and it shows the microswitch and the dog rocked outwardly from possible engagement with the tooth and the cam, respectively, into such a position as these parts, microswitch and dog, occupy when the off-bottom counter stands at any position other than its zero position; so that when the off-bottom counter is at other than its zero position the off-bottom counter shaft may rotate backwardly, corresponding to increasing off-bottom measurements, as many rotations as may be necessary during the off-bottom condition, and without interference of the microswitch and the dog with the cam and the tooth, respectively;

Figure 9 shows another fragmentary section taken on the line 6—6 of Figure 4, but on enlarged scale as compared to Figure 4, but with the tooth locked definitely to the dog, and with the cam in final switching engagement with the microswitch, being the final dead-locked condition of the off-bottom counter at its zero position, and being a position of these parts just slightly after the position shown in Figure 6;

Figure 10 shows a fragmentary end view of the off-bottom counter looking at the right hand end thereof, and being substantially a section taken on the line 10—10 of Figure 4, looking in the direction of the arrows, but on enlarged scale as compared to Figure 4;

Figure 11 shows a cross section taken on the line 11—11 of Figure 4, looking in the direction of the arrows, but on enlarged scale as compared to Figure 4, and it shows the drive to the total depth counter including the idler gear of such drive;

Figure 12 shows a cross section taken on the line 12—12 of Figure 4, looking in the direction of the arrows, but on enlarged scale as compared to Figure 4, and it shows the friction gear drive to the off-bottom counter shaft, and it also shows the direct gear drive which is used for driving the off-bottom counter shaft in place of the back-gear or idler gear drive which is used for the total depth counter drive shown in the arrangement of figures now being described;

Figure 13 shows a cross section taken on the line 13—13 of Figure 4, looking in the direction of the arrows, but on enlarged scale as compared to Figure 4, and it shows the resilient or spring coupling connection between the driven shaft of the dead-line clutch and the driving shaft of the off-bottom clutch, and it also shows the full-foot microswitch which is driven by the total depth counter shaft, and which microswitch delivers the full foot signals to the recording mechanism or other suitable receiving apparatus;

Figure 14 shows a fragmentary section taken on the line 14—14 of Figure 3, looking in the direction of the arrows, and on enlarged scale as compared to Figure 3, and the central portion of the figure is broken away to reduce the size of the figure; and this figure shows in detail the main measuring pulley and the idler pulley over both of which the operating cable passes;

Figure 15 shows a detailed section through the door whereby access is had to the counters for manual or hand presetting thereof, and this figure is a section taken on the line 15—15 of Figure 2, looking in the direction of the arrows, but on enlarged scale as compared to Figure 2;

Figure 16 shows a cross section through the hold-back clutch by which retrograde or backward rotational movements of the total depth counter are prevented; and Figure 16 is a section taken on the line 16—16 of Figure 4, looking in the direction of the arrows, but on enlarged scale as compared to Figure 4, and it is also a section taken on the line 16—16 of Figure 17, looking in the direction of the arrows;

Figure 17 is a cross section taken on the line 17—17 of Figure 16, looking in the direction of the arrows;

Figure 18 is a cross section taken on the line 18—18 of Figure 4, looking in the direction of the arrows, but on enlarged scale as compared to Figure 4; and it shows in face view the friction drive gear for drive of the total depth counter with sufficient force to ensure correct and dependable counting functions of said counter, but nevertheless permitting the units order digit of that counter to be manually adjusted or pre-set to a selected reading prior to commencement of a set of readings, and even when the off-bottom clutch is engaged, which is the intended condition when "on bottom";

Figure 19 shows a cross section taken on the line 19—19 of Figure 18, looking in the direction of the arrows;

Figure 20 shows a fragmentary section taken on the line 20—20 of Figure 4, looking in the direction of the arrows, but on enlarged scale as compared to Figure 4; and Figure 20 shows in face view the friction drive gear for drive of the off-bottom counter in the off-bottom increasing direction, and for drive of that counter in the on-bottom direction, and towards the zero position when "off bottom," and for permitting rotational movements of the driven shaft of the dead-line clutch when the off-bottom counter is at its zero position and locked;

Figure 21 shows a cross-section taken on the line 21—21 of Figure 20, looking in the direction of the arrows;

Figure 22 shows a front face view of the total depth counter which is also shown in Figures 2 and 4, but on enlarged scale as compared with those figures; and Figure 22 shows both the several ordinal disks as well as the special micrometer disk which makes one rotation for each full foot drilled, and which micrometer disk has its periphery graduated to show directly hundredths of a foot, and may be interpollated to show thousandths of a foot; and the several ordinal disks as well as the micrometer disk shown in Figure 22 may be individually manually set or corrected to specified settings or readings, as at the commencemet of a series of operations, for example when the equipment is installed for producing records for that portion of a drilling operation to occur below a specified depth of commencement of the recordings;

Figure 23 shows a left-hand end view corresponding to Figure 22, being a section taken on the line 23—23 of Figure 4, looking in the direction of the arrows; and this figure shows the microswitch for giving the full foot signals, and the cam carried by the counter shaft for actuating such microswitch at completion of each full foot of drilling new bore hole;

Figure 24 shows a front face view of the off-bottom counter which is also shown in Figures 2 and 4, but on enlarged scale as compared with those figures; and Figure 24 shows, in addition to the various ordinal disk features which are shown in Figure 22 for the total depth counter, the special means to ensure correct functioning of the locking element when zeroizing and the proper operation of the off-bottom microswitch when the off-bottom counter is at either its zero position or at some "off-bottom" counted position, no matter how much or how little that off-bottom count may be;

Figure 25 shows a fragmentary cross-section taken on the line 25—25 of Figure 24, looking in the direction of the arrows; and this figure shows a detail of the pawl and internal gear or rack arrangement for drive of the digital element and knurled rim of the same order as that of said pawl, which pawl and rack arrangement permits individual digital setting of the reading of the counter order, but ensures sufficient drive force to produce drive from order to order during carrying operations to all higher orders of the counter, during normal registering operations;

Figure 26 shows a cross-section taken on the line 26—26 of Figure 24, looking in the direction of the arrows, namely, looking in the direction opposite to the showing of Figure 25;

Figure 27 shows a front elevational view of one of the clutches shown in Figure 4 and also in Figures 5 and 11, but on enlarged scale; and the clutch shown in this figure is one in which the shift of the clutching action to either the clutching or the unclutching position is produced by an impulse of current, with prompt cut-off of current after such impulse, and the holding action produced at either the clutched or the unclutched position is effected by use of a high permeability, high retentivity permanent magnet;

Figure 28 shows an end view of the clutch illustrated in Figure 27;

Figure 29 shows a longitudinal section through the clutch design shown in Figures 27 and 28, the shifter element being shown in its right-hand moved or driving position, the braking element being disengaged to permit rotation of the said element and thus to also permit rotation of the driven shaft; and in this figure the permanent magnet, such as an Alnico magnet, at the left-hand side of the unit is shown in engagement with the stationary "armature" to which it magnetically locks at conclusion of shift in the direction to carry such permanent magnet into engagement with such armature, so that the clutch will be retained in its thus shifted position without need of continued energization of the shifting magnet;

Figure 30 shows a cross-section taken on the line 30—30 of Figure 29, looking in the direction of the arrows; and this figure shows that the shifter yoke by which the clutching element is shifted back and forth is itself pivoted to the operating yoke for rock about an axis above the axis on which the operating yoke rocks, to thus produce a strong shifting action on the shifter yoke by exertion of a much larger shifting action on the operating yoke; and in this figure I have also shown the supplementary spring toggle elements by which the holding actions in either direction of shift are augmented;

Figure 31 shows a wiring diagram of the signalling unit, but this figure shows such wiring diagram when the signalling unit is provided with differential clutches of the type shown in Figures 32 to 42, inclusive, which differential clutches are provided with microswitches for cutting of the current delivered to either shifting magnet of one of such clutches shortly before completion of the clutch's movement in the direction dictated by such magnet, to thus ensure the production of the clutch operations by very short impulses of current;

Figure 32 shows a front elevational view of another form of clutch which may be used in the type of signalling unit illustrated in Figures 2 to 26, inclusive, in place of the permanent magnet type of clutches shown in Figures 27, 28, 29, and 30; and the clutch shown in Figure 32 is provided with a differential element to the opposite ring gears of which unit the driving and driven shafts are connected, as disclosed in my said earlier patent, No. 2,671,346; but the clutch shown in Figure 32 and other figures has been modified to better adapt such type of clutch to the overall arrangement of signalling unit specifically illustrated in this case, and to incorporate certain features of clutch construction not disclosed in that issued patent;

Figure 33 shows a rear elevational view corresponding to Figure 32; and Figure 33 shows the microswitch terminals;

Figure 34 shows a left-hand end elevation corresponding to Figure 32, being the driving or input end of the clutch;

Figure 35 shows a plan view of the clutch of Figures 32, 33 and 34 and other figures;

Figure 36 shows a longitudinal section through the clutch of Figures 32, 33, 34 and 35, and other figures; and in this figure the left-hand portion of the horizontal rock arm has been broken away for clarity of illustration of elements to the rear of such arm; and in Figures 32 and 36 the left-hand shaft is the driving shaft, and the right-hand shaft is the driven shaft;

Figure 37 shows a right-hand end elevation of the clutch shown in Figures 32 to 36, inclusive;

Figure 38 shows a cross-section taken on the line 38—38 of Figure 36, looking in the direction of the arrows; and this figure shows the rock arm which carries the microswitch at one side of the unit, and also shows the means to adjust such rock arm to bring the microswitch operating stud into correct adjustment for microswitch throw at the proper time in the clutch changing movements;

Figure 39 is a cross-section taken on the line 39—39 of Figure 36, looking in the direction of the arrows; and this figure shows the rock-arm in cross-section, and shows the small toggle pins which are engaged by such rock-arm and work against the sockets of brake-shoe lugs to force such lugs apart and thus release the brake shoes from the shaft drum on which they exert gripping action at the proper times; and in this Figure 39 the portion of the rock-arm which engages the toggle pins therein shown is in its raised position, thus allowing the toggle pins to tilt upwardly sufficiently to permit the lugs of the brake shoes to be forced together far enough to bring the brake shoes strongly against the shaft drum under spring pressure for the holding action;

Figure 40 shows a fragmentary section corresponding to a portion of Figure 39, but on enlarged scale as compared to Figure 39, and with the parts in the same positions as are shown in Figure 39 to better show the toggle actions produced by the small toggle pins when acted on by the rock arm at the location where said pins engage sockets of that rock arm;

Figure 41 shows a view similar to that of Figure 40, but with the rock arm in its reversed position, to thus cause the small pins to have their inner ends shifted down and beyond dead-center position, with corresponding forced separation of the brake shoe lugs sufficiently to release the brake shoes from the shaft drum, and in this figure the pins have had their inner ends moved down far enough to produce a toggle locking action, having moved past dead-center so that the brake shoes will be held in their non-gripping positions;

Figure 42 shows a perspective rear view of the rock-arm and the solenoid operating elements therefor, and the microswitch for the far side of the structure, the brake-shoe lugs, the small toggle pins for the near side of the structure, and other related elements, being on enlarged scale as compared to other figures;

Figure 43 shows in elevation a typical construction of "spring unit" of well known design and which is extensively used at the present time, which spring unit is provided with a swivel or rotatable connection between its supporting and supported elements, with the compression spring between such elements, the supported element being provided with a locking hook for engagement with the bail on the "swivel joint" by which the mud under pressure is delivered to the kelly; and in this construction of "spring unit" the supported element moves in exact harmony and exactness of movement with the kelly and thus with the drilling string when said string is connected to the kelly; and this construction of "spring unit" is also provided with laterally separated eyes which sustain the "elevators" and which eyes are also connected to the supported element of the "spring unit" so that the elevators also move in exact harmony and exactness of movement with the drilling string when said elevators are gripped to the drilling string and are in engagement with the upper collar of the top joint of such string; and this figure shows means to connect the small cable by which the signalling unit is operated in accordance with the drilling string movements up and down, to the supported element of the "spring unit"; and in this figure such connecting means takes the form of a block of highly magnetized Alnico metal, or other form of strong permanent magnet, set onto and magnetically gripped by the top face of the supported element of the "spring unit"; and this figure also shows means to release such powerful magnet from the "spring unit" when the operations have been completed, such means including a screw carried by the magnet element and so located that when the releasing operation is to be performed such screw may be forced against the face of the top of the supported element of the "spring unit" by a few turns of such screw;

Figure 44 shows a plan view of a plate which may be set into the lower portion of a conventional "geolograph," such plate carrying operating elements which may be connected to the "foot kick" stylus and the "time out" stylus of such geolograph so that said styluses may be operated by causing the operating elements to function according to signals of completion of full feet of drilling, and signals of "time out," to produce a conventional geolograph record, but by use of signals accurately produced by and transmitted from the signalling unit to the operating elements carried by such plate; thus making it possible to convert a conventional geolograph type recorder into a fully automatically operated recorder of such geolograph type;

Figure 45 shows a front elevation corresponding to Figure 44;

Figure 46 shows a side elevation corresponding to Figures 44 and 45; and

Figure 47:
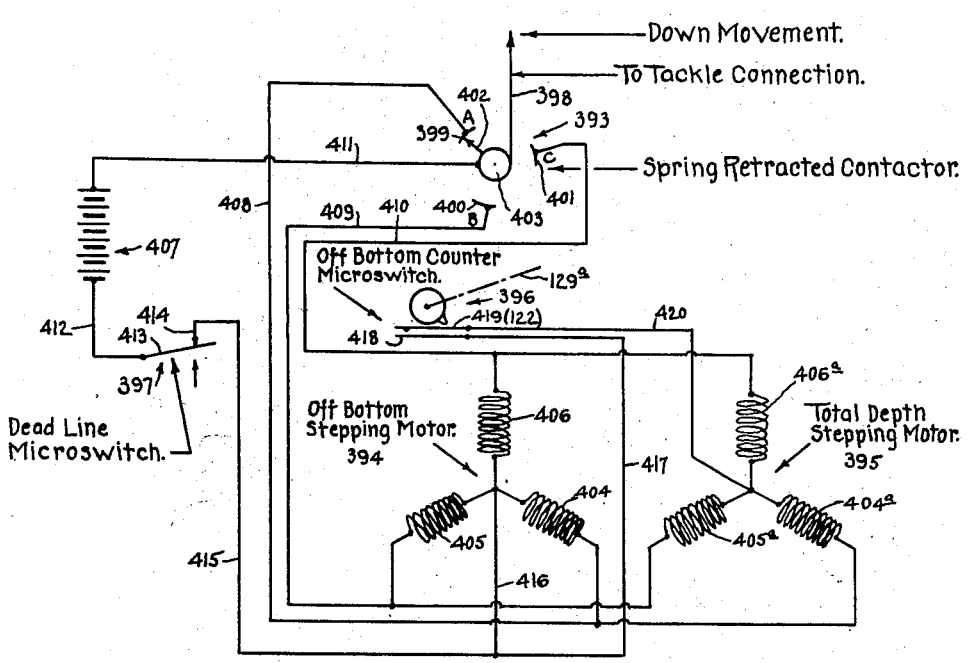

Figure 47 shows schematically a simple form of wiring diagram which may be used for control of impulses sent to two stepping motors substituted for the dead-line clutch and the off-bottom clutch of the signalling unit, which clutches have been previously referred to; and the arrangement shown in Figure 47 will ensure operations of the off-bottom counter and the total depth counter in accordance with the principles hereinbefore set forth.

The signalling unit herein disclosed is intended for producing and forwarding various signals concerning the movements of the drilling string. These signalling units may be mounted on or close to the derrick, in which case the signalling unit may be directly driven by a small flexible cable having one end connected to a suitable element of the tackle so that the cable movements correspond to the movements of such tackle element. Such cable may then be run over suitable guide pulleys mounted on the derrick, and over a calibrated pulley of the signalling unit. This calibrated pulley is accurately calibrated so that it makes exactly one rotation per unit of cable length passed over the pulley under the cable tension which is used, or such pulley may be larger so that its calibrated circumference is a full multiple of two or more units of cable length. These units of cable length, generally feet, correspond to drilling string movements. The free end of the cable is carried to a suitable retracting unit of design to maintain such cable under the desired tension. Conventionally such retracting unit may be a counterweight travelling on a trolley line which is more or less vertical, or any other suitable form of retractor may be used. In said issued patent I have disclosed spring retracting means in the form of a drum on which the free end of the cable is wound, such drum being provided with spring means urging drum rotation in the proper direction to retain the cable under tension. Such a form of retractor may be used in place of the counterweight type; or any other suitable retractor may be substituted in place of those above suggested.

In the drawings presently to be described in detail I have shown details of a signalling unit which is provided with such a calibrated pulley arrangement; but alternatively, I have also shown in Figure 47 a schematic wiring diagram of a form of shaft drive for the signalling unit, in which alternative form I have provided "stepping" motors, or other suitable selsyn type drives, such motors being connected to the registering mechanisms of the signalling unit so that back and forth rotary movements of these motors which will be produced by contactor signal impulses delivered from a contactor on the derrick, will cause the signalling unit to function strictly in accordance with the tackle movements when such tackle movements are "significant," that is, correspond strictly to the up and down movements of the drilling string. Such a "stepping" motor form of drive is disclosed in that earlier patent, No. 2,671,346, but in Figure 47 of this case I have disclosed a modification of the stepping motor drive and I have also included in the arrangement of Figure 47 features of such stepping motor drive additional to those of that earlier patent. I wish here to call attention to the fact that when such a stepping motor drive, or a selsyn drive is used for rotating the shaft or shafts of the signalling unit back and forth, the signalling unit may be located either on or near the derrick, or removed from the derrick to a convenient location to which the electric impulses may be delivered for operation of such signalling unit.

Regardless of whether the signalling unit's shafts be cable driven or electric motor driven, it is an important object and feature of the present invention to provide a signalling unit of relatively small size and compact design, and comparatively light weight, so that it may be readily carried by one hand to the intended point of location during its signal producing functions. It is a further object to provide a signalling unit which can be readily installed at the selected location, and quickly connected to other elements of the recording and signalling equipment.

In Figure 2, which is a front elevation of the signalling unit, there are provided the two openings 50 and 51, through which full feet registered by corresponding "total depth" and "off-bottom" counters may be seen when an inspection is to be made. Alongside of these two openings there are provided the vertical narrow openings 52 and 53 corresponding to the counters just referred to. Through these openings 52 and 53 there are visible peripheral portions of indicating disks 54 and 55. These disks carry peripheral markings of decimal portions of single feet; and, as will presently appear, each disk makes one rotation for each full foot increment. Accordingly, these disks are provided with markings showing tenths and hundredths of a foot, and readings may be interpolated to thousandths of a foot.

The openings 50, 51, 52 and 53 are provided in a door 56 whose upper edge is hinged to the front plate of the housing by the piano type hinge 57ª (see Figures 2 and 15). Any suitable form of locking device, such as the knurled stud 57 may be provided for normally retaining the door in its locked closed position; and suitable water tight means may be provided to ensure against entrance of water and dust, etc. to the interior of the signalling unit. The front plate of the housing is designated 58 and comprises a portion of the tight housing within which the operating elements are contained.

The provision of the hinged door 56 in front of the locations of the counters makes it possible for the operator or other authorized person to gain access to the digital orders disks of the counters, if need be, to set or re-set the readings of such counters. Such a setting operation would generally be required at commencement of a recording operation, since the signalling and other equipment would generally be installed and connected for normal operation when the bore hole had already been drilled to a substantial depth. Knowing the bottom depth of the already drilled portion of the hole, the total depth counter may be pre-set to read that depth amount. Also, knowing the distance that the bit is off bottom at the time of setting the equipment into operative condition, the off-bottom counter may be pre-set to read that off-bottom amount. Thereafter, the signalling unit having been properly connected up to the tackle element, proper functioning will occur, and the two counters will indicate at any time the values of the measurements assigned to them. The details of these functions, and the means provided for their attainment will presently appear.

In Figure 2 the "full foot" pulley 59 is shown mounted on a horizontal shaft, the small end of which projects at the point 60. An idler pulley 61 is also shown directly above the full-foot pulley, and also carried by a horizontal stub shaft the details of which will presently be explained. It is noted that the pulley 59 is provided with a single peripheral groove 62, whereas the idler pulley is provided with two grooves side by side, 63 and 64. When the pulley arrangement is used for drive of the signalling unit it is very important that no slip occur between the cable and such pulley as any such slip would necessarily result in erroneous measurements of increments of depth, either down or up as the case may be. The provision of the idler pulley located close to the full-foot pulley makes it possible to lace the cable over these two pulleys in a "figure eight" as shown by the dot and dash lines in Figure 3 which is a left-hand elevational view corresponding to Figure 2. In that figure I have indicated by arrows the directions of cable movement corresponding to drilling down or to lowering of the drilling string. The full-foot pulley is then rotated counterclockwise in Figure 3, the idler pulley rotating clockwise at such time. For up movements of the drilling string the directions of rotation would, of course be reversed.

The provision of the idler pulley with the cable laced as shown, ensures a full three-quarters revolution wrap of the cable on the full-foot pulley with corresponding large gain in the holding or gripping power of the cable on the pulley for a given cable tension at the following end of the cable so that possibility of slip is practically eliminated as long as a hold back force of appreciable amount is provided on the cable. It is also seen, from examination of Figure 2 that the two runs of the cable between the two pulleys are separated sufficiently, due to the lateral displacement of the two idler grooves from each other, to prevent any contacting of such runs with each other. Accordingly, there is produced no frictional contact between the two cable runs, and no wear of the cable is produced.

Preferably a flap of flexible, water-proof material, 65, is secured to the front plate of the housing, 58, above the piano hinge 57 to protect that hinge, and to prevent ingress of water to the housing interior at the location of the hinge. The details of the construction of the door 56 will be further explained hereinafter.

Reference may now be made to Figures 3 and 4, Figure 4 being a front interior elevational view of the structures in their assembled relations, the front plate 58 being mostly broken away. The frame of the unit includes a base plate or bar 66 of considerable stiffness to hold the counters and other elements in good alignment notwithstanding severe shocks to which the unit will probably be subjected in normal service. On this base plate there is set a "chassis" plate 67 which extends most of the length of the interior of the unit. Such chassis plate is secured to the base plate rigidly by suitable screws or the like (not shown). The two clutches (or stepping motors in an alternative arrangement) are mounted on and secured to this chassis plate. Likewise, the spring coupling element, when provided, is accommodated between two brackets extending up from the chassis plate, and which brackets in such case provide bearings for the proximate end portions of the driven shaft of the dead-line clutch and of the driving shaft of the off-bottom clutch, when such clutches are used. This chassis arrangement will be further described presently.

Extending up from the left-hand portion of the base plate or bar 66 is the bracket bar 68. This bar is of substantial strength and is preferably welded to the base bar 66 to ensure very strong connection thereto. This bar carries the supports and bearings for the full-foot pulley and the idler pulley. Reference is invited to Figure 14 which shows the details of these parts. The idler supporting stud 69 has its right-hand end portion set through the bracket bar as far as permitted by the rib 70 formed around such stud; and the screw 71 is set through a washer 72 and threaded tightly into the inner end of the stud, to draw the stud's rib 70 firmly against the outer face of the bracket.

The double ball bearing unit 73 is seated on the stud and the lock or retainer 74 is threaded onto the outer end of the stud to clamp the inner race-ways of the ball bearings against the rib 70. The idler pulley is seated on the outer race-ways of the ball bearings with a tight fit. The inner face of such idler pulley is provided with the inwardly projecting flange 75 which spaces the pulley on the bearings; and preferably an oil retaining ring 76 is set against the outer ends of the bearings, having its outer periphery seated into a groove formed in the pulley flange 77. With this arrangement it is seen that all forces imposed on the idler pulley by the pulls of both ends of the cable are transmitted directly to the bracket 68 through elements well able to receive and transmit such forces. None of such forces reach the interior of the unit.

A bushing 78 is set through a substantial opening of the bracket bar 68 with a tight fit, to bring the flange 79 of such bushing securely against the inside face of the bracket bar and the screws 80 are run through the flange into the bracket bar to hold the bushing securely to the bracket bar. The full-foot pulley has its hub portion closed and provided with an inwardly extending cup recess 81. The double ball bearing 82 is set into this recess, the inner race-way of such ball bearings being seated on the outer portion of the bushing and up to the shoulder 83 of the bushing, and the outer raceway of the ball bearings being set into the pulley recess with a press fit. A small shaft element 84 has its outer end passed through the closed end of the recess of the pulley, to the location of the shoulder and taper 85; and a nut 86 is threaded onto the projecting end of such small shaft, the washer 87 being first set onto the shaft. Thus this small shaft is securely fastened to the full-foot pulley with a tightness sufficient to ensure that such small shaft shall always exactly follow the back and forth rotations of the pulley.

A small thrust ball bearing 88 is set around the inner end of the shaft 84. The shaft is provided with an outwardly extending flange 89 which bears against the right-hand raceway 90, and the left-hand race-way 91 sets against the washer 92 which is set around the shaft and against the inner face of the bracket bar. This arrangement prevents any outward withdrawal of the full-foot pulley from the bracket bar without removal of the nut from the shaft 84. In Figure 14 it is seen that the small shaft projects some distance to the right of the thrust bearing, thus affording a shaft section which may be connected to the drive shaft of the dead-line clutch, as will presently appear.

Study of the above disclosed supporting means for the full-foot pulley will show that the forces to which it is subjected by cable tensions and jerks are transmitted directly to the bushing 78 and thence directly to the bracket bar 68 and to the base plate. None of these forces (except very small rotative forces needed to rotate the small shaft 84 are transmitted to that shaft. Since the washer and the inner race-way 91 of the thrust bearing are not secured to the inner face of the bracket bar but merely rest against that face, it follows that any slight misalignments of the shaft 84 may readily be accommodated by slight lateral shifts of the washer and thrust bearing with respect to the bracket bar, and without imposing any improper forces on any other parts. The connection of the inner or right-hand end of the shaft 84 to the driving shaft of the dead-line clutch is effected by a pin and slot or like connection, permitting slight misalignments to be accommodated, but without any rotational play between the parts, driving and driven shaft elements.

The forces transmitted to the full-foot pulley by the cable include those due to sudden starts and stops of the drilling string, the draw works, and the tackle, etc. It is to be noted that the rotational inertia of the moving parts of the signalling unit is very small, since said parts include only light elements and their moments of inertia are small in all cases. Accordingly, these parts of the signalling unit may be readily started and stopped quickly without need of application of large forces. However, the free end of the cable which passes over the full-foot and idler pulleys is connected to a retracting unit, such as a counterweight of considerable mass (for example, fifty pounds or more). All starts and stops of the cable must therefore be influenced by this large mass, and forces of corresponding size must be developed in the cable to cause the necessary rapidity of starts and stops of the cable and the counterweight. If, for example, the driller should suddenly release the draw works brake, thus allowing the drilling string to settle down into the hole substantially without opposition at the draw works, it is evident that a large acceleration of the drilling string and connected parts will occur. Since the drilling string is of mass many times as great as that of the counterweight it is evident that the counterweight will have to accelerate substantially at the full gravitational rate of acceration and will develop an inertia force substantially as great as its own mass. Thus, under such conditions the cable will be subjected to very large variations of pull, and the full-foot pulley must at all times take care of such forces without being over-strained. The design thus far explained is amply able to accomplish these results.

In the particular embodiment shown in Figures 2, 3, 4, 5, 6 and others, I have provided an end bracket 93 at the right-hand end of the chassis, and another end bracket 94 at the left-hand end of the chassis, both of these end brackets being mounted on the chassis and extending upwardly far enough to support various of the operating elements. Through rods 95, 96 and 97 are extended lengthwise of the chassis between the brackets 93 and 94, and the off-bottom and total depth counters are suspended from these rods. Suitable lock nuts are provided on these rods to grip the brackets at correct spacing and thus produce a rigid self-contained structure by which to support the counters.

The off-bottom and total depth counters are designated 98 and 99, respectively. The off-bottom counter is shown on enlarged scale in Figure 24, and Figures 25 and 26 show certain elements in greater detail; and the total depth counter is shown on enlarged scale and in front and end elevations in Figures 22 and 23, respectively. The off-bottom counter shown in Figure 24 includes the end plates 100 and 101 which are joined together by endwise extending tie rods or the like, so that the operating elements of such counter are properly supported. In the particular showing of Figure 4 the left-hand end plate of the off-bottom counter is merged with the left-hand bracket 94, but it is evident that such left-hand end plate of the off-bottom counter may alternatively be a distinct plate as shown in Figure 24. This counter is provided with a number of numerical orders sections for units, tens, hundreds, etc., to meet the depth requirements and measurements to be made by the equipment. Usually five digital orders sections will be provided as shown in the figures, corresponding to a possible reading of 99,999 feet. Each of these orders sections includes a driving gear 102 at its right-hand end, and a cylindrical hollow element just to the left of such gear, such cylindrical element being numbered 103. The outer cylindrical surfaces of each of these elements 103 is provided with decimal numerical markings as shown. To the left-hand end of each of these elements 103 there is secured or formed a rib portion 104 which is preferably knurled so that the corresponding digit carrying element 103 may be manually advanced or retarded to produce the desired pre-setting position. Conveniently the foregoing parts are shown as numbered with suffixes "a," "b," "c," "d," and "e," corresponding to the several numerical orders.

The inside cylindrical surface of each of the elements 103 is provided with or carries numerous small teeth, as shown in Figure 25. These teeth are preferably of rather small radial dimension. Preferably there are several such teeth for each digit of the element, being thus a full multiple of ten such teeth in all. The gears 102 are provided with leftwardly extending pins 105 (see Figures 25 and 26) on which are pivoted the small dogs 106. These dogs are held in engagement with the surrounding toothed surfaces by leaf springs 107 whose tails engage small pins 108 also carried by the gears 102. This arrangement is such as to allow manual setting of any one or more of the elements 103 to the proper digital reading position, without need of corresponding rotation of the related gear 102. The springs 107 are strong enough to ensure drive from each gear to its element 103 under sufficient power to cause such element 103 to advance with gear advancement, even when a carrying operation is being effected during either an increasing or a decreasing off-bottom count. Nevertheless, it is possible to manually pre-set any one of the elements 103 by hand engagement with the corresponding knurled rib 104, the dog being forced back against its spring each time a tooth passes.

Extending between the end plates 100 and 101 of this counter there is a rod 109 on which is journalled a pinion 110 at location to overlie the proximate end portions of two successive digital elements. Each of these gears is permanently meshed with the adjacent gear element 102, and overlies the next lower order element to a position such that a single tooth carried on the left-hand face of such element may engage the corresponding gear 110 at completion of the ninth digital movement of the lower order element. Thus tens are carried in the conventional manner.

There is a thin disk 111 secured to the left-hand end of each of the elements 103. These disks are of diameter to project beyond the radii of the knurled ribs 104 as shown in Figure 25. A rock rod 112 extends between and is journalled in the end plates 100 and 101 of the off-bottom counter. This rock rod appears in Figures 4, 6, 7, 8, 9, 24, 25 and 26. To this rod at locations between the end plates 100 and 101 there are secured the forwardly extending rock arms 113 and 114. An endwise extending rod 115 is secured to the outer ends of these rock arms and overlies all of the thin disks 111 as indicated in Figures 25 and 26. Preferably short rollers 116 are set onto this rod 115 at the locations of the disks 111 to ensure easier functioning of the parts. Each of the disks 111 is provided with a notch 117 into which the corresponding roller 116 of the rod 115 may seat provided that the notches of all of the disks 111 have been brought into alignment at the location of the rod 115. Such alignment occurs only when all of the orders disks stand at their zero reading positions so that the rollers 116 may all fall into the corresponding notches at the same time. When this occurs a spring 118 having one end connected to the stud 119 carried by the rock rod and its other end connected to the adjacent end plate 100 acts to ensure drop of the rod 115 as far as permitted by seating of the rollers to the floors of the notches. This results in clockwise rock of the rod 112 in Figures 6, 7, 8, 9 and 26, and counterclockwise of such rod in Figure 25. Contrarily, whenever any one of the thin disks 111 moves away from its zero position the rock rod 112 and related parts will be rocked back into their earlier position of rock. Of course, such return rock can occur only when the units orders section moves away from its zero position, representing a slight off-bottom movement of the parts. The rock shaft 112 projects to the left of the end plate 100, as shown in Figure 24. An arm plate 120 is secured to this projecting shaft portion and projects forwardly and downwardly as shown in Figures 6, 8 and 9. For this purpose said arm plate is provided with the rearwardly extending ear 121 at its edge closest to the end plate 100. This arm plate 120 carries a microswitch unit 122 of conventional form having the stud 123 which, when pressed towards the arm plate, serves to reverse the microswitch with a snap action. The microswitch is provided with a biased leaf contact element 124 which, when pressed inwardly (to the right in Figure 6) (being the position shown in Figure 6), snaps leftwardly to separate the contacts 124 and 125, such contacts being in their separated condition in Figure 6. It is here noted that in said figure the microswitch stud 123 has been pressed to the right, thus throwing the contacts into their separated condition against the normal bias of the leaf contact element. As soon as said stud is permitted to move to the left in Figure 6 the bias of the leaf contact will cause said leaf to reverse, carrying the contact 124 into engagement with the contact 125. The control of the stud 123 is effected by a cam element rise 127 of the cam block 128 carried by a shaft 129. This shaft is a one foot shaft, that is, it makes one complete rotation for each foot of movement. Thus it makes one complete rotation for each rotation of the full-foot pulley 59 already discussed. The gearing and other connections between the shaft 84 of the pulley, and the shaft 129 will be explained presently.

The shaft 129 is located at about the mid plane (vertical) of the signalling unit—that is, about half way to the back face of such signalling unit. The shaft 129 extends past the numerical orders elements already explained in connection with Figures 24, 25 and 26. In this connection it will be noted that the elements of the numerical orders are of comparatively small diameter, as shown by the dotted circle 130 in Figure 15. That circle indicates the sizes of the orders disks in comparison to the openings 50 and 51 through which the footage readings of the counters are shown. Now the right-hand end of the shaft 129 carries the one foot disk 55 already referred to, and shown in Figure 2 as well as other figures. Since the shaft 129 extends past the rear portions of the orders disks it is necessary that such one foot disk 55 be of size large enough to bring its front peripheral portion, carrying the footage reading which is to be read, into substantial forward alignment with the forward portions of the numerical orders disks. This relationship is shown in Figure 15, wherein the large and small dotted circles come together at their front portions, and at the locations where their footage readings are to be made. The comparatively large size of this one foot disk is an advantage since it makes it possible to obtain relatively large separations between successive hundredths of a foot markings as is evident from examination of Figure 24.

A gear 131 is secured to the right-hand face of the one foot disk 55, both said gear and the disk being thus secured to the one foot shaft 129. This gear is driven by a one to one ratio by another gear presently to be described, under control of the deadline clutch 98 and a friction drive which will also be revealed.

It now remains to show how the rotations of the one-foot shaft 129 are communicated to the units order section of the numerical orders disks and the gears already described. This drive must be such as to produce a one to ten ratio between the units orders disk and the shaft 129, since said shaft makes one complete rotation for each foot, whereas the units order section elements make one complete rotation for each ten feet of tackle movement, it being noted that the digits shown around the units order cylindrical surface 103ª are full feet. A rod 132 extends through all of the numerical orders elements of the off-bottom counter, said rod being supported by the end plates 100 and 101, it being noted that the full foot disk 55 lies to the right of the right-hand end plate 101. Suitable sleeve spacers are set onto this rod between the successive orders elements. The right-hand or units orders gear 102ª is directly connected to a like gear 133 by a short neck 134, such neck and the gear 133 being journalled on the rod 132 and free to rotate thereon. A pinion 135 is secured to the one foot shaft at a location rightwardly of the gear 133. On the rod 104 which carries the carrying pinions 110 there is mounted a double gear and pinion element, including the pinion 136 in planar alignment with the gear 133 and meshing with said gear 133. Said pinion 136 is connected to a gear 137 by a short neck 138, and the gear 137 meshes with the pinion 135 of the one foot shaft. The gear ratios 135 to 137 and 136 to 133 are such that, multiplied together they produce a reduction of ten to one from the one foot shaft 129 to the gear 102ª of the units order section. That is the correct ratio.

It is noted that by the arrangements thus far described there is a positive drive from the one foot shaft to the units orders section for either direction of rotation of such one foot shaft. Accordingly, the counter will count both up and down, according to the direction of one foot shaft rotation.

Again considering the showing of Figure 6 and other figures showing the microswitch and related elements of this off-bottom counter, it was previously stated that said counter locks at its zero reading position when counting down. It has also been shown that the microswitch is thrown to its reversed position (against its spring leaf bias) at the instant of such zeroing of the counter. It remains to show how that counter is locked at its zero position so that even when a driving force is exerted tending to continue the down readings of such counter to values below zero, the counter will nevertheless be held and locked at such zeroed position. This function is produced as follows;

The full foot shaft carries a hook element or hook shaped cam 139 having a tooth 140 facing in the down movement direction. The rock shaft 112 carries a downwardly depending hook 141 lying to the right of the plate 120 which carries the microswitch, such hook lying in planar alignment with the hook cam 139. Whenever the shaft 112 is rocked into the position shown in Figure 6, being its position when all of the orders disks have been zeroized so that all of the notches 117 have come into alignment, the hook element has been rocked in towards the one foot shaft far enough so that when the shaft completes its rotation to the zero reading position the cam hook will come into engagement with the rock hook 141 and arrest further shaft rotation exactly at the zero reading position. At the same time, or substantially the same time, the high point 127 of the microswitch cam element will cause the microswitch to throw into the position shown in Figure 6, and thus both operations of locking the off-bottom counter at its zero position, and reversing the microswitch contacts will occur at substantially the same time.

It is to be noted that the rocks of the shaft 112 in both directions occur during the last half revolution of the one foot shaft approaching and leaving its zero position. Accordingly, when approaching the zero position and for all rotations of the one-foot shaft prior to such approach, both the microswitch and the hook element 141 occupy the positions shown in Figure 8 such that for all rotations of the one-foot shaft more than substantially one-half foot off-bottom both the microswitch element and the hook element are retracted far enough to avoid engagement by the microswitch cam element 127 and the hook element 140, respectively. Thus when making extensive off-bottom movements there is no interference between the microswitch actuating cam and the microswitch, nor between the hook and the hook engaging element, so that the one-foot shaft is free to execute unlimited amounts of off-bottom movement and function in intended manner to take care of any amount of off-bottom movements.

It is here noted that the design of cam element 127—128 shown in various figures is such as to produce very close controls of the microswitch operations in both directions. As hereinbefore pointed out it may in some cases be desirable to provide such switching arrangements that during approach to the zero position a signal shall be given for shifting the off-bottom clutch to clutched position at exactly the footage position (of the off-bottom counter) at which zero reading of that counter is attained, whereas, when going off bottom there may be a slight delay in the operation of that microswitch; the slight footage off-bottom which occurs during such delay being taken up or accounted for by the functioning of the spring coupling hereinafter to be described. I shall presently disclose a modification of the cam element for the microswitch by which this desirable result may be attained.

The total depth counter 99 is shown in detail in Figures 22 and 23. Its construction is similar to that of the off-bottom counter. However, it is of simplified construction since it does not include the zeroizing locking feature, nor the means to give the signal at the zeroized position (the microswitch). Accordingly, I have indicated several of the parts numerals on Figures 22 and 23 to correspond to like elements of the off-bottom counter, but with the suffixes "b."

This total depth counter includes the one-foot shaft 129b driven by the gear 142. At its left-hand end this shaft carries the cam block 143 having the rise 144 so that said rise comes to the location of a microswitch 145 once each rotation of the shaft. This microswitch may be supported on the left-hand end plate of the total depth counter, as shown in Figures 22 and 23, screws being passed horizontally through the microswitch body and into such end plate.

This microswitch is of the biased leaf contact type in which such leaf contact normally engages one of two stationary contacts, but is snapped into engagement with the other of such contacts when the leaf is pressed at the "critical" point. Switches of this type are well known in the art and it is not deemed necessary to here describe such switch in detail. It may be mentioned, however, that such a switch is illustrated and described in my said Patent No. 2,671,346, being shown in Figures 324, 325, 326, 327 and 328, and described in the specification at column 225, seq. The embodiment of such microswitch shown in Figures 22 and 23 includes a roller carrier 147 at one end of a flexible finger 148, which finger and roller carrier normally stand in lowered position so that the roller 149 normally stands in its lowered position. The finger 148 engages the microswitch stud (not shown) which stud is normally projected into its lowered position when the contact leaf is in its biased normal position, and in engagement with the corresponding stationary contact. When the rise 144 of the cam comes around far enough to raise the roller 149 to the snapover point of the leaf contact said contact is snapped into engagement with the opposite stationary contact. Such engagement with such other contact will then establish circuits to transmit the desired signal of completion of drilling of the full foot. Such circuits which transmit such signals, or the receiving equipment by which such signals are received and interpreted, may be provided with circuit opening elements so that such signal, so transmitted, will be discontinued after a short time interval, thus avoiding unnecessary current consumption. Such circuit arrangements are disclosed in my said patent, No. 2,671,346 and elsewhere.

After the drilling operation has proceeded beyond the exact location of such full foot so signalled, and has completed a portion of the drilling of the succeeding foot, the cam element and shaft 129b will have progressed to a point to carry the rise 144 far enough so that the roller has been permitted to descend to the point of snap back of the leaf contact. This will bring such leaf contact into engagement with the other stationary contact of the microswitch. Usually the angular distance which must be traversed by the shaft 129b between the two snapping operations of the leaf contact will correspond to about one-twentieth of a complete rotation of that shaft, or less. Nevertheless it is evident that all of the signals corresponding to full feet completed are given by the upward forcing of the roller, and all occur at the same portion of the rotative cycle. Accordingly, all such first signals correspond to the completions of full feet and do not correspond to intermediate and uncertain points at which the leaf contact makes its return snap.

I shall hereinafter describe a simple form of recording unit by which the signals coming from the present signalling unit may be received and translated, such illustration of such simple recorder being largely by way of illustration of one signal translating unit. In that simple recorder the full foot recordings are produced as lateral strokes of a stylus produced from a continuous line normally traced on the record sheet. The spacing between said strokes (successive strokes) is a measure of time lapse during the drilling of the foot, but without any correction for time out. That simple recorder also includes a trigger arrangement such that during movement of the trigger in one direction the stylus is quickly moved a short distance from the normal line of trace and immediately returns to the normal line of trace. It is then necessary to make provision for again coupling to such trigger element by a return movement of a reciprocating element in order to prepare for the production of the short lateral stroke at completion of the next foot of drilling. Such simple form of recorder is provided with connections and parts whereby the signal emitted at the first snap of the microswitch 145 of the present unit serves to produce the lateral stroke of the stylus, allowing such stylus to return to its normal line tracing position; and then the signal emitted at the second or return snap of the microswitch 145 serves to re-cock the trigger element, preparatory to the next stroke producing operation, at completion of the next full foot. It is thus seen that both of the stationary contacts of the microswitch 145 may be used in order to produce the desired recordings when the two signals are needed, corresponding to each full foot of drilling.

The microswitch 145 is shown in front elevation in Figure 4. In that figure I have also shown, by dotted lines, and just to the left of the microswitch 145, a second microswitch 150. This microswitch may also be operated by a second cam 151 carried by the full foot shaft 129b; but such second cam 151, when used, may be provided with a number of rises for producing several switching operations during each complete rotation of the shaft. For example, by providing ten such rises the second microswitch may be caused to emit a signal for completion of each tenth of a foot. Such tenths of a foot signals may then be translated for production of records showing a very detailed analysis of the drilling conditions within each full foot for which such tenth foot signals are emitted.

Comparison of Figures 22 and 24 will show that the gear 142 for driving the shaft 129b of the total depth counter is much smaller than the gear 131 which drives the shaft 129 of the off-bottom counter. The reason for this disparity will presently appear.

Referring next to Figure 4, the pulley shaft of small size 84 drives the gears 131 and 142 of the off-bottom and total depth counters, respectively, through the controls of the dead-line clutch and the off-bottom clutch and various other elements. In Figure 4 I have shown these two clutches as being of a type and construction which I shall, for convenience only, designate as the "Alnico" clutches. Figures 27, 28, 29 and 30, presently to be described in detail, illustrate one embodiment of such type of clutch. Alternatively, I have also herein disclosed in detail one embodiment of the "differential" type of clutch which is also disclosed in my said issued patent, No. 2,671,346. This alternative "differential" type clutch has been designed to be used in connection with the other elements of the signalling unit herein disclosed in detail. At this point the following comparative comments are in order respecting these two clutch types, the "differential" type clutch being illustrated in Figures 32 to 42 of this case:

As will presently appear, both the driving and driven shaft elements of the "Alnico" type clutch rotate in the same direction, whereas in the "differential" type of clutch these two shafts rotate in opposite directions when the clutch is engaged or in clutching condition. This circumstance requires some slight changes in the operative connections within the signalling unit, in order that both the off-bottom and total depth counters shall have their full foot shafts driven in the proper directions to perform their intended functions. Examination of Figure 4, and Figures 24 and 22 which illustrate the off-bottom and total depth counters, respectively, will show that in each of these counters the full foot shaft rotates in the same direction as the digital sections whether counting up or down (the total depth counter never counts down, but it does count up). If, then we consider the case of a descending drilling string which has been at an off-bottom elevation, so that the off-bottom counter shows some positive value of reading, then, as the drilling string descends the off-bottom counter full foot shaft 129 must rotate in direction to show lower footage values until the on-bottom position is reached, when such off-bottom counter will read zero. Examination of Figures 22 and 24 in comparison to corresponding Figures 23 and 6 (or 7, 8 and 9) will show that for down counts of these counters their full foot shafts must rotate clockwise when viewed as in said Figures 23 and 6. (Actually the shaft 129$^b$ of the total depth counter never rotates in that direction.) Conversely, for up counts of these two counters the shafts 129 and 129$^b$ must rotate counterclockwise.

In Figure 4 the driving and driven shafts of the dead-line clutch are designated as 152$^a$ and 153$^a$, and the driving and driven shafts of the off-bottom clutch are designated as 154$^a$ and 155$^a$, respectively, the dead-line clutch being designated in its entirety by the numeral 156$^a$, and the off-bottom clutch being designated in its entirety by the numeral 157$^a$. (When considering the "differential" type clutch presently, I shall use the same numerals for corresponding parts, and for the corresponding clutches, if necessary in the latter case.) The driven shaft 153$^a$ of the dead-line clutch drives a gear 165 through the medium of a friction drive element. This gear 165 meshes directly with the gear 131 of the one foot shaft of the off-bottom counter, on a one to one ratio, so that when said gear 165 is driving the off-bottom counter shaft in either direction such drive is on the one to one basis. Thus, one complete rotation of the pulley shaft 84 will cause one complete rotation of the one foot shaft of the off-bottom counter, which is the correct operation.

The spring coupling unit previously referred to is designated in its entirety by the numeral 159. It connects the driven shaft 153$^a$ of the dead-line clutch to the driving shaft 154$^a$ of the off-bottom clutch. It is here noted that the driven shaft 153$^a$ of the dead-line clutch extends directly through the friction drive gear unit so that drive to the driving shaft 154$^a$ of the off-bottom clutch is not affected by the presence of said friction drive gear.

The driven shaft 155$^a$ of the off-bottom clutch drives a gear 160, a friction drive element 61 being interposed between the shaft 155$^a$ and said gear 160 for a reason presently to become apparent, but it may here be noted that at all times during normal counting of new footage drilled this friction drive element does not slip but effects full rotational drive from the shaft 155$^a$ to the gear 160. This gear 160 is of the same size and number of teeth as the gear 142 on the full foot shaft 129$^b$ of the total depth counted so that each complete rotation of the shaft 155$^a$ of the off-bottom clutch produces one complete rotation of the full foot shaft of the total depth counter; but an idler gear 162 is interposed between the two gears 160 and 142 so that the direction of rotation of the full foot shaft 129$^b$ of the total depth counted is the same as that of the shaft 155$^a$. The reason for this provision is as follows:

If we again consider the case of a down movement of the drilling string which has been off-bottom, during this movement the pulley shaft 84 will be rotating counterclockwise when viewed as in Figure 3. Accordingly, the gear 165 will be rotating up and back when viewed as in Figure 4 to produce down reading movements of the off-bottom counter. Likewise, during such down movement of the drilling string prior to reaching bottom, the clutch 157$^a$ will be disengaged so that the driven shaft 155$^a$ will stand idle. (Additionally, such driven shaft is positively held against rotation in the clockwise direction when going off bottom by the "hold-back" clutch presently to be described.) The result is that during such down movement of the drilling string and prior to reaching bottom the full foot shaft 129 of the off-bottom counter must rotate clockwise, the necessary reversal of direction of rotation from the pulley shaft 84 being produced by the direct meshing of the gears 165 and 131. Accordingly, counterclockwise rotation of the pulley shaft 84 must produce clockwise rotation of the full foot shaft of the off-bottom counter.

When bottom is attained the off-bottom counter locks at its zero position, so that no further rotation of its full-foot shaft occurs during further down movement of the drilling string, representing drilling of new bore hole. But such continued counterclockwise rotation of the pulley shaft 84 during the drilling of new bore hole, must be translated into counterclockwise rotation of the full-foot shaft 129$^b$ of the total depth counter since that counter must now be moved to higher reading positions, not lower readings. This result is produced by the interposition of the idler gear 162 between the gears 160 and 142 as already explained. Thus the proper up-counting of the total depth counter is produced immediately after the down-counting of the off-bottom counter has ceased, even though the pulley shaft continues to rotate in the same direction, corresponding to down movement of the drilling string.

At this point I will recall the fact that in the "differential" type of clutch shown in Figures 32 to 42, inclusive, there is reversal of direction of drive between the driving and driven shafts. Accordingly, when using such a clutch for the dead-line clutch location, the cable should be laced over the pulleys 61 and 62 in such direction that the pulley 62 and its shaft 84 will rotate clockwise during down movement of the drilling string instead of counterclockwise as before. The pulley shaft 84 and the driving shaft of the dead-line clutch will also rotate clockwise during such drilling string down movement. Then the reversal of rotative direction produced in the dead-line clutch will produce counterclockwise rotation of the driven shaft of such dead-line clutch, and of the gear 165 during such drilling string down movement. Such counterclockwise rotation will then be transmitted to the driving shaft of the "differential" type off-bottom clutch; and due to reversal of rotative direction in that clutch, its driven shaft will be rotated clockwise instead of counterclockwise as in the case of the provision of an "Alnico" clutch for the off-bottom clutch operation. Since the full foot shaft of the total depth counter must rotate counterclockwise when viewed as in Figure 3 and other figures in order to count to higher digital values, it is seen that when using the "differential" type clutch for the off-bottom clutch operations, the drive from the driven shaft of that clutch to the full foot shaft of the total depth counter should be effected without the interposition of an idler gear. In other words, with this type of off-bottom clutch the gears 160 and 142 should be of equal size and large enough to mesh directly together on a one to one basis.

Reference to Figures 20 and 21 will show the details of construction of the friction drive to the gear 165 for the off-bottom counter. This unit includes a hub element 163 which is secured to the driven shaft of the dead-line clutch by the set screw 164. The gear element proper, 165, includes the sleeve section 166 which sets nicely on the hub element back to the location of the shoulder 167 formed by the outwardly extending rib 168 on the hub member. The disk 169 is set onto the hub member at the right-hand side of the gear element, such disk including the increased thickness portion 170 which sets into a circular recess formed in the right-hand face of the gear elements such disk element being so proportioned that its peripheral portion does not come into facial engagement with the face of the gear, leaving a slight gap 171 between such disk peripheral portion and the proximate face of the gear. Thus the pressure exerted between the disk element and the gear face is limited to that smaller diameter area which is defined by the radial size of the thickened portion 170. This disk element is keyed to the hub element 163 by the pin 172 which extends outwardly from the hub element into a recess 173 formed in the disk element. This pin is of length such that it can be set into place from the shaft opening of the hub element prior to assembling the disk and other elements onto such hub element.

A disk type spring element 174 is set against the right-hand face of the disk element 169. This spring element is preferably provided with a number of outwardly extending, leftwardly deflected spring fingers 175 which bear against the proximate face of the disk element 169. A nut 176 is threaded onto the right-hand end portion of the hub element up to such degree of pressure engagement against the disk spring as may be needed to ensure proper drive of the gear element by friction from the hub element, but without producing excessive drag on the pulley shaft and the driven shaft of the dead-line clutch when the off-bottom counter is zeroized.

It is noted that both the disk element 170 and the nut 176 are directly connected to the hub element with the disk spring between them. Then the gear element 165 is gripped between the rib 168 of the hub element and the disk 169. Thus frictional holding is exerted against both ends of the gear element by gripping elements which must rotate together. Accordingly, there is no tendency for the nut 176 to change its threaded position on the hub element, either when driving the gear element, or when said gear element stands stationary during hub rotation. The nut element 176 serves to provide for close adjustments of the frictional drive force, and with certainty that the magnitude of the force will not change over a long interval of operation.

It is noted that the spring disk element is radially split at the line 177 as shown in Figure 20 to thus relieve such spring of internal stresses and also ensure more uniform pressure of the fingers 175 against the face of the disk element 169.

Reference to Figures 18 and 19 will show the details of construction of the friction drive from the driven shaft of the off-bottom clutch to the gear 160 by which the total depth counter is driven. In principle this friction drive is the same as that shown in Figures 20 and 21. It is noted however that the space for accommodation of this friction drive element is smaller measured in a vertical direction than that available for the friction drive to the off-bottom counter. For this reason, and for the reason already explained, the gear element 160 extends but slightly beyond the body of the sleeve section 166ᵃ. Due to the close similarity between the two friction drive elements I have, in Figures 18 and 19 numbered the various elements with the same numerals as were used in Figures 20 and 21, for corresponding parts, but with the suffix "a" carried by each of the numerals shown on Figures 18 and 19.

Reference to Figures 16 and 17 will show the details of construction of the "hold-back" clutch by which the driven shaft of the off-bottom clutch is retained against backward rotation, thus also retaining the full foot gear 142 of the total depth counter against backward rotation, except by application of a force sufficient to overcome the holding force exerted between the gear element 160—165ᵃ and the driven shaft of the off-bottom clutch due to the friction adjustment of the nut 176ᵃ. This hold-back clutch includes a cylindrical body element 178 which may be secured to the right-hand end bracket 93 by screws set through the holes 179 formed in such body element 178. This body element is provided with a deep recess 180 extending inwards from its left-hand end, and a ball bearing 181 is set into an opening through the right-hand portion of the body and which opening communicates with such recess. This ball bearing is concentrically mounted with respect to the recess. The right-hand end portion of the driven shaft of the off-bottom clutch sets into the inner raceway 182 of this ball bearing.

Within the recess there is set the block 183 which is set onto the driven clutch shaft and is keyed thereto by the lock screw 184. Thus this block is compelled to rotate with the driven shaft of the off-bottom clutch and is able to retain that shaft against reverse rotation by the hold-back means now to be described. It is mentioned, however, that as a convenience in assembly I have shown the body element 178 as being provided with a radial opening 185 which will register with the location of the lock screw 184 once each rotation of the shaft. A suitable tool may be set through such radial opening to set or loosen the lock screw 184 when necessary; and a sealing screw 186 may then be threaded into this opening 185 to retain any oil or lubricant within the interior of the body element.

The block 183 is provided with a series of recesses 187 in its outer cylindrical surface. Each of these recesses is provided with a slanting surface 188 extending from the periphery of the cylinder to a radial back wall 189. There is a pair of small holes 190 drilled backwardly from each of the back walls 189 and a pin 191 is freely set into each of these holes. A light spring 192 is set into the inner end of each hole behind its pin to urge such pin to project into the corresponding recess. The element 178 is formed of hard metal, so that the cylindrical surface of the recess 180 is hard, and the element 183 is also formed of hard metal so that the floors of the recesses 187 are hard. Hardened rollers 193 are set into the recesses 187. These rollers are of size such that they become wedged between the cylindrical surface of the recess 180 and the floors of the recesses 187 without contact with the radial ends 189 of such recesses 187. Accordingly, when the block 183 is rotated in the direction of the arrow in Figure 16 the rollers may set back slightly to permit free rotation of such block which is carried by the driven shaft of the off-bottom clutch. That direction indicated by the arrow is the direction of rotation which occurs during drilling down and producing new bore hole. However, whenever any effort is made to reverse the shaft and such block 183 the rollers will at once wedge between the inner cylindrical surface of the recess 180 and the floors of the recesses 187 thus effectively preventing any back up motion of appreciable amount. It is noted that the light springs serve to maintain the pins 191 constantly in engagement with the rollers, thus constantly retaining the rollers in engagement with the surfaces of both elements 178 and 183 so that said rollers are at all times in position to lock against backward rotation of the shaft.

A cover plate or block 194 is set against the left-hand end of the element 178 and secured in place by the screws 195. This end block is provided with a left-hand opening of substantial size, 196 into which is set a lubricant sealing gland 197 having the central opening 198 of size to pass the driven shaft of the off-bottom clutch in effective lubricant sealing fashion.

The spring coupling unit is shown in Figures 4 and 13, the latter being a detail showing. The proximate ends of the driven shaft 153ᵃ of the dead-line clutch and of the driving shaft 154ᵃ of the off-bottom clutch are substantially aligned at the location of the spring coupling unit 159. This unit comprises the following:

The disk 199 is secured to the end of the shaft 153ᵃ, being provided with the hub 200 to receive that shaft; and the disk 201 is secured to the end of the shaft 154ᵃ, being provided with the hub 202 to receive that shaft. As shown the driving disk 199 is of larger diameter than the driven disk 201. These disks come close together but without improper interference in their respective movements. The driving disk 199 is provided with one or more (three shown) arcuate openings 203ᵃ, 203ᵇ and 203ᶜ, and the driven disk 201 is provided with companion arcuate recesses in its peripheral portion, shown at 204ᵃ, 204ᵇ and 204ᶜ, respectively. It is here noted that in the layout shown in the drawings the two shafts rotate in the counterclockwise direction during down movements of the tackle, as indicated by the arrow 205 in Figure 13. The counterclockwise end of each of the openings of the driving disk 199 is provided with an ear 206 which is struck at right angles to the plane of such disk and in the direction towards the right when viewed as in Figure 4. These ears are shown in dotted lines in Figure 13, and carry the numerals 206ᵃ, 206ᵇ and 206ᶜ, respectively. These ears extend rightwardly far enough to overlie the proximate left-hand or counterclockwise ends of the recesses of the driven disk; and in Figure 13 the parts are shown in the relations which they occupy when driving from the disk 199 to the disk 201 be a metal-to-metal drive.

Small lugs or burs are provided on the ears and on the clockwise ends of the recesses as shown at 207 and 208 in Figure 13, and the compression springs 209ᵃ, 209ᵇ and 209ᶜ are set with their ends engaged with such lugs or burs to retain the springs in place. When the shafts are free to adjust themselves angularly with respect to each other, as when the off-bottom clutch is disengaged, these springs will cause the driven shaft 154ᵃ, being the driving shaft of the off-bottom clutch, to rotate slightly to bring the right-hand or clockwise ends of the recesses of the disk into metal-to-metal engagement with the left-hand or proximate faces of the lugs of the disk 199. This is a clockwise rotational movement of such shaft 154ᵃ, the shaft 153ᵃ remaining stationary during such movement. Then, when afterwards the shaft 153ᵃ is driven counterclockwise during down movement of the drilling string, the lugs will continue to engage the proximate ends of the recesses, driving the shaft 154ᵃ by a metal-to-metal drive. This is the driving condition when driving the shaft 154ᵃ and the shaft 155ᵃ in the counterclockwise direction during down movement; and when, under such conditions the clutch 157ᵃ (off-bottom) is engaged (the off-bottom counter being at zero), such metal-to-metal drive through the spring coupling will ensure ample driving force to drive such total depth counter without any loss of angular movement. Thus accurate counting of new depths drilled will be ensured.

Clockwise rotation of the shaft 153ᵃ will be transmitted to the shaft 154ᵃ through the springs 209, the counterclockwise ends of such springs being engaged by the lugs of the disk 199. These springs should be of force, when fully expanded as shown in Figure 13, sufficient to ensure such clockwise drive of the shaft 154ᵃ through at least a slight angle, it being noted that the shaft 155ᵃ of the off-bottom clutch is locked against backward rotation, clockwise, by the hold-back clutch already described. Then, as soon as the microswitch has released the off-bottom clutch, such shaft 154ᵃ will be free to again adjust itself rotatively with respect to the shaft 153ᵃ, by force of the springs, to restore metal-to-metal engagement between the driving and driven parts of the spring coupling.

In Figures 4 and 13 I have shown a U-shaped bracket 210 mounted on the chassis plate 67 and provided with the upstanding legs 211 and 212. These legs are provided with through openings in which are seated antifriction bearings to journal the proximate end portions of the shafts 153ᵃ and 154ᵃ, the spring coupling unit being located between such legs. Thus a good alignment of the shafts is assured, and deflecting forces on the shafts due to gear drive engagements are amply carried, it being understood that said shafts are only called upon to transmit small torques, and may therefore be of small size, and liable to deflection from true alignments.

Referring again to Figure 6, and also to Figures 7, 8, and 9, reference has been made to the fact that, if desired provision may be made such that microswitch signals to the off-bottom clutch may be delivered exactly at the position of zeroizing the off-bottom counter, for causing engagement of the said clutch, and for delivering another signal to such clutch for causing disengagement of such clutch after a small amount of movement of the full-foot shaft of the off-bottom counter has occured in the off-bottom counting direction, such small amount of backward movement being cared for by the compression of the springs of the spring coupling. Another arrangement may include a second microswitch carried by the rock shaft 112 of the off-bottom counter and located just to the left of the microswitch 122 already described. Such second microswitch is indicated by the dotted lines 213 in Figure 4. Then a second cam rise shown by the dotted lines 214 in Figure 6 may be provided which will hold such second microswitch's leaf contact against return to its normally biased condition, with reversal of contact engagements, until a small amount of rotation of the full-foot shaft 129 in the off-bottom (counterclockwise) direction, has occured, whereupon the signal for disengagement of the off-bottom clutch will be given. In this connection, it is here noted that each of the forms of clutch presently to be described is provided with two actuating solenoids and their armatures. These two sets of solenoid and armature serve, when actuated, to produce operation of the clutch in either the engaging or disengaging direction, as the case may be. The two microswitches, when provided, would individually control these two solenoids, so that the desired separation of signal effects would be produced. When a single microswitch is provided its two stationary contacts are used for giving the two signals to the respective solenoids, the single leaf contact snapping into engagement with the one or the other of such two stationary contacts in well understood manner.

I have previously made reference to the purposes to be served by the provision of the friction drive from the shaft 155ᵃ (driven shaft of the off-bottom clutch) to the gear drive to the total depth counter. That friction drive is shown in Figures 18 and 19 which have been described. This friction drive enables pre-setting of the one foot disk 54 and the one-foot shaft 129ᵇ of the total depth counter when necessary without need of driving the shaft 155ᵃ during such operations. This friction drive is, however, adjusted to exert a sufficient driving force to ensure proper drive to the total depth counter during normal operations.

Reference is now made to Figures 27, 28, 29 and 30 which show in detail and on enlarged scale the construction of the "Alnico" type clutch. This unit includes the U-shaped frame element 215 having the base portion 216 which sets directly on the chassis plate 67 or on a shim plate, and also includes the upwardly extending bracket arms 217 and 218. The driven shaft 219 extends from the left-hand side of the unit to a location between the bracket arms, and the driving shaft 220 extends from the right side of the unit to a location between the bracket arms, and to proximity to the end of the driven shaft. These two shafts are accurately aligned with each other. The driven shaft is supported and journalled by the ball bearing 221 having its outer raceway 222 seated into a collar element 223 which is set down into a semi-circular recess on the top edge of the bracket arm 217. This collar element is provided with the outwardly extending flange 224 which bears against the outer face of the bracket arm and is secured thereto by the screws 225. A bearing retainer ring 226 is also clamped against the outer end of the outer raceway 222 by these screws. The driven shaft is provided with the flange 227 which engages the inner raceway of the ball bearing, 228, to limit the inward movement of said shaft; and a cup-shaped element 229 is set onto the shaft just to the inside end of the inner raceway to fix the shaft against outward withdrawing movement through the bearing.

The driving shaft 220 is journalled in the ball bearing 230 seated in a suitable opening of the right-hand portion of the unit. To this effect the outer raceway of this ball bearing is seated into the collar element 231 with its outer raceway carried by such collar element in manner similar to the construction shown for the bearing of the driven shaft. This collar element is therefore set down into a semi-circular recess formed in the top edge of the bracket arm 218, and the flange 232 of this collar element sets directly against the outer face of the bracket arm 218 to which it is secured by the screws 233. The inner end of the driving shaft is enlarged as shown at 234 to establish an abutment. The disk element 235 is then set onto the inner end of the shaft and against this abutment; and a key lug 236 of the shaft engages a suitable slot of the disk to key the disk to the driving shaft. Thus the disk and driving shaft are rotatably connected together.

The disk 235 is provided with a rightwardly extending neck 237 which engages the inner end of the inner raceway 238 of the bearing 230, and a cup-shaped element 239 engages the outer end of the said inner raceway to retain the shaft properly against inward shift through the ball bearing.

A sleeve 240 is splined onto the driven shaft by engagement of the pin 241 which extends through such sleeve into engagement with the axially extending keyway 242 of the shaft. Although only a small shifting movement of the sleeve on the shaft is to be executed, as will presently appear, still the sleeve is made of ample length as shown in Figure 29 to ensure accurate operation of the sleeve during its shifts on the shaft. The left-hand end portion of this sleeve is provided with the outwardly extending flange 243 of considerable diameter and facial bearing surface. A ring plate 244 is set onto the inner end portion of the collar element 223, preferably by a threading arrangement as shown, so that by turning this ring plate its inside face may be advanced towards or retreated from the position of the flange (when said flange is in one of its two intended positions of operation). A set screw 245 is extended radially inwards through the ring plate and into locking engagement with the collar element to lock said ring plate in its adjusted position.

Preferably the flange 243 is of slightly greater diameter than the ring plate and is slightly recessed in its outer face to receive the ring plate 244 during one intended operation. A facing of brake lining material 246 is cemented or otherwise adhered to the face of the flange 243, such facing being of ring shape as evident from Figure 29. The flange 243 is accurately formed and set onto the driven shaft so that the plane of such brake lining face is normal to the axis of rotation, and likewise the ring plate 244 has its right-hand face normal to the axis of rotation. The parts are accurately made so that when the sleeve 240 is shifted leftwardly a small distance an even engagement of the brake lining (and element 243) occurs with the ring plate to lock the parts, including the driven shaft, against rotation.

The sleeve 240 also carries a cup-shaped element 247 which is drivingly connected to such sleeve by the key and keyway shown at 248; and a cup element 249 is set onto the shaft to the right of the concave inner face of such element 247 to retain such element in place. This cup element is provided with the peripheral flange portion 250 providing an annular or ring-shaped portion facing the disk element 235. Said disk element is preferably of slightly larger diameter than said flange 250 and is facially recessed slightly to accommodate the flange 250 during one intended operation. A ring of brake lining material 251 is cemented or otherwise secured to the face of the disk element 235; and the parts are accurately formed with surfaces lying in planes normal to the axis of rotation.

The proximate portions of the cup-shaped element 247 and the flange 243 are so spaced and formed as to provide space to accommodate a shifter element, presently to be described. It is here noted, however, that when the sleeve 240 is shifted rightwardly into the position shown in Figure 29 the flange element 250 is brought into driving engagement with the disk element 235 so that drive from the shaft 220 to the shaft 219 is effected. On the other hand, by a slight shift leftwardly the flange 250 will be withdrawn from engagement with the disk element to discontinue drive from the shaft 220 to the shaft 219, and immediately thereafter the flange 243 will be brought into frictional engagement with the ring plate 244 which is stationary, thus locking the sleeve 240 stationary also. Since the shaft 219 is drivingly connected to such sleeve it follows that said shaft will also be thus locked stationary at such time.

The clearance between the shifting faces of the flange 250 and the brake lining carried by the flange 243 are such that only a slight shift of the sleeve is needed to effect the change from the driving of the shaft 219 to the locking of said shaft stationary. I shall now describe the shifting means to produce these effects:

A ring 252 is seated on the sleeve 240. This ring conveniently comprises the inner raceway of a ball bearing, of which the outer raceway is shown at 253. A semi-circular yoke element 254 is provided (see Figures 29 and 30), such yoke being provided with an upwardly facing semi-circular recess to receive the lower half of the ring 252. The flange 243 and the cup shaped element 247 are both so formed that shift of the ring 252 in the one direction or the other will produce engagement of such ring with such element 243 or 247 as the case may be, without engagement of the outer raceway 253 with such element 243 or 247. But the ring 253 is engaged by the yoke member. Consequently rotation of the sleeve and the inner ring 252 or inner raceway of the ball bearing may freely occur substantially without friction since the outer raceway of the ball bearing may remain non-rotative, being seated into the yoke. Thus the back and forth shifts of the yoke are effected carrying with such yoke the sleeve and its engaging surfaces.

There is another actuating yoke 255 of larger span than the yoke 254 and extending below and up at the sides of the yoke 254 (see Figure 30). The arms 256 and 257 of this larger yoke embrace the yoke 254 between them, and the depth of the yoke 255 is sufficient to permit free relative movement between the two yokes. U-shaped horizontal bars 258 and 259 are set against the front and back edges of the bracket arms 217 and 218, and secured to said bracket arms by the screws 260 as indicated in Figure 28. Thus a rigid frame is provided; and additionally said bars extend up far enough to provide supports for the yoke 255 as follows:

The pivot pins 261 and 262 are extended through the bars 258 and 259 respectively, the inner ends of such pins being tapered to fit into corresponding tapered recesses in the two arms 263 and 264 of said yoke 255. Lock nuts 265a and 266a are set onto these pivot pins for the self-evident purpose. Examination of Figure 30 will show that the horizontal plane which includes the shafts 219 and 220 lies above the horizontal plane which includes the pins 261 and 262. The upper portions of the opposite sides of the yoke 354 are pivotally connected to the arms 263 and 264 of the yoke 255 by the pins 265 and 266 which lie in the horizontal plane which includes the two shafts 219 and 220. It will now be apparent that rock of the yoke 255 about its axis of support will result in a slight shift of the axis extending through the two pins 265 and 266, in direction opposite to that in which the lower portion of the yoke 255 is shifted. Since the yoke 254 is connected to the yoke 255 by the pins 265 and 266 such yoke 254 is allowed to shift directly in one direction or the other while remaining parallel to itself during such shifts, that is, remaining within a plane normal to the axis of the shafts 219 and 220. Due to the fact that during such a shift the pins 265 and 266 will travel parallel to themselves and within a cylindrical surface of which the axis is coincident with the axis passing through the two pins 261 and 262, it follows that such rock of the yoke will produce a very slight vertical component of motion of the yoke 254. However, due to the slight angular shift which will be executed by the yoke 255 and the small distance between the pins 262 and 266 (and 261 and 265) it follows that no appreciable vertical component of motion will be produced, such as above suggested. Any slight vertical movement may be accommodated by slight clearances between the parts.

It is now evident that rock of the lower portion 267 of the yoke 255 will serve to produce the desired shifts of the sleeve 240 and connected parts, such sleeve shifts being in direction opposite to that of movement of the lower portion 267 of the yoke. It is also evident that such an arrangement will produce a large multiplication of force as between that applied to the yoke portion 267 (and the extension thereof, 269) and that produced at the braking or driving position of the sleeve elements. This fact is evident from the fact that the distance between the pins 262 and 266 is several times smaller than the radius of swing of the yoke extension 269. It is thus possible to produce the desired gripping forces between surfaces by use of comparatively small forces applied to the yoke extension 269. The yoke shifting and holding means is as follows:

Referring to Figure 29, the plates 268 and 269 are secured to the opposite faces of the yoke portion 267. These plates are separated from each other and produce a slightly stiff but yieldable downward extension of the yoke portion 267. Blocks of magnetic material, 270 and 271 are secured to the lower end portion of this downward extension. Thus the yoke may be shifted back and forth by production of proper magnetic fields to influence and act on such blocks. The strong solenoids 272 and 273 are set against the inside faces of the arms 217 and 218 and are clamped in such positions by screws 274 passed through retainer plates 275 and 276 as shown in Figure 30. These solenoids are of the air-core type in the sense that they are not provided with conventional magnetic material cores. However, blocks of strongly magnetized high permeability and high retentivity material, such as "Alnico" metal, are located and secured within the air core spaces of these solenoids. These are the blocks 277 and 278 secured to the inner ends of the screws 279 and 280. These screws are threaded through the screws plugs 281 and 282 of large enough size to allow the Alnico blocks to be inserted into place when such plugs are removed; and lock nuts 283 and 284 are threaded onto the projecting ends of the screws as shown in Figure 29. By this arrangement it is possible to adjust each Alnico block to exact position within the air core of its corresponding solenoid.

With this arrangement the following operations are possible:

Assuming that the yoke has been shifted to one extreme position, as shown in Figure 29, the block 270 of magnetizable material has been magnetically gripped by the Alnico block 277; and at the same time a considerable air gap exists between the block of magnetizable material 271 and the Alnico block 278. Accordingly, a strong holding force is being exerted to retain the yoke in its position of shift shown in Figure 29. During this operation it is assumed that there is no current flow through either solenoid. Upon energizing the solenoid 273 to produce a strong magnetomotive force a sufficient pull will be developed by such solenoid on the magnetizable block 271 to pull the said block and the block 270 free of the holding force exerted by the Alnico block 277, and immediately the yoke will be drawn towards the right far enough to engage the Alnico block 278 with the magnetizable block 271. Having done this, such Alnico block 278 will retain the yoke in its newly shifted position without need of further energization of the solenoid. Accordingly the current may now be shut off from such solenoid 273 leaving the parts locked in their new position.

It is noted that the downward extensions 268 and 269 are formed of somewhat flexibile springy steel or the like, so that they may flex slightly to permit the Alnico blocks to come into full contact with the magnetizable blocks 270 and 271, or vice versa, after the sleeve has completed its necessary shift to produce either braking action or driving action as the case may be.

The impulses of current needed to excite the solenoids are delivered to such solenoids by the microswitch contacts of the off-bottom counter microswitch, in the case of the off-bottom clutch, and by the contacts of the deadline attachment microswitch or other switching element which is actuated by the conditions of connection or non-connection of the drilling string to the tackle. Various signalling arrangements incorporating these switching features are fully disclosed in my said Patent No. 2,671,346, so it is not deemed necessary to describe them in detail here. However, it is now noted that the form of clutch now being described includes in its elements contacts by which the currents sent to the solenoids 272 and 273 are cut off prior to completion of the full actuating movements so that the yoke's movements are produced by the desired current impulses without need of sustaining such currents. To this end, the flexible leaf 285 is connected to the lower portion of the downward extension comprising the thin plates 268 and 269, such connection including the insulating elements 286 and 287. The blocks of insulating material 288 and 289 are supported by the floor of the frame of the clutch. Studs 290 and 291 are extended through these insulating blocks; and the contacts 292 and 293 are carried by the inner ends of the studs. The lower end of the leaf 285 carries complementary contact elements 294 and 295. By setting the studs back and forth in the insulating blocks to correct positions of adjustment it is possible to bring about contacting functions which will produce the desired circuit opening and closing operations. These operations include the following:

With the parts in the positions shown in Figure 29 the contacts 294 and 292 being engaged, a circuit is established which includes the solenoid 273, and, for example, the microswitch stationary contact for one of the positions of the microswitch 122 shown in Figure 6. On the assumption that said microswitch was at the time in that position so that its stationary contact corresponding to the contact 292 was not in engagement with the leaf contact of such microswitch, it is evident that the solenoid 273 would remain unenergized so that the clutch would remain in the position shown in Figure 29. Then, as soon as the off-bottom counter microswitch of Figure 6 reversed position the stationary contact connected to the solenoid 273 would be engaged, thus closing the circuit through such solenoid 273 and immediately reversing the clutch position. Shortly after commencing the clutch reversal the leaf 285 (see Figure 29) would carry the contact 294 away from the contact 292, thus opening the circuit of the solenoid, notwithstanding that the microswitch might remain in its then position for a long time. Such opening of the circuit for the solenoid 273 should occur at a time when the leaf and yoke had moved substantially half way to their new positions, and where the force of the Alnico block 278 would be large enough to complete the throwing movement, and to bring the magnetizable block 271 into engagement with the Alnico block 278 to thus retain the yoke and connected parts in their shifted positions. But it is noted that during these operations the contact 295 carried by the leaf 285 will come into engagement with the contact 293 in good time to thus establish a partial circuit of which the solenoid 272, the opposite stationary contact of the microswitch of the off-bottom counter, and the contacts 295 and 293 thus brought together would comprise portions. This circuit would, however, not be completed until reversal of the leaf contact of the off-bottom counter microswitch, so that the clutch reversing operation would be delayed until such off-bottom counter microswitch should reverse its position. When such microswitch reversal should afterwards occur the clutch of Figure 29 would reverse its position, with change of its contacts in harmony with the principles of operation just explained.

The Alnico or other permanent magnet arrangements above described will serve to ensure retention of the yoke in its shifted position and under the degree of force developed by the design of the parts. In case it should be desired to produce further holding effects than those due to the Alnico magnets, spring toggle elements may be provided which are as follows:

The yoke 255 is shown in Figure 30 as being provided with the heels 296 and 297 to which are connected the downwardly extending stiff pins or rods 298 and 299. Accordingly these rods will rock or swing as pendulums during the rocks of the yoke, such pendulum movements of the rods being executed about the horizontal axis through the pins 261 and 262 in Figure 30. Secured to the base portion of the unit and directly beneath the aforesaid axis of rock are the two upwardly extending pins 300 and 301 which are adjustably secured to the brackets 302 and 303. The proximate ends of the rods 298 and 299, and of the pins 300 and 301 are provided with abutments between which the compression springs 304 and 305 are contained. During rock of the yoke in either direction the rods 298 and 299 will swing through their lines of registry with the corresponding pins, the springs being compressed as the rods approach such registry, and such registry points being "dead-center" positions. Having passed such dead center positions the springs will exert their expanding forces to complete the swing of the yoke, and to retain the sleeve and its connected parts in their shifted positions. By adjustment of the pins 300 and 301 it is possible to produce the desired spring force effects, taking into account also the characteristics of the springs.

Examination of Figure 29 will show that the plugs 281 and 282 are formed of non-magnetic material. Also that the plates 268 and 269 are connected to the central portion of the yoke 255 by a block of non-magnetic material 306. These non-magnetic carriers ensure protection of drainage of magnetic effects through "short circuits," and thus assure production of the maximum magnetic moving and holding effects possible. Conveniently, the element 306 comprises a portion of the yoke 255 in which case said yoke comprises non-magnetic material in its entirety.

It is noted that in Figures 27 and 29 the driving shaft is shown at the right and the driven shaft at the left. Accordingly, these figures are showings opposite to the showings of like clutches in Figure 4.

In Figures 32 to 42, inclusive I have shown a substitute form of clutch, herein called the "differential" type, and which is of a form and size and functional characteristics for use in the signalling unit construction hereinbefore described, subject to certain minor changes in other elements. Chief of these is the change in rotative direction of the driven shaft of the off-bottom clutch as compared to the driven shaft of the dead-line clutch. This element of change has been explained hereinbefore.

The present clutch includes the base plate 307 from which there stand the left and right hand end bracket plates 308 and 309, respectively. The driving shaft in the present case comprises the sleeve 310 having at its inner end the disk 311. A hollow extension 312 is secured to the left-hand bracket plate 308 by the screws 313 passed through the flange 314 of such extension. This extension has at its outer end the inwardly extending flange or rib 315. Double or two ball bearings 316 and 317 are seated within this extension, the outer raceways of such bearings being set into the extension and between the rib 315 and the outer face portion of the bracket plate 308. The inner raceways of these bearings are set onto the sleeve 310 to thus journal said sleeve within the extension. Spacer rings 318 and 319 are set between the inner and outer raceways of these bearings to ensure proper spacing between the bearings.

The sleeve 310 is driven directly by the pulley shaft 84. For this purpose a ring shaped nut 320 is threaded onto the end of such sleeve, such nut extending through the flange or rib 315 of the extension and into engagement with the inner raceway of the left-hand ball bearing, but without jamming against the end of the rib of the extension or rotating in such extension with friction. The outer end of this nut is provided with a crosswise extending groove 321. The right-hand end of the pulley shaft 84 extends into the sleeve with a loose fit, and a drive pin 322 is extended through such pulley shaft at a point where the pin will engage the cross groove 321. Thus such pin provides a loose coupling drive from the pulley shaft to the sleeve, the looseness of which is sufficient to take care of slight misalignment between the clutch shafts and the pulley shaft 84. It is also possible, with this arrangement to withdraw the clutch directly to the right without having to draw the pin from the pulley shaft since the groove 321 is open at its left-hand face.

The driven shaft 323 extends through the right-hand bracket plate 309 where it is journalled by the ball bearing 324. Rods 325 and 326 are extended through the front and back portions of the bracket plates somewhat below their half-heights. A central partition plate 327 of generally triangular form, as shown in Figure 38 has its lower corners set onto these rods, and its apex extends substantially to the elevation of the left-hand bracket plate 308. A rod 328 extends through the apex of this partition plate and through the left-hand bracket plate, and overhangs a considerable distance to the right of the partition plate as shown in Figure 36. The driven shaft 323 extends leftwardly through this partition plate in which it finds bearing by the ball bearing element 329. This driven shaft then extends a slight distance leftwardly towards the disk 311 of the sleeve 310.

A disk 330 having the short hub sleeve 331 is set onto the left-hand end of the driven shaft, to which said disk is pinned by the cross pin 332. It thus appears that the opposing disks 311 and 330 are drivingly connected to the driving and driven shafts, respectively.

A centering and journalling rod 333 is set into the inner end portion of the sleeve 310, and at the point where such rod emerges from such sleeve it is of reduced size as shown at 334. This reduced size portion 334 provides a journal whereon the "cage" element 335 of the differential is rotatably mounted. This cage element includes a peripheral flange or cylinder surface against which the brake shoes presently to be described are gripped when the cage is to be held stationary for transmission of drive to the driven shaft. The thickness of this cage element is stepped as shown in Figure 36 so that its central portion is of full width, with a somewhat reduced width section extending out about two-thirds of the wheel radius where a further reduction of the thickness occurs to accommodate the ring gears. The outer flange portion is then of full width to provide the brake cylinder. The internal ring gears 336 and 337 are secured to the disks 311 and 330, respectively, being well held exactly concentric with such disk elements by the facial recesses formed in such disks as shown in Figure 36. These ring gears may be held in position by screws set through the disks and into the outwardly facing surfaces of the ring gears, such screws not showing in Figure 36. Seated against the faces of the cage in its next thicker portion are the circular plates 338 and 339. These plates lie within the ring gears and are held in place by screws, not shown in Figure 36. It will thus be seen that such plates and the body of the cage comprise a unit of substantially the full width clearance between the inside faces of the disks 311 and 330.

At one or more locations within the body of the cage there are provided circular openings extending through the cage body between the proximate faces of the plates 338 and 339. Each of these openings comprises two merging cylindrical sections whose axes are parallel to the axis of shaft rotation (only one of these cylindrical sections is shown in Figure 36) being numbered 340. There is a cross pin extending lengthwise through each such cylindrical section centrally thereof, the pin for the opening 340 being numbered 341. Each of these pins is end supported by the plates 338 and 339 and constitutes a journal support for a spur gear such as shown at 342 in Figure 36. Since each of the openings 340 comprises two merging sections, with a cross pin extending across each section, and with a spur gear journalled on each such cross pin it is evident that the two spur gears of such two merging sections may be meshed together so that they must rotate in opposite directions. Examination of Figure 36 will show that the gear 342 there shown is of body width and tooth width to reach only across the central portion of the cage, but does not come to the location of the opposite internal gear 337. It does, however, mesh with the internal gear 336. The spur gear in the other section of the pair does however, mesh with the internal gear 337, and also with the first mentioned spur gear; but this second spur gear does not extend leftwardly into meshing engagement with the internal gear 336.

With the above described arrangement it is evident that both of the disks 311 and 330 are connected positively together by gears and a gear train which includes the pinions journalled into the cage. It is also evident that by locking that cage stationary the driving disk will positively drive the driven disk but in opposite direction due to the intermeshing of the two cage carried pinions, the ratio of drive between the driving and driven disks being one to one. It is also evident that by releasing the cage and locking the driven disk against rotation the cage will rotate in the same direction as the driving disk but at reduced speed. I have provided various controls to produce the desired operations, which controls are as follows:

The peripheral circular flange 343 of the cage comprises a brake cylinder which may be engaged by suitable brake shoes to hold the cage against rotation or may be released to allow such cage to run free. There is a brake wheel 344 located on and keyed to the driven shaft 323. This wheel includes the hub portion including the sleeve 345 which is pinned to the shaft by the cross pin 346. This brake wheel is provided with the circular peripheral flange 347 which may be engaged by brake shoes to retain the driven shaft stationary when the unclutching condition exists. Evidently the engaging of the brake shoes for the cage to produce clutching action and to produce drive of the driven shaft must be accompanied by disengagement of the brake shoes from the wheel 344 to allow the driven shaft to rotate. Conversely, release of the brake shoes from engagement with the cage to produce the unclutching operation must be accompanied by engagement of the brake shoes with the brake wheel of the driven shaft to ensure immediate stoppage of rotation of that shaft and to retain said shaft against untoward rotation by various influences. There are provided the two companion brake shoes 348 and 349 for the cage, and the similar companion brake shoes 350 and 351 for the brake wheel. As well shown in Figures 32 and 35, the upper or pivoted ends of the shoes 348 and 350 are bifurcated to provide the companion ears 352 and 353, and 354 and 355, for the two shoes; and the upper pivoted ends of the shoes 349 and 351 are provided with central lugs 356 and 357 which set between the pairs of ears of the companion brake shoes. All of such lugs and ears are pivotally mounted on the rod 328 which extends parallel to the driving and driven shafts. The several brake shoes are of generally semi-circular form as well shown in Figure 39 and they reach around their respective cage or wheel surfaces to locations below such cage and wheel where their braking operations are controlled. Preferably also these brake shoes are slightly relieved in their upper and lower portions to provide cage or wheel engaging surfaces of approximately ninety degrees embracement against the cage and wheel respectively, as shown in Figure 39. By this means very strong and effective braking actions are produced against the cylindrical surfaces to be gripped.

Referring to Figures 39, 40 and 41 the details of construction of these brake shoes are shown. Each brake shoe is provided with a depending lug 358 on its lower end, and the companion shoes of each pair are so proportioned that when gripping action is to occur the lugs and the lower proximate portions of the companion shoes do not come together but a narrow space 359 is then left between such lugs. A tension rod 360 is extended horizontally through the two lugs of each pair of brake shoes. A small but stiff spring 361 is set onto the rear end of each such tension rod, which rear end is enlarged to abut the spring end, the front end of each spring bearing against the proximate brake shoe lug 358. Conveniently the brake shoe lugs are recessed to receive these springs as shown in Figures 39, 40 and 41. The front ends of the tension rods carry nuts 362 by which the spring compressions may be adjusted by drawing the tension rods forwardly to a greater or less extent with corresponding adjustment of the spring lengths. These springs and tension rods normally retain the brake shoes of each pair in strong enough engagement with the corresponding cylindrical surfaces to ensure sufficient holding of the cage or the driven shaft, as the case may be, against improper rotative movement.

Referring to Figures 32, 33, 36, and 38 to 42, inclusive, a horizontal rock bar 363 has its central portion pivoted between the lugs 364 and 365 which extend down slightly from the lower edge of the triangular frame element 327, such pivoting being provided by the pin 366. The end portions of this rock bar extend between the pairs of lugs 358 of the brake shoes proximate to such bar ends, so that as the bar is rocked through a small angle its two ends move in opposite vertical directions. Thus, during one rock the bar end between the brake shoe lugs at the cage end will move down while the bar end between the brake shoe lugs at the wheel end will move up; during the return rock of the bar its ends will move in contrary directions.

Examination of Figures 40 and 41 in particular reveals the through openings 367 extending through each of the brake shoe lugs below the location of the tension rod 360 of such lugs. The end portion of the bar 363 which rides between each pair of brake shoe lugs is provided on its two faces with small recesses 368 to receive rounded ends of small pins 369. A set screw 370 is screwed into the opening 367 of each lug from the outer face of such lug, the inner end of each set screw being recessed to receive the proximate rounded end of the corresponding pin 369. By setting these set screws 370 into the lugs greater or less distances it is evident that prying actions will be produced by the pins against the corresponding brake shoe lugs as the lever 363 is rocked in the two directions of rock. It is intended that down movement of either end of the lever shall produce separation of the brake shoes, such down movement being produced by a corresponding solenoid presently to be explained. It is also intended that when such down movement has been executed, forcing the brake shoes slightly apart to release the braking action, a toggle effect shall be produced by the then positions of tilt to which the small pins 369 have then been shifted, so that the lever will be effectively retained in such position of tilt until a succeeding lever tilting operation shall be produced by excitation of another solenoid. It is noted that during the down movement of the lever end portion the brake shoes are being separated against the force of the corresponding spring 361 to discontinue the braking action, and that when the lever passes dead center position of the small pins a slight returning movement of the lugs 358 occurs, but that returning movement is not enough to again bring the brake shoes into frictional engagement with the cage or the brake wheel as the case may be. Figure 40 shows the parts in their positions during brake shoe holding operation; Figure 41 shows the parts in their positions during brake shoe releasing operation. It is seen that in Figure 40 the lever stands considerably above the line between the outer ends of the small pins, whereas in Figure 41 the lever stands only slightly below the line between the outer ends of the small pins. Accordingly, a much greater separating action takes place between the brake shoe lugs during the movement to dead center position than afterwards occurs during slight movement past dead center. Thus the brake shoes are retained properly in condition of separation from the cage or the brake wheel, as the case may be. It is also seen that this simple arrangement of parts is such that the setting of the brake on the cage and the releasing of the brake on the brake wheel occur at substantially the same time; and likewise that releasing the brake on the cage and setting the brake on the brake wheel occur at substantially the same time. Also, that such operations are produced by simple rocks of the lever.

The solenoids 371 and 372 are located on the base plate 307 beneath the driving and driven end portions of the lever or rock arm 363, respectively. These solenoids are preferably of the iron-clad type to develop strong pulls with a minimum of solenoid size. To this end each solenoid includes its wire carrying spool 373 (see Figure 42) providing a vertical tubular opening into which works its armature with up and down movements. The armatures for the two solenoids are shown at 374 and 375 (see Figure 42). The upper ends of these armatures are cross-slotted to receive the ends of the rock arm or lever with pin connections, 376, to take care of needed angularity during rocks. In Figure 32 the left-hand end of the rock arm has been raised by energization of the right-hand solenoid, 372, and consequent down movement of the armature at the right-hand end of the device. Such movement has served to permit the brake shoes of the cage to grip that cage and thus produce the desired clutching operation. At the same time such rock of the lever has forced the brake shoes of the brake wheel to separate thus permitting the driven shaft to rotate under drive from the driving shaft. The succeeding impulse of current must therefore energize the left-hand solenoid 371 to reverse the clutch effects.

As shown in the drawings, each solenoid is provided with a U-shaped enclosure 377 of magnetic material, the arms 378 and 379 of such U-element being carried up at the front and rear faces of the solenoids as well shown in Figures 34, 37 and 42. A top piece 380, also of magnetic material, engages the upper ends of the arms 378 and 379, and is provided with a central opening to pass the vertically movable armature.

Conveniently a plate of non-magnetic material 381 is placed against the front faces of the U-arms 378 of both magnets or solenoids, and a corresponding plate, also of non-magnetic material, 382, is placed against the back faces of the U-arms 379 of both solenoids. These front and back plates retain the solenoids securely against displacement or distortion, and ensure good functioning of the solenoids under the impulses delivered to them. These front and back plates are of course secured to the solenoid elements by screws as indicated in various of the figures. The bottom portions of the U-shaped iron-cladding elements may be suitably secured to the base plate as by screws or the like.

It is desired that as the rock arm 363 effects each tilting movement by energizing of one of the solenoids the current delivered to that solenoid shall be of very short duration and in the nature of an impulse. However, the delivery of currents to these solenoids will generally be governed by the alternate throws of a control switch, generally of the two position type, such as a microswitch having two stationary contacts between which a biased leaf contact snaps. Such switch may, in the case of the dead-line clutch comprise a portion of or be operated by the dead-line of the tackle lacing, or, in the case of the off-bottom clutch, such switch may comprise a portion of the elements of the off-bottom counter as hereinbefore disclosed. In any case, however, when such switch is moved to either of its two contact positions it will remain there until the switch is reversed. Thereupon it will remain in its so reversed position until the time arrives for return to its first mentioned condition, where it will again remain until the next switch reversal occurs. Thus in each case a circuit is completed through that portion of the circuit elements which includes the so engaged contacts, and such circuit will continue in its closed condition until switch reversal occurs, provided no other circuit interrupting means is provided. That circuit interrupting means is provided in the form of a small microswitch comprising a portion of the signalling unit and in position to be actuated by the down throw of each end of the rock arm 363. These microswitches are shown in Figures 32, 33, 36, 38 and 42. They are shown at 383 and 384 corresponding to the solenoids 371 and 372, respectively. These microswitches are conveniently carried by light plates or angle bar sections 385 having their rear ends pivotally connected to portions of the rear plate 382 so that by slightly rocking such sections 385 up or down the microswitches may also be brought to exact positions of adjustment vertically. The front end portions of these sections 385 are provided with ears 386 carrying the adjusting screws 387 which work against other ears 388 carried by the front plate 381 so that by manipulation of the screws the front end portions of the pivoted plates 385 may be raised or allowed to be lowered slightly. The desirability of these adjustments arises from the following relationship of parts:

Each microswitch is provided with the switching control stud 389 (see Figure 42) projecting slightly above the top face of such switch. When the biased leaf contact is in its normally biased condition this stud is fully projected to its highest point, and this represents one definite contacting position of the switch. By depressing such stud 389 slightly the biased leaf contact is reversed, thus producing the other definite switch contacting position. Upon releasing the stud it will be again raised by the biased leaf contact and the original and normal contacting position will be restored. These microswitches are set at such elevations by use of the adjustments already explained, that the stud of each switch will be engaged by the lower edge of the rock arm 363 during descent of the proximate end portion of that arm, and the adjustments are such that switch throw shall occur at or preferably slightly after the proximate portion of the rock arm passes through the dead-center position at which the corresponding small pins 369 reverse their arm rocking forces. Thus, once having moved the rock arm to such dead-center position the rock arm will be continued in its movement to termination of such movement both by the toggle effect produced by the small pins 369 and by the momentum effect developed by rapid movement of the rock arm itself. (Additionally, it is noted that a further toggle effect is also produced by the small pins at the other end of the rock arm, since these shall also pass their dead-center positions during up rock of the rock arm at about the same time as the down rock is occurring at the location of the so-energized solenoid.)

Now the microswitches shown are of the type including two stationary contacts 390 and 391 (see Figures 33 and 42), together with the intermediate biased leaf contact 392. (In said figures the elements so legended by numerals are the terminals of the contacts which contacts themselves are contained within the microswitch housing.) Various circuits involving the control of the dead-line clutch and other similar applications are shown and fully described in my earlier patent, No. 2,671,346, so I do not deem it necessary to illustrate or describe them in detail here.

Reference is now had to Figure 47 showing in schematic outline a simple wiring diagram by which two of the stepping motors of the type hereinbefore mentioned may be used in place of the dead-line clutch and the off-bottom clutch to secure the desired operations of the off-bottom counter and the total depth counter to produce the same results as have been explained previously herein. Such stepping motors may be of suitable design and construction so that each impulse of current arriving over one line will produce a single step of the motor in a known direction, through a known and controlled angle of advance, with lock of the rotor at such point until the arrival of the next impulse arriving over another line. Thereupon the rotor will make a further angular advance of the same known amount and be locked at its newly advanced position, until the arrival of the next impulse. This next impulse may come either from the originally mentioned line or from a third line. In the former case the motor will be of a species in which the rotor's direction of rotation does not change, but is always the same. In such a case two such stepping motors may be set together end to end with their rotor shafts connected together, or two rotors and other elements may be mounted on a single shaft, the circuit and other arrangements being such that when one set of stator coils is used the shaft will be rotated in one direction, whereas when another set of stator coils is used the shaft will be rotated in reverse direction. Stepping motors of this general type are disclosed in the Ranseen patent, No. 2,343,325, referred to in my earlier patent, No. 2,671,346. In my said earlier patent I have disclosed an arrangement whereby the signalling unit may be driven in direction and amount corresponding to and proportional to the movements of the drilling string up and down, and have claimed such arrangements in broad language. In that case, however, the stepping motor is specifically shown as connected to the motor by switching means whereby the direction of rotation of the double motor unit therein shown is controlled by use of a "reverser" element which serves to determine which of two one-way stepping motors will receive the delivered impulses, according to the direction of movement of the drilling string—up or down. Another embodiment of that Ranseen type of stepping motor includes three sections instead of two, including three stator windings. By delivering the successive impulses to these three windings in rotation the direction of rotation of the stepping motor will depend on whether the order of the cycle be "A," "B," "C," "A," etc., or "A," "C," "B," "A," etc. The direction of rotation is thus determined by the order of the impulses. Thus, by provision of a "contactor" element driven back and forth by a suitable connection to the drilling string, both the timing and the order of sending, of the impulses will be controlled directly by the drilling string's movements. By receiving these successive impulses and delivering them to the three windings of such Ranseen type reversible stepping motor, a direct timing and direction control will be achieved.

As a futher feature of this type of signalling unit operation I contemplate the provision of two such reversible Ranseen type stepping motors in the signalling unit, one for direct operation of the off-bottom counter, and the other for direct operation of the total depth counter. A suitable control is then provided in the lines connecting the drilling string operated contactor sections to the windings of the two stepping motors of the signalling unit, so that when the movements of that drilling string or tackle element which drives the contactor are "significant" (correspond to actual drilling string movements) the successive impulses from the contactor will be usefully applied at the signalling unit. When, however, such drilling string or tackle element movements are "non-significant" (do not correspond to actual drilling string movements) the impulses generated at the contactor will not come to the signalling unit's stepping motors so that said motors will not then be driven by such "non-significant" impulses. I also provide means, such as the off-bottom counter microswitch, to interrupt the delivery of effective impulses from the contactor to the total depth counter stepping motor when such off-bottom counter indicates any reading other than zero. Thus, even though the impulses represent significant movements of the tackle element or other point of drive for the contactor, so that the off-bottom counter may be driven by its stepping motor to off-bottom reading positions, still, the off-bottom counter being away from its zero reading position, such impulses will not be also forwarded to the total depth counter stepping motor.

Reference is made to Figure 47 which shows such an arrangement in schematic form. In this figure I have indicated a rotary contactor at 393, a three winding stepping motor for driving the off-bottom counter by the numeral 394, a like motor for driving the total depth counter by the numeral 395, the off-bottom counter microswitch by the numeral 396, the deadline unit microswitch (or other suitable element which responds to the conditions of "loaded" and "unloaded") by the numeral 397, and a connection to the tackle or a tackle element by the numeral 398. The contactor 393 comprises a unit which includes a series of at least three contacts 399, 400 and 401 (or full multiples thereof), and a brush or movable contact 402 suitably mounted to engage the contacts 399, 400 and 401 in succession. A drum 403 receives the tension element, usually a small cable, 398, which tension element is wound on the drum, a retracting spring urging the drum in winding direction to wind the cable thereon during retracting movements, and also maintaining the cable under tension at all times. Such retractors are known in this art, and embodiments thereof are also shown in my said Letters Patent, No. 2,671,346. The drum is of sufficient size to take up enough cable to meet all requirements imposed by the required tackle and other movements. In practice the spacing of the center to center positions of the contacts 399, 400 and 401 should be such, when driven by the drum and cable arrangement, that movement of the cable between successive contacts would represent small increments of drilling string movement, for example, tenths of a foot. Accordingly, in practice there might be, say thirty contacts uniformly spaced around the circle, being ten contacts for each of three kinds of signals or impulses, "A," "B" and "C." In the embodiment illustrated there would be only a single impulse emitted for each of "A," "B" and "C," but this is illustrative only. The three contacts are therefore legended as "A," "B" and "C," respectively in Figure 47.

The off-bottom stepping reversible motor for the signalling unit is shown in its entirety at 394 and the total depth counter motor at 395. Each of these includes the three windings, generally stator windings, 404, 405 and 406, and 404$^a$, 405$^a$ and 406$^a$ (the suffixes "$a$" representing total depth counter motor windings for clarity of explanation). A source of D. C. is shown at 407 in the form of a battery. It is understood that in the schematic showing of this figure only a single winding of each motor is energized at a time (with the exception of a slight overlap specially provided in the motor's design for special purposes), so that when any given motor winding has been delivered an impulse that motor will advance a known and specified angular advance and will be held at its so-advanced position until the next impulse arrives and is delivered to the next winding of the motor's series. Accordingly, only one of the motor's windings is to be energized at a time. Such being the case I have shown the three lines 408, 409 and 410 extending from the contacts 399, 400 and 401 to the signalling unit. A suitable cable plug and socket connection is then provided between these supply lines and the wiring in the signalling unit. In the signalling unit these lines connect to one terminal of each of the motor windings 404 and 404a (from the line 408), 405 and 405a (from the line 409), and 406 and 406a (from the line 410). One terminal of the battery connects to the contact 402 by the line 411. The other terminal of the battery connects by the line 412 to the biased leaf spring contact 413 of the microswitch 397. One of the stationary contacts 414 of that microswitch (being the contact which is engaged by the leaf 413 when the dead-line is loaded), connects to a line 415 which leads to the signalling unit (preferably to the same cable plug as accommodates the lines 408, 409 and 410); and a continuation of this line 415 (when the cable is plugged to the signalling unit) extends directly to the free ends of the three windings 404, 405 and 406 of the off-bottom counter by the line 416. It is here noted that all three of the windings of each stepping motor are shown as being "star" connected at a common point, and thus I have shown a connection from the line 416 to this common point of the off-bottom stepping motor. Accordingly, whenever the movements of the tackle or other point of connection to the cable 398 are "significant," the signals emitted by the contactor will come directly to the off-bottom stepping motor 394, driving it in the one direction or the other, or developing magnetizing forces in its windings tending to do so. When the shaft of such off-bottom motor is connected to the off-bottom counter by the friction drive connection 158, the impulses representing off-bottom movements will produce off-bottom movements of the off-bottom counter through such friction drive connection. When the impulses coming from the contactor represent down movements of the tackle, such impulses will also drive the off-bottom counter in the down reading direction until such counter locks at its zero position. At that instant further down impulses coming from the contactor will drive the off-bottom stepping motor in the "down" direction, but since such counter is then locked at zero there will be slip at the friction drive connection each time a stepping motor advance occurs in the down direction. As soon as an "up" movement signal comes from the contactor, however, the stepping motor will advance in the "up" direction, and such advance will be transmitted through the friction drive connection to the off-bottom counter.

In some cases, and as a simple embodiment, the friction drive element may be eliminated and the stepping motor 394 may be connected directly to the input element (such as the shaft) of the off-bottom counter. Then, when such counter has counted down to its zero position (representing an "on-bottom" condition of the bit), such counter will lock against further down counting movements due to impulses representing the drilling of new footage of bore hole. As long as such new footage is being drilled the off-bottom counter will be locked against further down counting movement notwithstanding the fact that the impulses corresponding to down movement of the drilling string will continue to be delivered to such counter's stepping motor during drilling of the new footage. Thus the stepping motor 394 will also be locked against rotation in the down count direction and the impulses received by it during drilling of new footage will be ineffective, such stepping motor being thus locked against rotation by such impulses, but without damage to such motor.

The line 415, being the return line, also connects by a line 417 to one of the stationary contacts 418 of the off-bottom counter microswitch 396, being that stationary contact which is engaged by the leaf contact when the off-bottom counter is zeroized. The leaf contact 419 of that microswitch connects by the line 420 to the free ends (central point of the "star") of the windings of the stepping motor 395 for the total depth counter. Thus, whenever the off-bottom counter stands at its zero position, during down movements of the drilling string, the impulses from the contactor will also be delivered to the total depth counter; and since these impulses will be coming in that order or sequence which represents down drilling movement it is evident that the total depth counter will be caused to register such new increments of depth drilled. Immediately that any off-bottom movement occurs the microswitch 396 will separate its leaf contact 419 from its stationary contact 418 to discontinue delivery of impulses to the stepping motor 395 as long as such microswitch remains open. It is noted that even if such "reverse" direction impulses should reach the total depth counter and cause drive tendency of its shaft in the off-bottom direction, such movements of its shaft would not be delivered to the total depth counter since the hold-back clutch would effectively prevent any reverse rotation.

It will be understood from much that has been explained above, that such stepping motor drive arrangement may be substituted for the "clutch" arrangements, by substituting the two stepping motors at the locations assigned to the clutches in various of the figures, eliminating any shaft connection from the off bottom counter stepping motor to the total depth counter stepping motor, and eliminating the pulleys and the need of bringing the cable to said pulleys of the signalling unit. It will also be seen that by use of this stepping motor drive arrangement the signalling unit may be located either on the derrick, or distant therefrom. In the latter case the impulses delivered by the contactor on the derrick and which contactor is operatively connected to the tackle or other suitable unit, would be transmitted to the signalling unit by a cable connection. Such cable would carry the three wires 408, 409 and 410, as well as the common return line 415.

There may arise conditions under which it is desired to indicate at all times the amount of drilling string which is in the bore hole, so that as the drilling string is raised and lowered from time to time information will be continuously supplied as to the exact elevation at which the bit is located. For this purpose an algebraic counter (one which counts both up and down according to the direction in which its shaft is rotated), 422 (indicated by the dotted lines in Figure 4) may be provided. This will show at all times the depth of the bit below datum, being also the length of drilling string below datum in the hole. This counter when provided will be driven by a gear or chain and sprocket connection from the shaft 153a of the dead-line clutch (being the driven shaft of that clutch). The drive in such case will be so made that down movements of the drilling string will produce higher readings of such counter, and up movements of the drilling string will cause the counter to move to lower readings. Such counter might be pre-set to its zero position when the bit was at the top or datum position, and when the bit had been lowered to "bottom" such counter would then read a value the same as the reading of the total depth counter. Of course the deadline clutch would, in such case, ensure correct functioning of such counter 422 for its intended purposes. In case of drive of the shaft 153a by the stepping motor 394 a like arrangement would be used for drive of the counter 422, such drilling string length counter then being driven by the shaft of such stepping motor 394 back and forth according to the raisings and lowerings of the drilling string, but showing at all times the exact location of the bit below datum.

Figure 31 shows a schematic wiring diagram or circuit arrangement of the signalling unit when provided with clutches of the differential type hereinbefore described. In this figure I have indicated the several principal units by the following numerals; the dead-line clutch, 156ª, its microswitches, 383 and 384, its solenoids, 371 and 372; the off-bottom clutch, 157ª, its microswitches, 383ᵇ and 384ᵇ, its solenoids, 371ᵇ and 372ᵇ; the off-bottom microswitch, 122ª, a "time-out" or "time-count" microswitch, 122ᵇ (when such switch is to be separated from the off-bottom switch; otherwise the contacts of the off-bottom microswitch may serve to give the time-out signals); lamps contained in the signalling unit for lighting the same when the counters and other units are to be examined, 423; the switch for such lamps, 424; battery connection sockets for the supply of D. C. to the signalling unit, 425 and 426; a three terminal socket to receive a corresponding plug on the three conductor cable connecting the signalling unit to the deadline microswitch, 427; a six terminal socket to receive a corresponding plug on a six conductor cable connecting the signalling unit to a recorder capable of translating the signals and producing a record of the depths and based on the time values (net drilling times) to drill the successive increments (usually feet), 428; main switch to cut off main current supply to the signalling unit when not in service or in case of emergency, 429; and protective fuses in the main supply lines between the battery supply sockets 425 and 426, and the bus bars of the signalling unit, 430. The idler pulley is also shown at 61 in this figure.

Conveniently I have provided a connection strip 431 in the upper portion of the housing of the signalling unit. Numerous connector blocks 432 are carried by this strip, and the terminals of all electrical elements are brought to the individual blocks 432, and proper interconnections are then established between the various blocks 432 to provide the intended connections between the several units. Such interconnections are shown in Figure 31.

A suitable weather tight enclosure is provided for the operating elements of the signalling unit. Reference has already been made to the front plate 58 which is provided with the hinged door 56. Conveniently, I provide two vertical posts extending up from the base plate or bar 66 at the right-hand end of the signalling unit. Only one of these is shown, being in the form of an angle bar 433 in Figure 4. These two angle bars are separated from each other from front to back a distance corresponding to the front to back dimension of the vertical pulley supporting bar 68. The upper portions of the said posts are then connected to the bar 68 by horizontally extending frame members (not shown) and said upper post portions are also connected together by a front to back extending horizontal frame member (not shown). Thus a rectangular frame section is provided at the upper portions of the housing, and at an elevation above the various units. The front plate 58 is secured to the base bar 66 and to one of the top frame members, and to the front right-hand post, and to the bar 68 in weather tight fashion. Likewise the back plate 58ª is connected to corresponding frame elements; and a plate is set against the front and back right-hand posts, the bar 66, and the front to back extending right-hand element in weather tight fashion. A suitable cover 434 is then set onto the top of the shell enclosure thus provided, and anchored in place by suitable clips, such as shown at 435 in Figures 2 and 3.

When the signalling unit is to be installed on the derrick such installation may conveniently be made in the following manner:

A stiff post is set onto one of the ground level beams which support the driller's platform about ten feet above ground level, such platform being usually supported by posts carried by such ground level beams. Such special stiff post is extended through an ample opening of the driller's platform to a point about four feet above the driller's platform level. Such ample opening is large enough to allow of expected vibrations of the derrick and other structures, without causing the driller's platform to strike against the special post. A horizontal bar is strongly secured to the top of such special post, such bar being of substantially the same size and shape as the signalling unit bar 66. The signalling unit is then set onto such post bar and secured thereto in strong fashion as by the screws 436 shown in Figure 5. The operating cable and retractor, and other elements may then be set into positions as required by the derrick and other installation elements of the drilling rig.

The signals of completion of drilling depth increments and of off-bottom and time-out or time-count, etc. will be delivered over the cable connected to the socket 428 shown in Figure 31. The recorder, tabulator, or other selected unit to receive and translate the signals may then be located at any convenient location, either on the derrick or away therefrom, and either near or far. In my said Letters Patent, No. 2,671,346 I have shown numerous recording and other signal translating features, so it is not deemed necessary to disclose such units in great detail here. However, in Figures 44, 45 and 46 I have chosen to illustrate a means whereby such signals may be used to automatically operate the two styluses of a conventional form of geolograph. That type of recorder is one in which there is provided means to continuously advance a record surface, generally in the form of a strip wrapped around a cylinder, such cylinder being rotated at uniform speed, usually once each twelve or twenty-four hours. At completion of the time lapse of the tape it is removed and a fresh tape is substituted therefor.

In that type of instrument time is therefore measured along the length of the tape. The depth increment stylus, generally one foot per increment, traces a continuous straight line along the tape as the cylinder rotates; but at completion of each increment, such as a foot, such stylus is given a lateral kick with immediate return to its normal line tracing position. Accordingly, the time distance along the tape between successive kicks is a measure of elapsed time consumed during the drilling of the successive feet. It is noted that I have used the expression "elapsed time" just above. In order to enable the student of such a trace to determine, by further measurements and operations what amount of time was not used for "drilling" during such "elapsed time" use is made of the second stylus, usually called the "time-out stylus." For such purposes that stylus is operated as follows:

Such time-out stylus may be set back and forth laterally of the strip to stand in either of two positions. One of these is the normal or time-count position, and the other is the "time-out" position. When in either position such stylus will trace a straight line along the strip at the then position of the stylus. Upon shifting the stylus to its other position the trace will be produced also straight along the strip but at a location off-set laterally of the strip by the amount of the lateral shift of the stylus. The shift of this stylus is conventionally produced manually by the driller or other person, at such times as he judges that drilling is actually discontinued or re-commenced, as the case may be. Such manual shifts are also dependent on the accuracy of the driller's judgment as to when the bit is restored to bottom, in case it has previously been raised off bottom, since of course drilling can be restored only when the bottom condition is again attained.

In the conventional form of such geolograph unit the kicks of the first mentioned trace, representing completion of successive increments of drilling, are produced by a connection to the tackle, but such arrangement does not include any provision for discontinuing such connection when the tackle is disconnected from the drilling string. Accordingly, when "making a joint" and at various other times and under various conditions of operation it is necessary to disconnect the geolograph unit from the tackle and afterwards restore the connection in order to resume the normal geolograph operations and trace makings.

The unit shown in Figures 44, 45 and 46 is intended to cause the geograph styluses to effect their kicks and their lateral displacements and restorations of the "time-out" stylus completely automatically and without dependence on the judgment of the driller, or danger of failure to make the required manual operations, and to make them at the exact times when they should be made to produce accurate and fully automatic records of the geograph type.

This unit includes a base plate 437 of size and form to be seated in the lower portion of the geograph housing, and on the floor thereof. This plate includes two actuating elements as follows: the lower portion of Figure 44 being at the rear of the geograph housing and the upper portion of said figure at the front of such housing:

A rock arm 438 is pivoted at the point 439 to a stud 440 extending up from the base plate. Two solenoids 441 and 442 are secured to the base plate behind and in advance of the stud and beneath the rock arm. The armatures of these solenoids, 443 and 444, respectively, are bifurcated and receive the rock arm through their bifurcations; and such armatures are pivotally connected to the rock arm so that proper freedom of movement and angularity are provided for. The arrangement is such that when one solenoid is energized its armature is drawn down with corresponding rock of the rock arm, and when the other solenoid is energized its armature is drawn down with restoring rock of the rock arm. The free end of such rock arm is provided with a blunt point 445. An arm 446 is pivoted to the base plate at its lower end and is free to rock slightly towards and from the solenoid 442. This arm carries a roller 447 which engages the pointed end of the rock arm 438; and a spring 448 draws the arm towards such pointed end. This roller is carried at an elevation above the base plate such that during rock of the arm 438 in either direction the roller is forced slightly away from the solenoid by the pointed end 445, but during the travel of the rock arm its pointed end passes the roller and allows the roller to move back towards the solenoid under the urging of the spring. Thus this roller arrangement ensures that the rock arm will remain in its fully moved position, either up or down, as the case may be until purposely rocked to its opposite position by energization of the proper solenoid.

The rock arm 438 is provided with an angular upwardly extending branch 449, and a link 450 is pivotally connected to this branch at the point 451. This link has its upper end connected in suitable manner to the "time-out" stylus or stylus carrier of the geograph so that when the rock arm 438 is in one position of rock such stylus stands in its normal line tracing position, but when such rock arm is in its other position of rock such stylus is shifted laterally with respect to the direction of travel of the strip whereon the records are being made, and then produces its continuing trace in an off-set location. When the time-out condition terminates, or when time is again to be counted, the other solenoid is energized to restore the rock arm to its normal time count trace producing location of the stylus. Thus the time-out condition is indicated by the time readings of commencement and termination of the lateral shift of such stylus. The two solenoids receive their energizations from the two stationary contacts of the off-bottom counter microswitch of the signalling unit through suitable cable lines. These will be referred to hereinafter.

With the foregoing means to produce the signals to these solenoids it is evident that when each stationary contact of the microswitch of the signalling unit is engaged by the leaf contact of that switch such engagement will generally continue for a considerable interval of time. In order to shut off the current to each of the solenoids 441 and 442 after such solenoid has received the first impulse of current I have provided the microswitches 452 and 453 for the two solenoids 441 and 442, respectively. These microswitches are mounted on the respective solenoids in such positions that their operating studs 454 and 455 will be engaged by the arm 438 as it rocks down under the urge of each solenoid, to depress such stud shortly before completion of such down movement, and to retain such stud in depressed position as long as such rock arm remains in its said position. These microswitches are each provided with two stationary contacts and the intermediate leaf contact, biased, and operate according to the principles already explained. The several contacts of each microswitch are brought into the operating circuits in such manner that the reversal of the leaf contact of each switch by the down rock of the corresponding end of the rock arm will both discontinue supply of current to the solenoid corresponding to such switch, and at the same time condition the circuits to the other solenoid so that when the signalling unit microswitch reverses to deliver current over the line connected to the then engaged stationary contact of such signalling unit microswitch such new engagement will find the line to such other solenoid conditioned to deliver its impulse to such other solenoid and thus reverse the rock arm 438. Such reversal of the rock arm will then depress the microswitch stud corresponding to such other solenoid, shutting off the current after a very short impulse and also conditioning the first circuit for a new operation. Such forms of shutting off microswitch circuits are shown and described in detail in my said Letters Patent No. 2,671,346, and it is not deemed necessary to illustrate or describe them in repeated detail here.

From the foregoing it is evident that the rocks of the arm 438 are produced by very short impulses of current, and with very small current consumption even when sufficiently strong solenoids are used to produce the desired operations.

It is also noted that although I have earlier in this case referred to the signalling unit microswitch as the off-bottom counter microswitch, still its switching functions may be used for producing the primary controls for the "time-out" or "time-count" operations, since it is evident that no drilling can occur when the bit is off bottom. Accordingly I have, largely as a matter of simplification, used the stationary contacts of that microswitch for delivering the impulses needed to operate the "time-out" recording element, being that element which produces the needed information from which to make corrections of the elapsed times for the successive increment drilling operations, in order to obtain the correct "net drilling times."

Next, I have provided a second rock arm 456 for producing the kicks of the stylus which produces the trace to show completion of intervals for drilling the successive feet. This rock arm is pivoted to the stud 457 projecting up from the base plate 437. The two solenoids 458 and 459 are mounted on the base plate beneath the end portions of this rock arm 456, with their armatures pivotally connected to the rock arm end portions, and the microswitches 460 and 461 are mounted on these solenoids in manner similar to the arrangement above described respecting the solenoids 441 and 442 and the microswitches 452 and 453. The solenoids 458 and 459 receive their impulses from the two stationary contacts of the full-foot microswitch 145 of the total depth counter (see Figures 22 and 23, and others). The microswitches 460 and 461 are connected into the circuits extending between such stationary contacts of the microswitch 145 and the solenoids 458 and 459 to produce control effects similar to those explained in connection with the solenoids 441 and 442, and their microswitches 452 and 453, namely, to ensure production of short impulse operations of the rock arm 456.

The near end of the rock arm 456 acts, through a trigger arrangement, to engage a vertical link 462 when such near end is in its raised position, so that at a later time the depression of such near end of the rock arm will draw down such link, and, by the trigger connection, such rock arm near end will disengage from the link shortly prior to completion of the downward movement, allowing the link to snap up again. It will then remain in such up position. Thereafter, when the solenoid 459, far end, is energized reversing the rock arm, and raising the near end thereof, the trigger will again engage with the link 462, ready for a down shifting movement with corresponding functions, when the solenoid 458 is next energized at completion of the next full foot of drilling. Thus the two stationary contacts of the full-foot microswitch are used, the one for delivering the signal at actual completion of the full foot, the other for restoring the parts, including the trigger connection, to conditions ready for the proper kicking operation at completion of the next full foot.

The upper end of the link 462 is connected to the kick stylus in such manner that the momentary depression of such link produces the short lateral kick to the stylus location, immediately permitting such stylus to return to its normal line tracing location for continuing its line tracing function.

Conveniently a multiple point socket 463 is mounted on the plate 437, such socket being adapted to receive a matching multiple conductor plug of the cable having its other end connected to the terminals 428 of the recorder, and shown in Figure 31. The several points of such socket 463 are connected properly to the several solenoid and microswitch terminals of the elements on the base plate 437.

It is pointed out that the arrangement shown in Figures 44, 45 and 46 produces a different kind of a record from those records specifically referred to in my said earlier patent, No. 2,671,346, but nevertheless such geolograph unit produces a recording of the material from which to derive the information as to net drilling time to drill each full foot, and without need of any manual operations on the part of the driller or other person, and without need of using human judgment as to the exact time when the bit reaches its bottom position after having been raised off bottom; and without need of using human judgment as to the exact point in the movement of the drilling string at which the bit is "on bottom" in the sense that it has been returned to exactly the depth of the hole which it occupied when it was previously raised.

It is also pointed out that by use of the arrangements herein disclosed all operations of "making joints" and adding or removing "stands of joints" during round trips, are automatically performed, as far as concerns the operations of the signalling unit, and that no setting of counters or other elements is necessary either prior to or directly after introducing a joint of pipe into the drilling string, in order to continuously and accurately measure the depths of the hole to its bottom. Many of these features have been disclosed and enlarged upon in said earlier patent, No. 2,671,346.

Referring to Figure 43, I have therein shown a typical "spring unit" of the type produced by Byron Jackson Co., and widely used in the drilling industry at the present time. This unit includes the hook or bail 464 which is engaged with a cross bar 465 of the spring unit, such element 464 being the hook which is connected to the tackle block or some corresponding element. The two hangers 466 and 467 depend from the ends of such cross bar 465 and carry another cross block 468 at their lower ends. A cylindrical housing 469 extends up from the cross block 468 between the hangers 466 and 467, and is rotatably mounted on such cross block by the ball bearing element 470. In the upper end portion of the cylindrical housing there is vertically movable the head block 471, and the downward movement of such head block is limited by engagement with the shoulder 472 of the housing. Strong springs 473 are set between the head block 471 and the lower end of the housing, being within the housing. These springs urge the head block upwardly under strong compression. The vertical tension bar 474 has its upper end secured to the head block, and the lower portion of this tension bar extends down through the lower cross block 468. The hook element (not shown) is then connected to the lower end of this tension bar, and the usual swivel block and mud connection element are carried by such hook element, including the upper end of the kelly and the upper ends of the "elevators."

Usually a cover plate is set onto the upper end of the housing 469. By removing such cover plate the top surface of the head block 471 is exposed. This head block moves in exact harmony with the kelly and the elevators since it is directly connected to the upper end of the vertical tension bar 474. Upon removing the cover plate of the housing, above mentioned, I propose to set a block of high permeability, high retentivity, metal or alloy onto the top surface of this head block, such block of metal or alloy being first strongly magnetized and comprising a large permanent magnet. For example, such permanent magnet may be formed of "Alnico" metal, which is widely used in the electrical and related arts. This block will be of size such that it can be set down into the upper portion of the housing 469 and onto the head block to which it will then adhere with great strength. Such permanent magnet is shown at 476 in Figure 43. It is provided with an eye or other suitable element 477, to which the light cable for operation of the signalling unit pulley, or for operation of the contactor element, may be connected. Thereafter, during the various movements of the tackle, up and down, loaded and unloaded, such magnet block will necessarily exactly follow the drilling string movements, whenever such drilling string is connected to and supported by the tackle.

In order to enable ready detachment of the strong permanent magnet from the head block, I have shown the threaded stud 478 extended down through the thickness of such magnet block, to the lower surface thereof which contacts the top surface of the head block, and to which the permanent magnet normally adheres with great force. Upon threading this stud down to force its lower end against the surface of the head block, and then continuing such threading a further amount, the head block will be forced to break its magnetic engagement with the head block, and can be lifted out from the housing of the spring unit without difficulty.

I claim:

1. In a well drilling operation, the combination with the drilling string, and the tackle to raise and permit lowering of such string under control, of a measuring unit including a counting element operable progressively only in a selected direction proportionately to amounts of new bore hole penetrated, an off-bottom algebraic counter, a first drive shaft, connections between said tackle and said first drive shaft effective to rotate said shaft in direction corresponding to the direction of drilling string movement and in amount proportional to amount of drilling string movements, said off-bottom algebraic counter including means to discontinue off-bottom counter movements in the down counting direction at the zero count position and to permit movement of said counter in the up count direction from said zero count position, off-bottom counter switching means, means to cause said switching means to emit a first defined signal when the off-bottom counter is at its zero reading position, means to cause said switching means to discontinue emission of said first defined signal when the off-bottom counter is at a position other than said zero reading position, a drive connection from the first drive shaft to the off-bottom counter effective to drive said counter in direction corresponding to direction of rotation of said first drive shaft, said drive connection including a yieldable driving element effective to permit movement of the drive shaft in the direction corresponding to down movement of the drilling string when the off-bottom counter remains stationary at its zero count position, and effective to cause movement of the off-bottom counter to higher count readings for all movements of the first drive shaft in the drilling string off-bottom direction, actuating connections between the first drive shaft and the element which is operable progressively only in the selected direction proportionately to amounts of new bore hole penetrated, said last named connections including an off-bottom clutch element having an output driven element, connections between said output driven element and the progressively operable element effective for actuation of said progressively operable element, means to make said clutch element effective for actuation of the output driven element, means to make said clutch element ineffective for non-actuation of the output driven element, and connections from the off-bottom counter switching means to the means to make effective said clutch element when the off-bottom counter switching means emits said first defined signal, and to make ineffective said clutch element when the off-bottom counter is at a position other than said zero reading position.

2. Means as defined in claim 1, wherein the counting element which is operable progressively only in a selected direction proportionately to amounts of new bore hole penetrated comprises a mechanically operated counter having an input driving connection, and wherein the connections between the output driven element of the off-bottom clutch element and the progressively operable element which are effective for actuation of said progressively operable element comprise connections between the output driven element of the off-bottom clutch element and the input connection of the mechanically operated counter.

3. Means as defined in claim 1, wherein the counting element which is operable progressively only in a selected direction proportionately to amounts of new bore hole penetrated comprises an electrically operated counter, and wherein the connections between the output driven element of the off-bottom clutch element and the progressively operable element which are effective for actuation of said progressively operable element comprise electrical connections.

4. Means as defined in claim 1, together with electrical impulse delivering means in connection with the output driven element of the off-bottom clutch element, said impulse delivering means being constituted to deliver an impulse corresponding to completion of each pre-determined increment of movement of said output driven element.

5. Means as defined in claim 4, wherein the counting element which is operable progressively only in a selected direction proportionately to amounts of new bore hole penetrated comprises an electric impulse operated counter, and wherein the actuating connections between the output driven element of the off-bottom clutch element and the aforesaid counting element comprise electrical connections between impulse delivering means and said electric impulse operated counter.

6. Means as defined in claim 1, together with means to lock said counting element which is operable progressively only in a selected direction proportionately to amounts of new bore hole penetrated, against operation in the contrary direction.

7. Means as defined in claim 1, together with means to cause said switching means to emit a second defined signal when the off-bottom counter is at a position other than said zero reading position.

8. In a well drilling operation, the combination with a drilling string, the tackle to raise and to permit lowering of such string under control, and means to produce a signal corresponding to tackle movements which correspond to drilling string movements and a contrary signal corresponding to tackle movements which do not correspond to drilling string movements, of a signalling unit to produce and deliver signals of completion of successive equal increments of depth drilled comprising an off-bottom algebraic counter, a total depth counter, a drive shaft, connections between said drive shaft and the tackle effective to rotate said shaft in direction corresponding to the direction of drilling string movement and in amount proportional to amount of drilling string movements, means to make ineffective said connections when said contrary signal is emitted and to make effective said connections when said first mentioned signal is emitted, said off-bottom algebraic counter including means to discontinue counter movement in the down counting direction at the zero position and to permit movement of said counter in the up count direction from said zero count position, off-bottom counter switching means, means to cause said switching means to emit a signal when the off-bottom counter is at its zero reading position, a drive connection from the drive shaft to the off-bottom counter effective to drive said counter in direction corresponding to direction of rotation of the drive shaft and in amount proportional to the amount of rotation of the drive shaft, said drive connection including means effective to permit movement of the drive shaft in the direction corresponding to down movement of the drilling string when the off-bottom counter remains at its zero count position, and effective to cause movement of the off-bottom counter to higher count readings for all movements of the drive shaft in the drilling string off-bottom moving direction, and connections from the drive shaft to the total depth counter effective to advance said total depth counter when the drive shaft rotates in direction corresponding to lowering movements of the drilling string, said connections including the off-bottom counter switching means at the zero-reading position of the off-bottom counter.

9. In a well drilling operation, the combination with a drilling string, the tackle to raise and to permit lowering of such string under control, and means to produce a signal corresponding to tackle movements which correspond to drilling string movements and a contrary signal corresponding to tackle movements which do not correspond to drilling string movements, of a signalling unit to produce and deliver signals of completion of successive equal increments of depth drilled comprising an off-bottom algebraic counter, a drive shaft, connections between said drive shaft and the tackle effective to rotate said shaft in direction corresponding to the direction of drilling string movement and in amount proportional to amount of drilling string movements, means to make ineffective said connections when said contrary signal is emitted and to make effective said connections when said first mentioned signal is emitted, said off-bottom algebraic counter including means to discontinue counter movement in the down counting direction at the zero position and to permit movement of said counter in the up count direction from said zero count position, off-bottom counter switching means, means to cause said switching means to emit a signal when the off-bottom counter is at its zero reading position, a drive connection from the drive shaft to the off-bottom counter effective to drive said counter in direction corresponding to direction of rotation of the drive shaft and in amount proportional to the amount of rotation of the drive shaft, said drive connection including means effective to permit movement of the drive shaft in the direction corresponding to down movement of the drilling string when the off-bottom counter remains at its zero count position, and effective to cause movement of the off-bottom counter to higher count readings for all movements of the drive shaft in the drilling string off-bottom moving direction, a signal emitting element, and connections from the drive shaft to the signal emitting element effective to actuate said signal emitting element to emit signals corresponding to drive shaft advances which correspond to increments of drilling when said shaft rotates in direction corresponding to lowering movements of the drilling string, said connections including the off-bottom counter switching means at the zero-reading position of the off-bottom counter.

10. Means as defined in claim 9, wherein the signal emitting element comprises a switch unit.

11. Means as defined in claim 10, wherein said switch unit comprises a microswitch having two switching positions, and wherein the connections from the drive shaft to said unit include means to move said unit to both of said switching positions in succession corresponding to drive shaft rotation by amount corresponding to an increment of drilling string movement.

12. Means as defined in claim 9, together with a total depth counter and connections between the signal emitting element and the total depth counter and the drive shaft effective to advance the total depth counter when the drive shaft rotates in direction corresponding to lowering movements of the drilling string with the off-bottom counter switching means at the zero-reading position of the off-bottom counter.

13. In a well drilling operation, the combination with the drilling string, the tackle to raise and to permit lowering of such string under control, and means to produce a signal corresponding to tackle movements which correspond to drilling string movements and a contrary signal corresponding to tackle movements which do not correspond to drilling string movements, of a signalling unit to produce and deliver signals of completion of successive equal increments of depth drilled comprising an off-bottom algebraic counter, a total depth counter unit, a drive shaft, connections between said drive shaft and the tackle effective to rotate said shaft in direction corresponding to the direction of drilling string movement and in amount proportional to amount of drilling string movements, means to make ineffective said connections when said contrary signal is emitted and to make effective said connections when said first mentioned signal is emitted, said off-bottom algebraic counter including means to discontinue off-bottom counter movements in the down counting direction at the zero count position and to permit movement of said counter in the up count direction from said zero count position, off-bottom counter switching means, means to cause said switching means to emit a signal when the off-bottom counter is at its zero reading position, a drive connection from the drive shaft to the off-bottom counter effective to drive said counter in direction corresponding to direction of rotation of the drive shaft and in amount proportional to the amount of rotation of the drive shaft, said drive connection including a yieldable driving element effective to permit movement of the drive shaft in the direction corresponding to down movement of the drilling string when the off-bottom counter remains stationary at its zero count position, and effective to cause movement of the off-bottom counter to higher count readings for all movements of the drive shaft in the drilling string off-bottom moving direction, a total depth counter unit actuating connection from the drive shaft to the total deph counter unit, said last named connection including an off-bottom clutch element having a total depth counter actuating element, means to make said clutch element effective for actuation of the total depth counter unit, and means to make said clutch element ineffective for non-actuation of the total depth counter unit, and connections from the off-bottom counter switching means to the means to make the off-bottom clutch effective to actuate the total deph counter when the off-bottom counter switching means emits said first mentioned signal and to make the off-bottom clutch ineffective for non-actuation of the total depth counter when the off-bottom counter switching means emits said second mentioned signal.

14. Means as specified in claim 13, wherein the total depth counter unit comprises a shaft driven counter unit.

15. Means as specified in claim 13, together with means to lock the actuating connection to the total depth counter unit against movement in direction to actuate said total depth counter corresponding to drive shaft movements in the direction corresponding to up movements of the drilling string.

16. Means as specified in claim 15, wherein the means to lock the actuating connection from the drive shaft to the total depth counter unit locks said actuating connection against movement in direction to actuate total depth couner to lower count reading positions.

17. Means as specified in claim 13, wherein said yieldable driving element comprises a friction drive element.

18. Means as specified in claim 17, wherein said friction drive element includes means to adjust the amount of friction of said friction drive element.

19. Means as specified in claim 13, wherein the connections between the drive shaft and the tackle include a clutch, said clutch including means to produce the clutching action and means to make ineffective said clutching action producing means, and wherein the means to make ineffective said connections when said contrary signal is emitted which signal corresponds to tackle movements which do not correspond to drilling string movements causes the means to function which makes ineffective said clutch action producing means.

20. Means as specified in claim 13, wherein the off-bottom clutch element includes a driving shaft and a driven shaft, and wherein the total depth counter unit drive connection includes a connection between the drive shaft first mentioned and the off-bottom clutch driving shaft and includes a connection between the driven shaft of the off-bottom clutch and the total depth counter unit.

21. Means as specified in claim 20, wherein both the driving shaft and the driven shaft of the off-bottom clutch rotate in the same direction when said clutch element is effective for drive of the total depth counter unit.

22. Means as specified in claim 21, wherein the connection between the off-bottom clutch driven shaft and the total depth counter unit includes means to cause the total depth counter unit to rotate in the same direction of rotation as the driven shaft of the off-bottom clutch.

23. Means as specified in claim 21, wherein the driving shaft of the off-bottom clutch and the driven shaft of said clutch rotate in opposite directions when said clutch element is effective for drive of the total depth counter unit.

24. Means as specified in claim 23, wherein the connection between the off-bottom clutch driven shaft and the total depth counter unit includes means to cause the total depth counter unit to rotate in direction of rotation opposite to the direction of rotation of the driven shaft of the off-bottom clutch.

25. Means as defined in claim 19, wherein said clutch includes a drive element and a driven element, and wherein the means to produce the clutching action includes means to drivingly connect the drive element and the driven element, together with a connection between the driven element and the drive shaft.

26. Means as defined in claim 25, wherein the driving element and the driven element of said clutch both rotate in the same direction, when said clutch element is effective for drive of the drive shaft first mentioned.

27. Means as defined in claim 25, wherein the driving element and the driven element of said clutch rotate in opposite directions, when said clutch element is effective for drive of the drive shaft first mentioned.

28. In a well drilling operation, the combination with a drilling string, the tackle to raise and to permit lowering of such string under control, and means to produce a signal corresponding to tackle movements which correspond to drilling string movements and a contrary signal corresponding to tackle movements which do not correspond to drilling string movements, of a signalling unit comprising an off-bottom algebraic counter, another counter, a drive shaft, connections between said drive shaft and the tackle effective to rotate said shaft in direction corresponding to the direction of drilling string movement and in amount proportional to amount of drilling string movements, means to make ineffective said connections when said contrary signal is emitted and to make effective said connections when said first mentioned signal is emitted, said off-bottom algebraic counter including means to discontinue counter movement in the down counting direction at the zero position and to permit movement of said counter in the up count direction from said zero count position, a drive connection from the drive shaft to the off-bottom counter effective to drive said counter in direction corresponding to direction of rotation of the drive shaft and in amount proportional to the amount of rotation of the drive shaft, said drive connection including means effective to permit movement of the drive shaft in the direction corresponding to down movement of the drilling string when the off-bottom counter remains at its zero count position, and effective to cause movement of the off-bottom counter to higher count readings for all movements of the drive shaft in the drilling string off-bottom moving direction, said other counter being an algebraic counter, and driving connections from the drive shaft to said other counter effective to rotate said counter in direction and by amounts proportional to rotary movements of the drive shaft, said other counter being a tool position counter, the sum of the readings of the tool position counter and the off-bottom counter being equal to the depth of the well hole at any given time.

29. In a well drilling operation, the combination with the drilling string, the tackle to raise and to permit lowering of such string under control, and means to produce a signal corresponding to tackle movements which correspond to drilling string movements and a contrary signal corresponding to tackle movements which do not correspond to drilling string movements, of a measuring unit comprising an off-bottom algebraic counter, a total depth counter, a first drive shaft, connections between said first drive shaft and the tackle effective to rotate said shaft in direction corresponding to the direction of drilling string movement and in amount proportional to amount of drilling string movements, means to make ineffective said connections when said contrary signal is emitted and to make effective said connections when said first mentioned signal is emitted, a drive connection from the first drive shaft to the off-bottom counter effective to drive said counter in direction corresponding to direction of rotation of the first drive shaft and in amount proportional to the amount of rotation of the first drive shaft, means to discontinue down counting of said off-bottom counter at the zero count position and to make effective the drive connection from the first drive shaft to said off-bottom counter for all movements of said first drive shaft in direction corresponding to movements of the drilling string in the off-bottom moving direction, off-bottom counter switching means, said switching means having a first switching position when said off-bottom counter is at its zero reading position and having a second switching position when said off-bottom counter is at any position other than said zero reading position, a second drive shaft, connections between said second drive shaft and the tackle effective to rotate said shaft in amount proportional to amount of drilling string movements, first interrupting means in said connection, said first interrupting means including the second defined switching position of the off-bottom counter switching means, and second interrupting means in said connections, said second interrupting means including the means which produces a signal corresponding to tackle movements which correspond to drilling string movements and produces a contrary signal corresponding to tackle movements which do not correspond to drilling string movements.

30. Means as specified in claim 29, wherein the connections between the first drive shaft and the tackle and the connections between the second drive shaft and the tackle include means common to both of said connections, said common means including an element in connection with the tackle and movable therewith in amount proportional to amounts of tackle movement and in directions corresponding to directions of tackle movement.

31. Means as specified in claim 30, wherein the connections between the second drive shaft and the tackle include an off-bottom clutch, and wherein the first interrupting means includes means to make said clutch inoperative when the off-bottom counter switching means is in the second defined position.

32. Means as specified in claim 30, wherein the common means includes a plurality of stationary contacts, and wherein the element which is in connection with the tackle and movable therewith comprises a movable contact mounted in position to engage said stationary contacts in succession, and wherein the order of succession of said engagements of said movable contact with the stationary contacts corresponds to the direction of tackle movement, and wherein the connections between the first drive shaft and the tackle include a first stepping motor having a plurality of windings, and wherein the connections between the second drive shaft and the tackle include a second stepping motor having a plurality of windings, and wherein the means to make ineffective the connections between the first drive shaft and the tackle, and the second interrupting means in the connections between the second drive shaft and the tackle effective, comprises the means to produce the contrary signal.

33. In a well drilling operation, the combination with the drilling string, the tackle elements to raise and permit lowering of such string under control, and means to produce a signal corresponding to tackle movements which correspond to drilling string movements and a contrary signal corresponding to tackle movements which do not correspond to drilling string movements, of a first defined measuring unit comprising an off-bottom algebraic counter, a second defined measuring unit including a counting element operable progressively only in a selected direction proportionately to amounts of new bore hole penetrated, said off-bottom algebraic counter including counting elements, a main counter actuating element in driving connection with said counting elements, means to lock said actuating element against down count movement when the counting elements are at the zero position and constituted to permit movement of said actuating element and the counting elements in the up count direction from the zero count position, off-bottom counter switching means having a first defined circuit closed position and a second defined circuit open position, means to move said off-bottom counter switching means to said first defined circuit closed position when the off-bottom counter is at zero count position and to move said switching means to said second defined open circuit position when the off-bottom counter is not at its zero count position, a first defined reversible stepping motor, driving connections therefrom to the off-bottom counter actuating element for drive of said element in direction corresponding to the direction of the first defined stepping motor movements and in amounts proportional to the amounts of movement of the first defined stepping motor in such direction, a second defined stepping motor, driving connections therefrom to the second defined measuring unit for drive of said measuring unit in up counting direction and in amounts proportional to the amounts of movement of the second defined stepping motor, each stepping motor including a rotor and including means to angularly advance said rotor step-by-step by equal angular amounts of movement and including a plurality of current input connections to said advancing means, the direction of rotor advance corresponding to the sequence of delivery of electrical impulses to said current input connections, impulse generating means including a plurality of impulse delivering elements corresponding to the current input connections of the stepping motors and including a cyclically movable activating element movable in relation to the impulse delivering elements to activate said elements in directional sequence corresponding to the direction of movement of said activating element, operating connections between the tackle elements and the activating element constituted to move said activating element in direction corresponding to the direction of tackle elements movement and in amount corresponding to amounts of tackle elements movement, connections between the impulse delivering elements and the first defined stepping motor, and connections between the impulse delivering elements and the second defined stepping motor, said last connections including the off-bottom counter switching means first defined closed circuit position.

34. A device as defined in claim 33, together with a slip drive unit in the connections between the first defined reversible stepping motor and the off-bottom counter actuating element, said slip drive unit being constituted to permit first defined reversible stepping motor movement corresponding to down drilling movements of the tackle elements when the actuating element of the off-bottom counter is locked at the zero count position.

35. A device as defined in claim 34, wherein the slip drive unit is adjustable to adjust the driving force which it will transmit.

36. A device as defined in claim 33, together with a signal responsive switch, means to move said switch to its closed circuit position when the first mentioned signal is emitted by said signal producing means and to move said switch to its open circuit position when said contrary signal is emitted by said signal producing means, said connections between the impulse delivering elements and the second defined stepping motor including said signal responsive switch when in its closed circuit position.

37. A device as defined in claim 33, together with a signal responsive switch, means to move said switch to its closed circuit position when the first mentioned signal is emitted by said signal producing means and to move said switch to its open circuit position when said contrary signal is emitted by said signal producing means, said connections between the impulse delivering elements and the first defined stepping motor including said signal responsive switch when in its closed circuit position.

38. A device as defined in claim 37, in which the connections between the impulse delivering elements and the second defined stepping motor include said signal responsive switch when in its closed circuit position.

39. In a well drilling operation wherein a bit moves forwardly to advance to bottom and to successively deeper penetrations with the bit on bottom during such penetrations, and wherein the bit moves backwardly with intermediate backward movements in the off bottom direction, means to give signals of on bottom during the advances with the bit on bottom and to give signals of off bottom during the backward off bottom movements, said means comprising a digital algebraic counter, a drive shaft, connections between the drive shaft and the bit effective to cause the drive shaft to rotate in direction corresponding to the direction of bit movement and in amount proportional to amount of bit movement, said counter including a counting shaft and a series of orders disks and means to carry from order to order with the counting of groups of ordinals and including a units order disk, operative connections between the counting shaft and said units order disk effective to cause the counting elements to count in the increasing count direction from a zero on-bottom position by amounts proportional to amounts of bit movement in the off-bottom backward direction, and to cause the counting elements to count in the decreasing count direction from an off-bottom counter position towards the zero count position by amounts proportional to amounts of bit advance forward movement, a movable first locking element in connection with the counter counting shaft and movable through cycles of movement corresponding to successive counting shaft rotations, a movable second locking element, means to movably support said second locking element in proximity to the first locking element, the second locking element being movable between a counter shaft locking position and a counter shaft non-engaging position, the first and second locking elements being of interengaging form and mutually inter-engageable when the second locking element is in said counter shaft locking position, means to move the second locking element to said counter shaft non-engaging position when the units order disk is at position other than zero, means to move said second locking element to said counter shaft locking position before the units order disk is at its zero count position during down counting of said units order disk and when all of the other order disks are at their zero count positions, and means to give a signal corresponding to bit on-bottom substantially simultaneously with movement of the counting shaft and the units order disk to zero count position as aforesaid, together with operative connections between the drive shaft and the counter counting shaft, said operative connections including a yieldable force transmitting element, said force transmitting element being capable of transmitting sufficient force from the drive shaft to the counter counting shaft for actuation of the units order disk in the off-bottom count direction and being yieldable when the first and second locking elements are engaged with each other and the units order disk and the counter counting shaft are locked against down count movement at the zero count position.

40. Means as defined in claim 39, together with means to give a signal corresponding to bit off-bottom substantially simultaneously with movement of the counting shaft backwardly in the off-bottom direction from the zero count position.

41. Means as defined in claim 40, wherein the means to give the signal corresponding to bit on-bottom and the means to give the signal corresponding to bit off-bottom comprise a switch unit having a movable contact and a stationary contact with which such movable contact is engageable selectively, together with means carried by the counting shaft to move said movable contact with respect to the stationary contact substantially at the zero count position of the units order disk.

42. Means as defined in claim 41, wherein the switch unit is movably mounted in proximity to the engaging means which is carried by the counting shaft and is movable between a switch contact operating position and a switch contact non-operating position, together with means in connection with the units order disk and the switch unit mounting effective to move the switch unit to said switch contact non-operating position when the units order disk is in position other than the zero count position.

43. A digital counter comprising in combination a series of numerical orders disks, means to journal said disks in co-axial alignment and in proximity to each other, means to carry tens from each numerical order disk to the adjacent numerical order disk of higher order, a drive shaft in proximity to said numerical orders disks, means to journal said drive shaft parallel to the axis of the numerical orders disks, means to drive the units order disk from said drive shaft, a rock shaft, means to journal the rock shaft parallel to the axes of the numerical orders disks and in proximity to said disks, a first hook element secured to and rocking with the rock shaft, a companion second hook element secured to and rotating with the drive shaft, the first and second hook elements being provided with co-engageable hook surfaces engageable with each other when the rock shaft is in hook engaging rocked position, a crank arm connected to the rock shaft and swinging with the rocking movements of said shaft, a circular rib connected to each numerical order disk and projecting beyond the perimeter of such disk, a lift rod receiving notch in each rib, a lift rod connected to said crank arm and extending parallel to the axis of the numerical orders disks and in proximity to all of the numerical orders disk ribs, said lift rod being in position to move into the notch of each rib as the corresponding numerical orders disk rotates and being received in the notches of all of the disks when the numerical orders disks are all in rotated positions such that the notches of all of the ribs are in alignment with each other and in registry with the lift rod, and spring means urging the rock shaft to rock in direction to move the lift rod into all of said notches with corresponding swing of the first hook element into position for engagement by the second hook element for locking engagement of the drive shaft at completion of a rotation of said shaft in the hook engaging direction.

44. Means as defined in claim 43, together with a switch unit including a fixed contact and a movable contact, means to mount said switch unit on the rock shaft for rocking movement towards and from the drive shaft with rocking movements of the rock shaft, and a cam element on the drive shaft in position to engage the movable contact of the switch unit when the rock shaft is in position corresponding to movement of the lift rod into the notches of all of the numerical orders disks.

45. Means as defined in claim 44, wherein the cam element is angularly positioned on the drive shaft in position to engage the movable contact of the switch unit simultaneously with locking engagement of the second hook element with the first hook element.

46. Means as defined in claim 43, together with a switch unit including a fixed contact and a movable contact, means to mount said switch unit on the rock shaft for rocking movement towards and from the drive shaft with rocking movements of the rock shaft, and co-operating means on the drive shaft and the movable contact in position to actuate the movable contact of the switch unit when the rock shaft is in position corresponding to movement of the lift rod into the notches of all of the numerical orders disks.

47. In a well drilling operation including a drilling string, means to suspend said string, and means to raise said string off bottom and to permit lowering movements of said strick back to bottom, of means to produce signals at completion of successive increments of drilling, and means to produce an off-bottom signal when the drilling string is raised off bottom, together with means to make a record of said drilling operations, said means including a record strip support, means to advance the strip, and two styluses in position to produce line records on said strip during such advance of the strip, one stylus being an increment recording stylus and the other stylus being an off-bottom recording stylus, and the line record produced by the first stylus being an increment record line, and the line produced by the second stylus being an off-bottom record line, increment signal response means and off-bottom signal response means, each response means including a movable element movably responsive to a signal received by such response means, connections between the movable element of the increment signal response means and the increment recording stylus effective to produce a lateral stroke of the increment record line corresponding to each increment of drilling signal received by the increment signal response means, connections between the movable element of the off-bottom signal response means and the off-bottom recording stylus effective to produce an off-bottom lateral shift of the off-bottom record line corresponding to each off-bottom signal received by the off-bottom signal response means, and connections between the increment of drilling signal producing means and the increment signal response means effective to cause the increment signal response means to actuate the increment recording stylus to produce a lateral stroke corresponding to each increment of drilling signal, and connections between the off-bottom signal producing means and the off-bottom signal response means effective to cause the off-bottom signal response means to actuate the off-bottom recording stylus to produce a lateral shift corresponding to each off-bottom signal.

48. Means as defined in claim 47, wherein the means to advance the strip acts to advance said strip at substantially uniform rate.

49. Means as defined in claim 47, wherein the record strip support comprises a cylindrical drum on which the strip is cylindrically wound.

50. Means as defined in claim 49, wherein the means to advance the strip acts to rotate said cylindrical drum at substantially uniform rate.

51. Means as defined in claim 47, together with means to produce an on-bottom signal when the drilling string is on bottom, on-bottom signal response means, a movable element movably responsive to a signal received by such response means, connections between the movable element of the on-bottom signal response means and the off-bottom recording stylus effective to produce an on-bottom lateral shift of the off-bottom record line corresponding to each on-bottom signal received by the on-bottom signal response means, and connections between the on-bottom signal producing means and the on-bottom signal response means effective to cause the on-bottom signal response means to actuate the off-bottom recording stylus to produce an on-bottom lateral shift corresponding to each on-bottom signal which succeeds a preceding off-bottom signal.

52. In a well drilling operation, the combination with a drilling string, and the tackle to raise and to permit lowering of such string under control, and means to make a record of movements of such drilling string, of a tension connection between the tackle and such record making means and means to retain such tension connection under tension, and means to connect said tension connection to the tackle, comprising a magnet element in magnetic attraction connection to the tackle and a tension resisting connection of the tension connection and such magnet element.

53. Means as defined in claim 52, wherein said magnet element comprises a permanent magnet.

54. Means as defined in claim 53, together with means to separate such magnet element from the tackle, comprising an element movably mounted on the magnet element in position to engage the tackle and means to move said movably mounted element with respect to the magnet element to produce a force acting against the tackle in direction to move the magnet element away from the tackle.

55. Means as defined in claim 54, wherein said movably mounted element comprises a stem threaded with respect to the magnet element and mounted in position for engagement with the tackle.

56. Means as defined in claim 52, wherein the tackle includes a spring unit having a yieldable spring element, a connection of one end of such yieldable spring element to the drilling string and a connection of the opposite end of such yieldable spring element to the tension producing tackle unit, and wherein the magnet element is in magnetic attraction connection with that end of such yieldable spring element which is connected to the drilling string.

References Cited in the file of this patent

UNITED STATES PATENTS

| | | |
|---|---|---|
| 2,166,212 | Hayward | July 18, 1939 |
| 2,326,219 | Hayward | Aug. 10, 1943 |
| 2,671,346 | Banning | Mar. 9, 1954 |